(12) United States Patent
Zhao et al.

(10) Patent No.: US 12,147,015 B2
(45) Date of Patent: Nov. 19, 2024

(54) OPTICAL IMAGING LENS ASSEMBLY

(71) Applicant: ZHEJIANG SUNNY OPTICS CO., LTD., Zhejiang (CN)

(72) Inventors: Liefeng Zhao, Zhejiang (CN); Lin Huang, Zhejiang (CN); Fujian Dai, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 769 days.

(21) Appl. No.: 17/333,023

(22) Filed: May 28, 2021

(65) Prior Publication Data

US 2022/0035136 A1 Feb. 3, 2022

(30) Foreign Application Priority Data

Jul. 29, 2020 (CN) .......................... 202010745832.1

(51) Int. Cl.
| | |
|---|---|
| *G02B 13/00* | (2006.01) |
| *G01D 5/26* | (2006.01) |
| *G02B 5/20* | (2006.01) |
| *G02B 15/14* | (2006.01) |
| *G02B 27/00* | (2006.01) |

(52) U.S. Cl.
CPC .......... *G02B 13/0045* (2013.01); *G01D 5/26* (2013.01); *G02B 5/20* (2013.01); *G02B 15/14* (2013.01); *G02B 27/0025* (2013.01)

(58) Field of Classification Search
CPC ...... G02B 13/0045; G02B 5/20; G02B 15/14; G02B 27/0025; G02B 9/62; G02B 13/009; G02B 13/18; G01D 5/26
See application file for complete search history.

(56) References Cited

U.S. PATENT DOCUMENTS

| 9,933,600 B1 * | 4/2018 | Fang | ........................ G02B 9/60 |
| 2017/0299845 A1 * | 10/2017 | Yao | ........................... G02B 9/62 |

FOREIGN PATENT DOCUMENTS

CN 111352218 A * 6/2020 ......... G02B 13/0045

\* cited by examiner

*Primary Examiner* — Joseph P Martinez
*Assistant Examiner* — Ray Alexander Dean
(74) *Attorney, Agent, or Firm* — Samson G. Yu

(57) ABSTRACT

The disclosure provides an optical imaging lens assembly, which sequentially includes from an object side to an image side along an optical axis: a first lens group with a positive refractive power, including a first lens with a refractive power; a second lens group, sequentially including from the object side to the image side along the optical axis: a second lens, a third lens, a fourth lens, a fifth lens and a sixth lens with refractive power respectively; an optical filter; and a photosensitive element; wherein at least one of the first lens to the sixth lens is arranged to be movable relative to the photosensitive element in a direction of the optical axis; a maximum effective semi-diameter DT51 of an object-side surface of the fifth lens and a maximum effective semi-diameter DT32 of an image-side surface of the third lens satisfy 1.5<DT51/DT32<2.5.

18 Claims, 36 Drawing Sheets longitudinal aberration curve longitudinal aberration curve (millimeter)

longitudinal aberration curve longitudinal aberration curve

OPTICAL IMAGING LENS ASSEMBLY

CROSS-REFERENCE TO RELATED PRESENT INVENTION(S)

The disclosure claims priority to and the benefit of Chinese Patent Present invention No. 202010745832.1, filed in the China National Intellectual Property Administration (CNIPA) on 29 Jul. 2020, which is incorporated herein by reference in its entirety.

TECHNICAL FIELD

The disclosure relates to the field of optical elements, and more particularly to an optical imaging lens assembly.

BACKGROUND

In recent years, with the upgrading and updating of consumer electronic products and the development of image software functions and video software functions in consumer electronic products, market requirements on camera modules applicable to portable electronic products have been gradually increased.

Camera modules are usually arranged in portable devices such as mobile phones to endow the mobile phones with camera functions. A camera module includes an optical imaging lens assembly, and an electronic photosensitive element and a lens group are usually arranged in the optical imaging lens assembly. The lens group may converge light of an object side, imaged light follows a light path of the lens group and irradiates the electronic photosensitive element, and furthermore, the electronic photosensitive element converts an optical signal into an electric signal to form image data. It is usually expected that a size of a camera module is controlled to be adapted to a relatively small mounting space of a portable electronic product.

However, a user may use a portable electronic product for photographing in various disclosure scenarios. Under a normal condition, a camera module is unlikely to satisfy requirements of shooting objects in different shooting scenarios or shooting objects at different object distances.

For satisfying a miniaturization requirement and an imaging requirement, an optical imaging lens assembly capable of considering miniaturization and high-definition imaging at different object distances is required.

SUMMARY

Some embodiments of the disclosure provide an optical imaging lens assembly, which sequentially includes from an object side to an image side along an optical axis: a first lens group with a positive refractive power, including a first lens with a refractive power; a second lens group, sequentially including from the object side to the image side along the optical axis: a second lens, a third lens, a fourth lens, a fifth lens and a sixth lens with refractive power respectively; an optical filter; and a photosensitive element; wherein at least one of the first lens to the sixth lens is arranged to be movable relative to the photosensitive element in a direction of the optical axis; effective semi-diameters of each lens in the second lens to the sixth lens progressively increase in sequence; and a maximum effective semi-diameter DT51 of an object-side surface of the fifth lens and a maximum effective semi-diameter DT32 of an image-side surface of the third lens may satisfy $1.5<DT51/DT32<2.5$.

In an implementation mode, at least one of an object-side surface of the first lens to an image-side surface of the sixth lens is an aspheric mirror surface.

In an implementation mode, at least one of an object-side surface of the first lens to an image-side surface of the sixth lens is a non-rotationally symmetric aspheric mirror surface.

In an implementation mode, a center thickness CT1 of the first lens on the optical axis and a sum $\Sigma CT$ of center thicknesses of each lens in the first lens group and the second lens group on the optical axis may satisfy $0.1<CT1/\Sigma CT<0.5$.

In an implementation mode, a total effective focal length f of the optical imaging lens assembly and an Entrance Pupil Diameter (EPD) of the optical imaging lens assembly may satisfy $1.6<f/EPD<2.6$.

In an implementation mode, an effective focal length f5 of the fifth lens and an effective focal length f6 of the sixth lens may satisfy $-2<f5/f6<-0.5$.

In an implementation mode, ImgH is a half the diagonal length of an effective pixel region on the photosensitive element, TTL is a spacing distance from the object-side surface of the first lens to the effective pixel region on the photosensitive element on the optical axis, and ImgH and TTL may satisfy $TTL/ImgH<1.5$.

In an implementation mode, a maximum effective semi-diameter DT41 of an object-side surface of the fourth lens and the maximum effective semi-diameter DT51 of the object-side surface of the fifth lens may satisfy $0.5<DT41/DT51<1$.

In an implementation mode, the optical imaging lens assembly further includes a diaphragm arranged in a direction of an object side of the first lens; and a distance ST from the diaphragm to an object-side surface of the first lens on the optical axis and an center thickness CT1 of the first lens on the optical axis may satisfy $-1<ST/CT1<0$.

In an implementation mode, a curvature radius R9 of an object-side surface of the fifth lens and an effective focal length f5 of the fifth lens may satisfy $0.5<R9/f5<1.5$.

In an implementation mode, a center thickness CT2 of the second lens on the optical axis and a center thickness CT3 of the third lens on the optical axis may satisfy $0.5<CT2/CT3<1$.

In an implementation mode, a center thickness CT2 of the second lens on the optical axis and a center thickness CT4 of the fourth lens on the optical axis may satisfy $0.8<CT2/CT4<1.2$.

In an implementation mode, an effective focal length f1 of the first lens and an effective focal length f5 of the fifth lens may satisfy $0.7<f1/f5<1.3$.

In an implementation mode, an on-axis distance SAG52 from an intersection point of an image-side surface of the fifth lens and the optical axis to an effective radius vertex of the image-side surface of the fifth lens and a maximum effective semi-diameter DT52 of the image-side surface of the fifth lens may satisfy $-0.3<SAG52/DT52<0$.

In an implementation mode, an Abbe number V3 of the third lens may satisfy $30<V3<50$.

In an implementation mode, an object-side surface of the first lens is a convex surface, and an image-side surface of the second lens is a concave surface.

In an implementation mode, a curvature radius R1 of an object-side surface of the first lens and a curvature radius R4 of an image-side surface of the second lens may satisfy $-0.5<(R1-R4)/(R1+R4)<0$.

Some other embodiments of the disclosure provide an optical imaging lens assembly, which sequentially includes from an object side to an image side along an optical axis:

a first lens group with a positive refractive power, including a first lens with a refractive power; a second lens group, sequentially including from the object side to the image side along the optical axis: a second lens, a third lens, a fourth lens, a fifth lens and a sixth lens with refractive power respectively; an optical filter; and a photosensitive element, wherein at least one of the first lens to the sixth lens is arranged to move relative to the photosensitive element in a direction of the optical axis; and an on-axis distance SAG52 from an intersection point of an image-side surface of the fifth lens and the optical axis to an effective radius vertex of the image-side surface of the fifth lens and a maximum effective semi-diameter DT52 of the image-side surface of the fifth lens may satisfy $-0.3<SAG52/DT52<0$.

In an implementation mode, a center thickness CT1 of the first lens on the optical axis and a sum $\Sigma CT$ of center thicknesses of each lens in the first lens group and the second lens group on the optical axis may satisfy $0.1<CT1/\Sigma CT<0.5$.

In an implementation mode, a total effective focal length f of the optical imaging lens assembly and an Entrance Pupil Diameter (EPD) of the optical imaging lens assembly may satisfy $1.6<f/EPD<2.6$.

In an implementation mode, an effective focal length f5 of the fifth lens and an effective focal length f6 of the sixth lens may satisfy $-2<f5/f6<-0.5$.

In an implementation mode, ImgH is a half the diagonal length of an effective pixel region on the photosensitive element, TTL is a spacing distance from an object-side surface of the first lens to the effective pixel region on the photosensitive element on the optical axis may satisfy $TTL/ImgH<1.5$.

In an implementation mode, effective semi-diameters of each lens in the second lens to the sixth lens progressively increase in sequence; and a maximum effective semi-diameter DT51 of an object-side surface of the fifth lens and a maximum effective semi-diameter DT32 of an image-side surface of the third lens may satisfy $1.5<DT51/DT32<2.5$.

In an implementation mode, a maximum effective semi-diameter DT41 of an object-side surface of the fourth lens and a maximum effective semi-diameter DT51 of the object-side surface of the fifth lens may satisfy $0.5<DT41/DT51<1$.

In an implementation mode, the optical imaging lens assembly further includes a diaphragm arranged in an object-side direction of the first lens; and a distance ST from the diaphragm to an object-side surface of the first lens on the optical axis and a center thickness CT1 of the first lens on the optical axis may satisfy $-1<ST/CT1<0$.

In an implementation mode, a curvature radius R9 of an object-side surface of the fifth lens and an effective focal length f5 of the fifth lens may satisfy $0.5<R9/f5<1.5$.

In an implementation mode, a center thickness CT2 of the second lens on the optical axis and a center thickness CT3 of the third lens on the optical axis may satisfy $0.5<CT2/CT3<1$.

In an implementation mode, a center thickness CT2 of the second lens on the optical axis and a center thickness CT4 of the fourth lens on the optical axis may satisfy $0.8<CT2/CT4<1.2$.

In an implementation mode, an effective focal length f1 of the first lens and an effective focal length f5 of the fifth lens may satisfy $0.7<f1/f5<1.3$.

In an implementation mode, an Abbe number V3 of the third lens may satisfy $30<V3<50$.

In an implementation mode, an object-side surface of the first lens is a convex surface, and an image-side surface of the second lens is a concave surface.

In an implementation mode, a curvature radius R1 of an object-side surface of the first lens and a curvature radius R4 of an image-side surface of the second lens may satisfy $-0.5<(R1-R4)/(R1+R4)<0$.

According to the disclosure, two lens groups are adopted, specifically totally six lenses may be adopted, and at least one lens in the first lens group and the second lens group is arranged to move along the optical axis, so that a focusing purpose of the lens may be achieved by movement and fine adjustment of the optical elements of this part. According to the disclosure, automatic zooming may be implemented for subjects at different positions, and the refractive power and surface types of each lens, the center thickness of each lens, on-axis spacing distances between the lenses and the like are reasonably configured to achieve at least one beneficial effect of high-definition imaging, high resolving power, high imaging quality and the like of the optical imaging lens assembly.

BRIEF DESCRIPTION OF THE DRAWINGS

Detailed descriptions are made to unrestrictive implementation modes below in combination with the drawings to make the other features, objectives and advantages of the disclosure more apparent. In the drawings.

DETAILED DESCRIPTION OF THE EMBODIMENTS

Figure 1A:
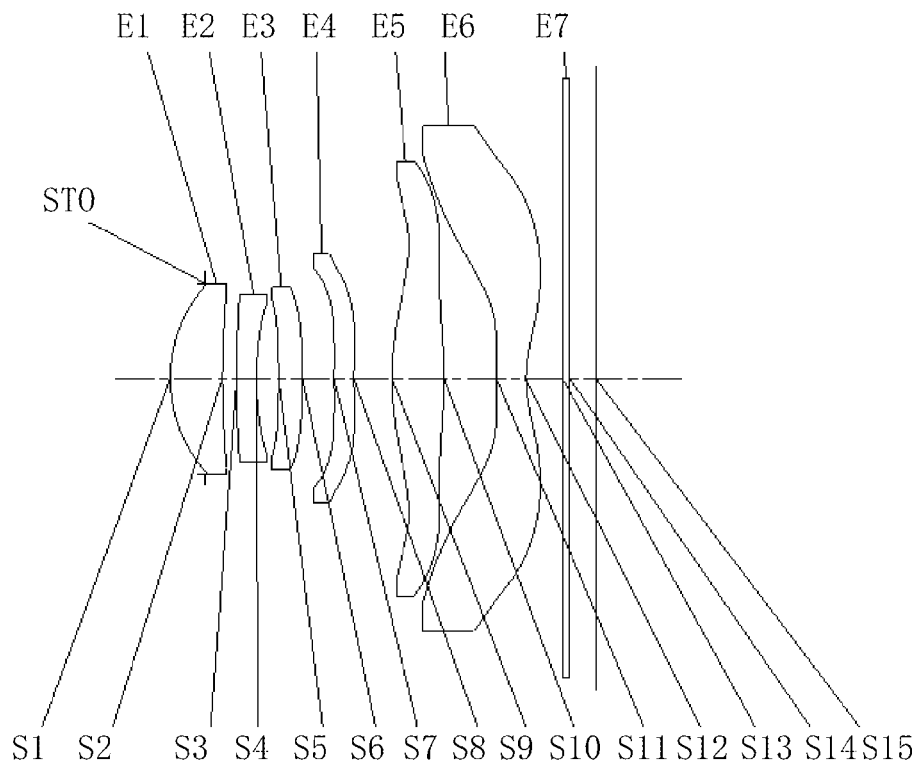
FIGS. 1A-1C show structural schematic diagrams of an optical imaging lens assembly according to Embodiment 1 of the disclosure in a state that an object distance is infinity, a state that the object distance is 500 mm and a state that the object distance is 100 mm.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

Herein, it is defined that a direction parallel to the optical axis is a Z-axis direction, a direction perpendicular to the Z axis in a meridian surface is a Y-axis direction and a direction perpendicular to the Z axis in a sagittal surface is an X-axis direction. Unless otherwise stated, each parameter sign (for example, a curvature radius), except a parameter sign related to a field of view in an embodiment of designing a free-form surface represents a feature parameter value of the camera lens group in the Y-axis direction. For example, unless otherwise specified, fx represents a curvature radius of the optical imaging system in the X-axis direction, and fy represents a curvature radius of the optical imaging system in the Y-axis direction.

It should also be understood that terms "include", "including", "have", "contain" and/or "containing", used in the specification, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and features in the embodiments may be combined without conflicts. The disclosure will be described below with reference to the drawings and in combination with the embodiments in detail.

The features, principles and other aspects of the disclosure will be described below in detail.

An optical imaging lens assembly according to the exemplary embodiment of the disclosure may include a first lens group, a second lens group, an optical filter and a photosensitive element. Each optical element is arranged from an image side to an object side along an optical axis.

When the optical imaging lens assembly is mounted in other devices, the photosensitive element is usually connected with a circuit board and the like to be fixed, and the optical filter is arranged in a direction of an object side of the photosensitive element and is usually fixed. Exemplarily, the first lens group is usually fixed, and at least one of a second lens to a sixth lens is arranged to be movable relative to the photosensitive element on the optical axis.

In an exemplary embodiment, the first lens group has a positive refractive power and includes a first lens. Exemplarily, the first lens may have a positive refractive power. Exemplarily, when the first lens group includes multiple lenses, the first lens is the lens closest to the object side.

In an exemplary embodiment, the second lens group may include, for example, five lenses with refractive power, i.e., the second lens, a third lens, a fourth lens, a fifth lens and the sixth lens. The five lenses are sequentially arranged from the object side to the image side along the optical axis. In each lens of the optical imaging lens assembly, there may be an air space between any two adjacent lenses.

In an exemplary embodiment, the second lens has a positive refractive power or a negative refractive power; the third lens has a positive refractive power or a negative refractive power; the fourth lens has a positive refractive power or a negative refractive power; the fifth lens may have a positive refractive power or a negative refractive power; and the sixth lens has a positive refractive power or a negative refractive power.

In an exemplary embodiment, an object-side surface of the first lens may be a convex surface, and an image-side surface of the second lens may be a concave surface.

In an exemplary embodiment, the optical imaging lens assembly may further include at least one diaphragm. The diaphragm may be arranged at a proper position as required, for example, arranged between the object side and the first lens group. Exemplarily, if the first lens in the first lens group is the lens closest to the object side, the diaphragm is arranged between the object side and the first lens. Optionally, the optical imaging lens assembly above may further include an optical filter configured to correct a chromatic aberration.

The optical filter may be configured to protect the photosensitive element. The photosensitive element is configured for imaging and may be an electronic photosensitive element. The electronic photosensitive element may be a Charge Coupled Device (CCD) or a Complementary Metal Oxide Semiconductor (CMOS). A surface where an effective pixel region of the photosensitive element is located is considered as a practical imaging surface of the optical imaging lens assembly.

In an exemplary embodiment, at least one of the first lens to the sixth lens is arranged to be movable relative to the photosensitive element on the optical axis. Such movement may be completed by a continuous stroke and stopped at any position in the stroke and may also be stopped at a plurality of preset positions. Exemplarily, at least one lens arranged to move may stop at three different positions such that the optical imaging lens assembly has a state that an object distance is infinity, a state that the object distance is 500 mm and a state that the object distance is 100 mm. Exemplarily, multiple lenses arranged to move are fixedly connected with one another, and the multiple lenses move synchronously. Exemplarily, one lens arranged to move moves independently relative to another lens. Specifically, the lens arranged to move may be arranged to slide along the optical axis and may also move in another manner but the lens has multiple relatively fixed positions on the optical axis. Through the movement of the lens, the optical imaging lens assembly provided in the disclosure may realize an auto-focus function. In addition, the refractive power and surface types of each lens are matched, so that the overall structure is more compact.

In an exemplary embodiment, effective semi-diameters of each lens in the second lens to the sixth lens progressively increase in sequence.

In an exemplary embodiment, the optical imaging lens assembly of the disclosure may satisfy a conditional expression $1.5<DT51/DT32<2.5$, wherein DT51 is a maximum effective semi-diameter of an object-side surface of the fifth lens, and DT32 is a maximum effective semi-diameter of an image-side surface of the third lens. $1.5<DT51/DT32<2.5$ is satisfied, so that the effective semi-diameter of the fifth lens and the effective semi-diameter of the third lens may be configured reasonably to further control a size of the optical imaging lens assembly in a radial direction of the optical axis and facilitate implementation of structure compression. More specifically, DT51 and DT32 may satisfy $1.50<DT51/DT32<2.25$.

In an exemplary embodiment, the optical imaging lens assembly of the disclosure may satisfy a conditional expression $0.1<CT1/\Sigma CT<0.5$, wherein CT1 is a center thickness of the first lens on the optical axis, and $\Sigma CT$ is a sum of center thicknesses of each lens in the first lens group and the second lens group on the optical axis. Exemplarily, $\Sigma CT$ is a sum of center thicknesses of each lens in the first lens to the sixth lens on the optical axis: $\Sigma CT=CT1+CT2+CT3+CT4+CT5+CT6$, meanings of CT2 to CT6 referring to CT1. $0.1<CT1/\Sigma CT<0.5$ is satisfied, so that a ratio of the center thickness of the first lens to the sum of the center thicknesses of the six lenses may achieve a better balance, and the structure of the optical imaging lens assembly is more compact. More specifically, CT1 and $\Sigma CT$ may satisfy $0.17<CT1/\Sigma CT<0.37$.

In an exemplary embodiment, the optical imaging lens assembly of the disclosure may satisfy a conditional expression $1.6<f/EPD<2.6$, wherein f is a total effective focal length of the optical imaging lens assembly, and EPD is an Entrance Pupil Diameter of the optical imaging lens assembly. The optical imaging lens assembly satisfying $1.6<f/EPD<2.6$ has a reasonable aperture range. More specifically, f and EPD may satisfy $1.8<f/EPD<2.1$.

In an exemplary embodiment, the optical imaging lens assembly of the disclosure may satisfy a conditional expression $-2<f5/f6<-0.5$, wherein f5 is an effective focal length of the fifth lens, and f6 is an effective focal length of the sixth lens. $-2<f5/f6<-0.5$ is satisfied, so that the refractive power of the fifth lens and the sixth lens may be configured reasonably to further improve resolving power of the optical imaging lens assembly effectively. More specifically, f5 and f6 may satisfy $-1.60<f5/f6<-0.70$.

In an exemplary embodiment, the optical imaging lens assembly of the disclosure may satisfy a conditional expression $TTL/ImgH<1.5$, wherein TTL is a spacing distance from the object-side surface of the first lens to the effective pixel region on the photosensitive element on the optical axis, and ImgH is a half the diagonal length of the effective pixel region on the photosensitive element. Exemplarily, the first lens is the lens closest to the object side in the first lens group. $TTL/ImgH<1.5$ is satisfied, so that an ultra-thin feature of the optical imaging lens assembly may be maintained in a focusing process. More specifically, TTL and ImgH may satisfy $TTL/ImgH<1.40$.

In an exemplary embodiment, the optical imaging lens assembly of the disclosure may satisfy a conditional expression $0.5<DT41/DT51<1$, wherein DT41 is a maximum effective semi-diameter of an object-side surface of the fourth lens, and DT51 is the maximum effective semi-diameter of the object-side surface of the fifth lens. $0.5<DT41/DT51<1$ is satisfied, so that the effective semi-diameter of the fourth lens and the effective semi-diameter of the fifth lens may be configured reasonably to further control the size of the optical imaging lens assembly in the radial direction of the optical axis, facilitate implementation of structure compression and also facilitate implementation of miniaturization of the optical imaging lens assembly. More specifically, DT41 and DT51 may satisfy $0.52<DT41/DT51<0.77$.

In an exemplary embodiment, when the diaphragm is arranged in an object-side direction of the first lens, the optical imaging lens assembly of the disclosure may satisfy a conditional expression $-1<ST/CT1<0$, wherein ST is a distance from the diaphragm to the object-side surface of the first lens on the optical axis, and CT1 is the center thickness of the first lens on the optical axis. $-1<ST/CT1<0$ is satisfied, so that reasonable arrangement of the position of the diaphragm is facilitated, and the resolving power of the optical imaging lens assembly may be improved effectively. More specifically, ST and CT1 may satisfy −0.70<ST/CT1<−0.11.

In an exemplary embodiment, the optical imaging lens assembly of the disclosure may satisfy a conditional expression 0.5<R9/f5<1.5, wherein R9 is a curvature radius of the object-side surface of the fifth lens, and f5 is the effective focal length of the fifth lens. 0.5<R9/f5<1.5 is satisfied, so that a lens shape of the fifth lens may be set reasonably, and furthermore, a chief ray angle may be reduced. More specifically, R9 and f5 may satisfy 0.85<R9/f5<1.20.

In an exemplary embodiment, the optical imaging lens assembly of the disclosure may satisfy a conditional expression 0.5<CT2/CT3<1, wherein CT2 is a center thickness of the second lens on the optical axis, and CT3 is a center thickness of the third lens on the optical axis. 0.5<CT2/CT3<1 is satisfied, so that implementation of reasonable size distribution, structure compression and miniaturization of the optical imaging lens assembly is facilitated, and meanwhile, the resolving power of the optical imaging lens assembly is also improved.

In an exemplary embodiment, the optical imaging lens assembly of the disclosure may satisfy a conditional expression 0.8<CT2/CT4<1.2, wherein CT2 is the center thickness of the second lens on the optical axis, and CT4 is a center thickness of the fourth lens on the optical axis. 0.8<CT2/CT4<1.2 is satisfied, so that the center thicknesses of the second lens and the fourth lens may be configured reasonably, and furthermore, structure compression of the optical imaging lens assembly and improvement of the resolving power are facilitated. More specifically, CT2 and CT4 may satisfy 0.85<CT2/CT4<1.10.

In an exemplary embodiment, the optical imaging lens assembly of the disclosure may satisfy a conditional expression 0.7<f1/f5<1.3, wherein f1 is an effective focal length of the first lens, and f5 is the effective focal length of the fifth lens. A ratio of the effective focal lengths of the first lens and the fifth lens may be controlled in this range to improve the resolving power and imaging quality of the optical imaging lens assembly effectively. More specifically, f1 and f5 may satisfy 0.80<f1/f5<1.10.

In an exemplary embodiment, the optical imaging lens assembly of the disclosure may satisfy a conditional expression −0.3<SAG52/DT52<0, wherein SAG52 is an on-axis distance from an intersection point of an image-side surface of the fifth lens and the optical axis to an effective radius vertex of the image-side surface of the fifth lens, and DT52 is a maximum effective semi-diameter of the image-side surface of the fifth lens on the optical axis. −0.3<SAG52/DT52<0 is satisfied, so that the fifth lens may be in a reasonable lens shape, and furthermore, the size of the optical imaging lens assembly may be reduced. More specifically, SAG52 and DT52 may satisfy −0.27<SAG52/DT52<−0.06.

In an exemplary embodiment, the optical imaging lens assembly of the disclosure may satisfy a conditional expression 30<V3<50, wherein V3 is an Abbe number of the third lens. 30<V3<50 is satisfied, so that a material for the third lens may be set reasonably, furthermore, a chromatic aberration of the optical imaging lens assembly may be reduced effectively, and the resolving power and the imaging quality may be improved. More specifically, V3 may satisfy 37<V3<40.

In an exemplary embodiment, the optical imaging lens assembly of the disclosure may satisfy a conditional expression −0.5<(R1−R4)/(R1+R4)<0, wherein R1 is a curvature radius of the object-side surface of the first lens, and R4 is a curvature radius of the image-side surface of the second lens. −0.5<(R1−R4)/(R1+R4)<0 is satisfied, so that shapes and structures of the lenses may be matched reasonably, and furthermore, the optical imaging lens assembly is endowed with high resolving power. Specifically, R1 and R4 may satisfy −0.42<(R1−R4)/(R1+R4)<−0.12. Exemplarily, in the embodiment, the object-side surface of the first lens is a convex surface, and the image-side surface of the second lens is a concave surface.

The optical imaging lens assembly according to the implementation mode of the disclosure may adopt multiple lenses, for example, the abovementioned six. The refractive power and surface types of each lens, the center thickness of each lens, on-axis spacing distances between the lenses and the like are reasonably configured to effectively reduce the size of the optical imaging lens assembly, reduce the sensitivity of the optical imaging lens assembly, improve the machinability of the optical imaging lens assembly and ensure that the optical imaging lens assembly is more favorable for production and machining and applicable to a portable electronic product. In addition, the optical imaging lens assembly of the disclosure also has high optical performance such as high-definition imaging and high resolving power. When the optical imaging lens assembly is configured to shoot subjects at different positions, part of optical elements may be finely adjusted to achieve a focusing purpose and achieve relatively high imaging quality.

In the embodiment of the disclosure, at least one of the mirror surfaces of each lens is an aspheric mirror surface, namely at least one of the object-side surface of the first lens to an image-side surface of the sixth lens is an aspheric mirror surface. An aspheric lens has a feature that a curvature keeps changing from a center of the lens to a periphery of the lens. Unlike a spherical lens with a constant curvature from a center of the lens to a periphery of the lens, the aspheric lens has a better curvature radius feature and the advantages of improving distortions and improving astigmatic aberrations. With adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens and the sixth lens is an aspheric mirror surface. Optionally, both the object-side surface and image-side surface of each lens in the first lens, the second lens, the third lens, the fourth lens, the fifth lens and the sixth lens are aspheric mirror surfaces.

In an exemplary embodiment, the object-side surface or the image-side surface of at least one lens in the first lens to the sixth lens is a non-rotationally symmetric aspheric mirror surface. A non-rotationally symmetric component is added to the non-rotationally symmetric aspheric mirror surface based on a rotationally symmetric aspheric surface. The non-rotationally symmetric aspheric mirror surface is favorable for reducing an optical distortion and a TV distortion and is also favorable for correcting an tangential aberration and a sagittal aberration outside the optical axis of the optical imaging system and improving the imaging quality of the optical imaging system.

However, those skilled in the art should know that the number of the lenses forming the optical imaging lens assembly may be changed without departing from the technical solutions claimed in the disclosure to achieve each result and advantage described in the specification. For example, although descriptions are made in the implementation with six lenses as an example, the optical imaging lens assembly is not limited to six lenses. If necessary, the optical imaging lens assembly may further include other number of lenses.

Specific embodiments applied to the optical imaging lens assembly of the abovementioned implementation mode will further be described below with reference to the drawings.

Embodiment 1

Figure 1B:
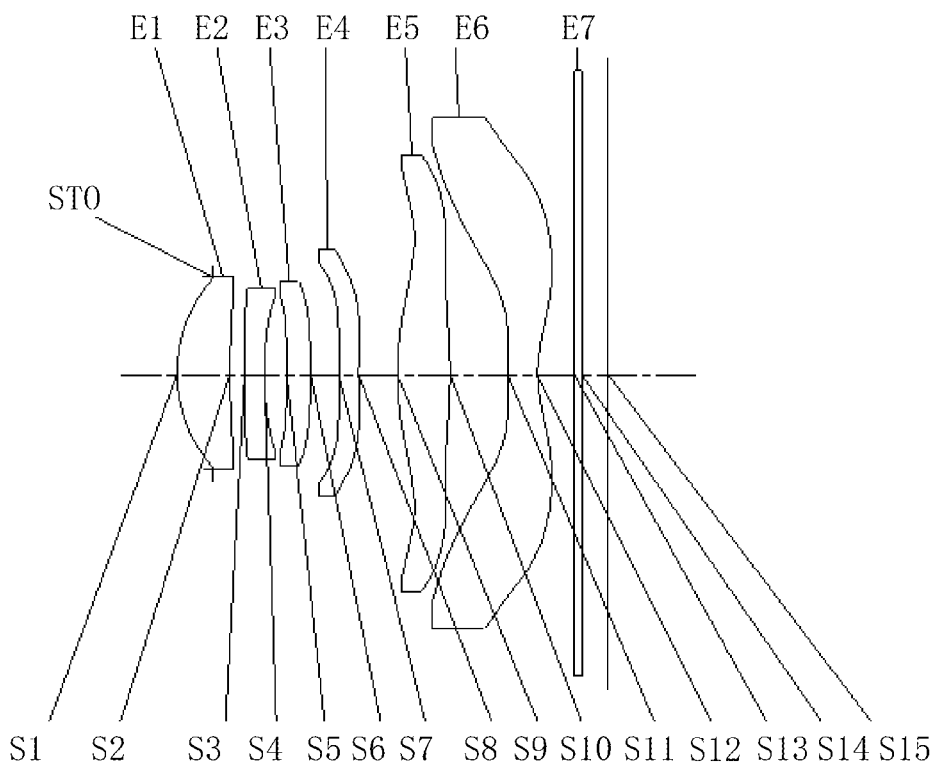
Figure 1C:
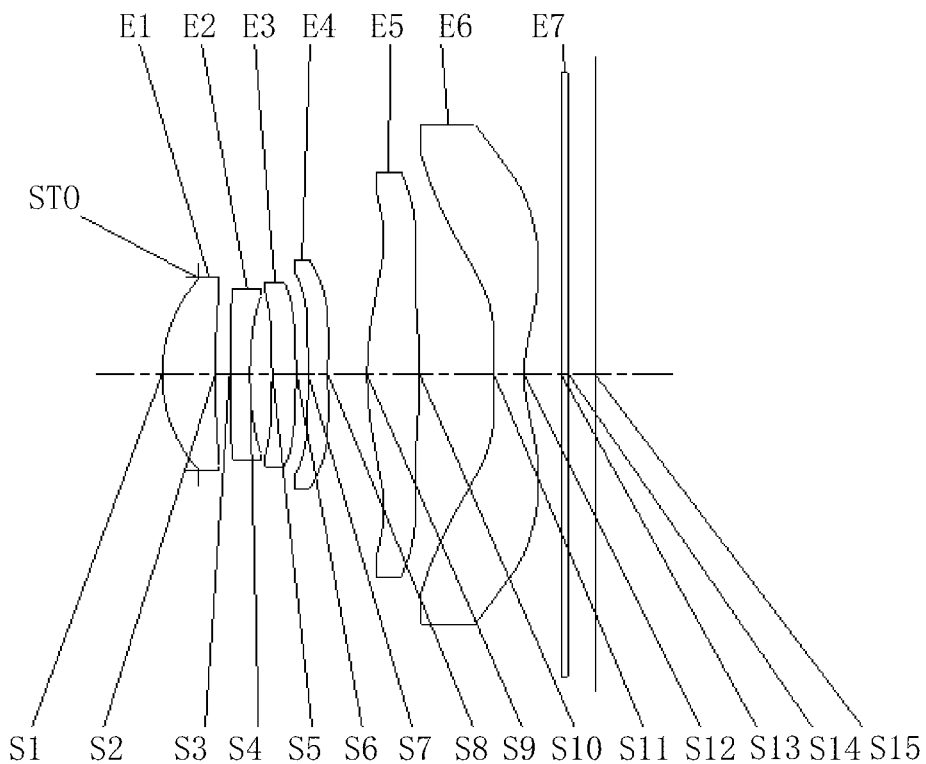

An optical imaging lens assembly according to Embodiment 1 of the disclosure will be described below with reference to FIGS. 1A-4C. FIGS. 1A-1C show structural schematic diagrams of an optical imaging lens assembly according to Embodiment 1 of the disclosure in states that an object distance is infinity, 500 mm and 100 mm.

As shown in FIGS. 1A-1C, the optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an electronic photosensitive element (not shown in the figures). The first lens E1 is configured to form a first lens group, and the second lens E2 to the sixth lens E6 are configured to form a second lens group. In the embodiment, the fourth lens E4 and the fifth lens E5 are arranged in a manner of moving along the optical axis. An optical filter may further be arranged on the image side of the sixth lens E6.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface.

The optical filter E7 has an object-side surface S13 and an image-side surface S14. Light from an object sequentially penetrates through each of the surfaces S1 to S14 and is finally imaged on the electronic photosensitive element. Specifically, a surface where an effective pixel region of the electronic photosensitive element is located is taken as a practical imaging surface S15 of the optical imaging lens assembly.

Table 1 shows a basic parameter table of the optical imaging lens assembly of Embodiment 1, wherein the units of the curvature radius, the thickness/distance and the focal length are all millimeters (mm). Wherein OD represents an object distance, T1 represents a spacing distance of the first lens E1 and the second lens E2 on the optical axis, T2, T3, T4 and T5 have the same meanings as T1, and T6 represents a spacing distance of the sixth lens E6 and the optical filter E7 on the optical axis.

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | OD | | | | |
| STO | Spherical | Infinite | −0.5415 | | | | |
| S1 | Aspheric | 2.1725 | 0.7980 | 1.55 | 56.1 | 4.86 | 0.0217 |
| S2 | Aspheric | 10.3528 | T1 | | | | 23.4628 |
| S3 | Aspheric | 18.8752 | 0.3020 | 1.68 | 19.2 | −10.14 | −93.9821 |
| S4 | Aspheric | 5.0131 | T2 | | | | 1.8231 |
| S5 | Aspheric | −28.3442 | 0.3653 | 1.57 | 37.3 | 37.33 | 46.4935 |
| S6 | Aspheric | −12.2267 | T3 | | | | −39.3917 |
| S7 | Aspheric | 12.5591 | 0.3003 | 1.62 | 25.9 | −27.25 | −20.3872 |
| S8 | Aspheric | 7.1414 | T4 | | | | −7.3233 |
| S9 | Aspheric | 4.6221 | 0.7977 | 1.55 | 56.1 | 5.31 | 0.2934 |
| S10 | Aspheric | −7.3257 | T5 | | | | 3.2543 |
| S11 | Aspheric | 8.5279 | 0.4500 | 1.54 | 55.7 | −4.35 | −46.5546 |
| S12 | Aspheric | 1.7995 | T6 | | | | −0.9840 |
| S13 | Spherical | Infinite | 0.1100 | 1.52 | 64.2 | | |
| S14 | Spherical | Infinite | 0.4000 | | | | |
| S15 | Spherical | Infinite | | | | | |

Table 2 shows a related parameter table of the optical imaging lens assembly in the states that the object distance is infinity, 500 mm and 100 mm, wherein the units of TTL, f and ImgH are all millimeters (mm), and "←" represents being the same as the numerical value on the left.

TABLE 2

| OD | Infinity | 500.0000 | 100.0000 |
|---|---|---|---|
| T1 | 0.2247 | ← | ← |
| T2 | 0.3387 | ← | ← |
| T3 | 0.4865 | 0.4218 | 0.1719 |
| T4 | 0.5895 | ← | ← |
| T5 | 0.8039 | 0.8687 | 1.1186 |
| T6 | 0.5647 | ← | ← |
| TTL | 6.53 | ← | ← |
| FOV(°) | 80.7 | 80.9 | 81.9 |
| f | 5.48 | 5.39 | 5.06 |
| ImgH | 4.79 | ← | ← |

It can be seen according to Table 2 that, in Embodiment 1, distances from the fourth lens E4 and the fifth lens E5 to the first lens E1 on the optical axis are shorter when the optical imaging lens assembly is in the state that the object distance is 100 mm, compared with those when the optical imaging lens assembly is in the state that the object distance is infinity. A value of an on-axis distance TTL from the object-side surface of the first lens E1 to the imaging surface S15 is kept 6.53 mm, ImgH is a half the diagonal length of the effective pixel region on the imaging surface S15, a value of ImgH is kept 4.79 mm, and an F-number Fno satisfies Fno=f/EPD.

In Embodiment 1, both the object-side surface and the image-side surface of any lens in the first lens E1 to the sixth lens E6 are all aspheric surfaces, and a surface type of each aspheric lens may be defined through, but not limited to, the following aspheric surface formula:

$$z = \frac{ch^2}{1+\sqrt{1-(k+1)c^2h^2}} + \sum Aih^i, \quad (1)$$

wherein z is a vector height of a distance between the aspheric surface and a vertex of the aspheric surface when the aspheric surface is located at a position with the height h along the optical axis direction, c=1/R (namely, the paraxial curvature c is the reciprocal of the curvature radius R in Table 1 above); k is a conic coefficient; and Ai is a correction coefficient of the i-th order of the aspheric surface. Table 3 shows high-order coefficients A4, A6, A8, A10, A12, A14, A16, A18, A20, A22, A24, A26, A28 and A30 applied to each of the aspheric mirror surfaces S1-S12 in Embodiment 1.

assembly provided in Embodiment 1 and a camera lens with the optical imaging lens assembly may achieve good imaging quality.

Embodiment 2

Figure 5A:
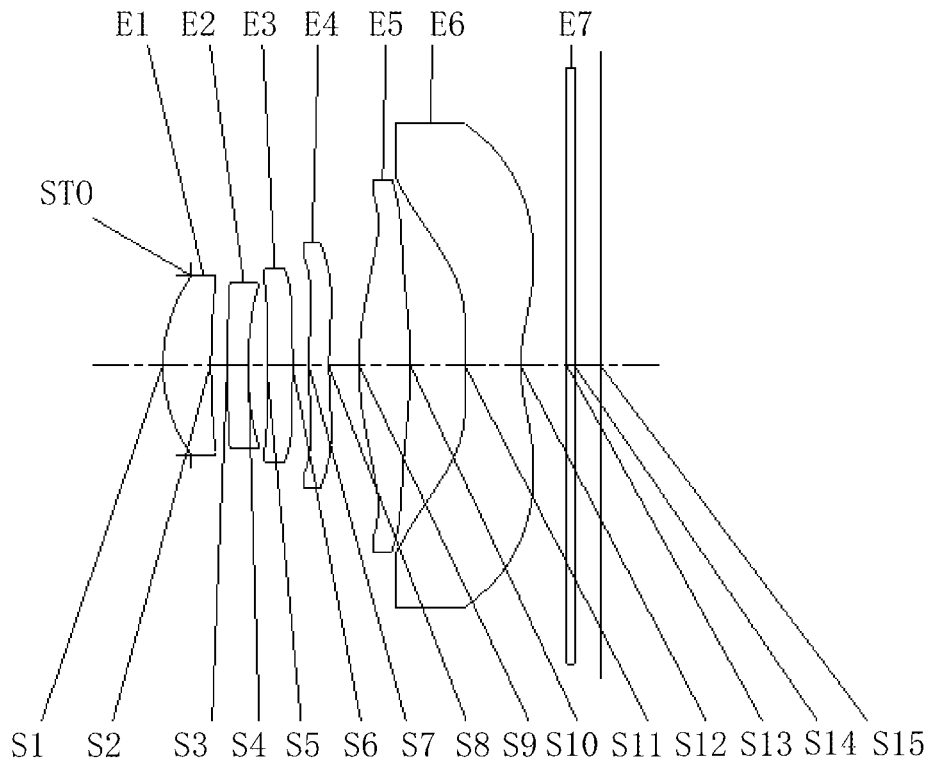
FIGS. 5A-5C show structural schematic diagrams of an optical imaging lens assembly according to Embodiment 2 of the disclosure in a state that an object distance is infinity, a state that the object distance is 500 mm and a state that the object distance is 100 mm.
Figure 5B:
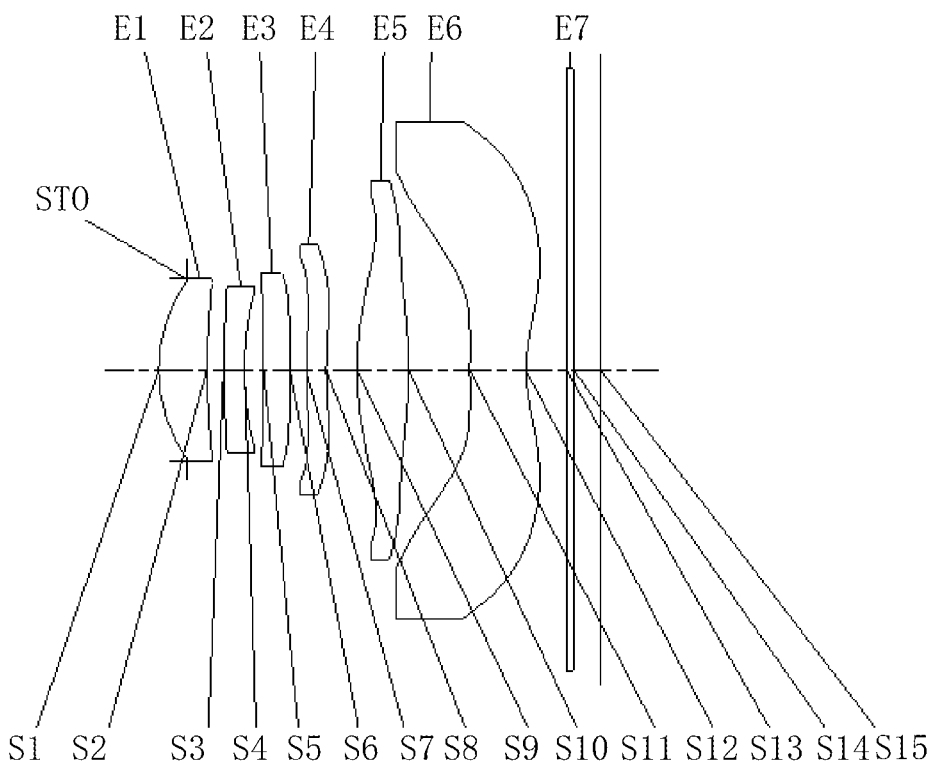
Figure 5C:
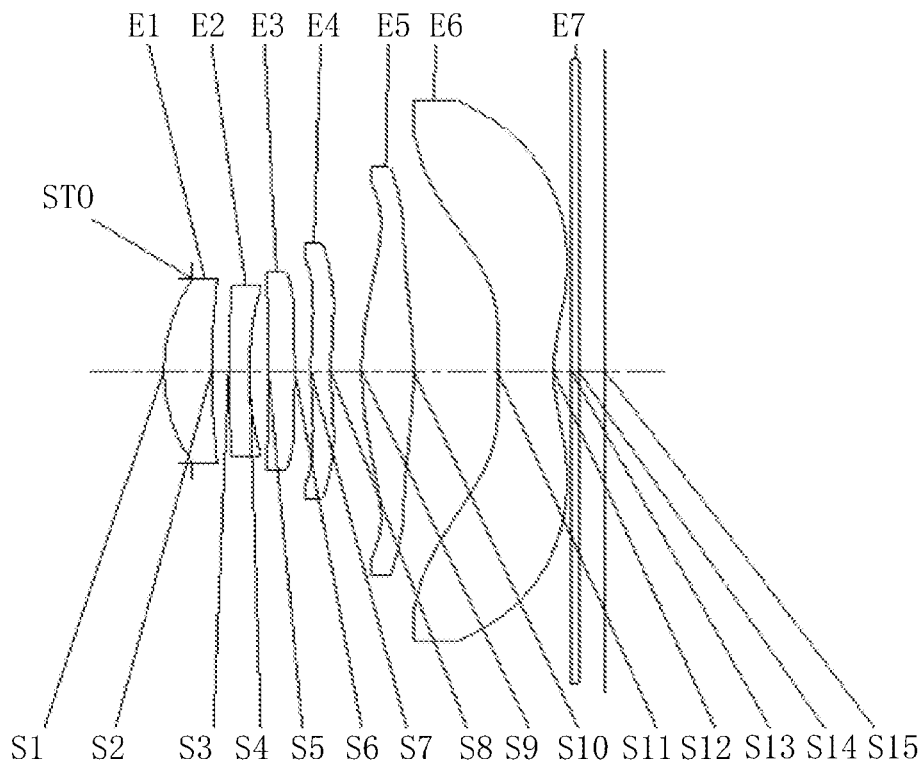

An optical imaging lens assembly according to Embodiment 2 of the disclosure will be described below with reference to FIGS. 5A-8C. In the embodiment and the following embodiments, parts of descriptions similar to those about embodiment are omitted for simplicity. FIGS. 5A-5C show structural schematic diagrams of an optical imaging lens assembly according to Embodiment 2 of the disclosure in three states.

As shown in FIGS. 5A-5C, the optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an electronic photosensitive element (not shown in the figures). The first lens E1 is configured to form a first lens group, and the second lens E2 to the sixth lens E6 are configured to form a second lens group. In the embodiment, the sixth lens E6 is arranged in a manner of moving along the optical axis. An optical filter may further be arranged on the image side of the sixth lens E6.

TABLE 3

| Surface number | A4 | A6 | A8 | A10 | A12 | A14 | A16 |
|---|---|---|---|---|---|---|---|
| S1 | 3.3117E−03 | −1.4552E−03 | −1.4188E−03 | −4.6804E−04 | −2.3855E−04 | −3.5761E−05 | −3.2403E−05 |
| S2 | −2.7474E−02 | 1.0419E−03 | −3.7538E−04 | −3.9676E−05 | −1.7826E−05 | −4.9487E−06 | 2.0323E−06 |
| S3 | 1.6600E−03 | 1.2962E−02 | −3.1426E−03 | −7.3350E−04 | −5.2576E−04 | −2.3778E−04 | −9.4608E−05 |
| S4 | 3.4323E−02 | 1.6638E−02 | 4.4332E−04 | 8.8751E−05 | −2.0719E−04 | −1.9800E−04 | −1.4136E−04 |
| S5 | −1.5483E−01 | −1.9447E−03 | 3.6532E−03 | −4.2680E−04 | −1.0436E−03 | −5.1577E−04 | 9.8388E−05 |
| S6 | −2.0437E−01 | −6.4798E−03 | 4.1471E−03 | 1.0222E−03 | −7.6404E−04 | −6.1140E−04 | −4.8203E−04 |
| S7 | −5.0599E−01 | 9.8222E−03 | −1.8700E−02 | −3.4316E−03 | −3.9869E−03 | −8.9652E−04 | 3.6697E−04 |
| S8 | −7.8558E−01 | 1.0517E−01 | −1.0116E−02 | −2.1269E−04 | −4.9549E−03 | 2.6973E−04 | 1.0902E−03 |
| S9 | −9.1173E−01 | −1.6986E−02 | 3.0927E−02 | 8.1753E−03 | −7.9616E−03 | −7.1612E−04 | 9.0317E−04 |
| S10 | 7.2360E−01 | −1.9453E−01 | 3.9439E−02 | 1.1144E−02 | −7.5482E−03 | 3.7458E−05 | 1.2292E−03 |
| S11 | −1.6923E+00 | 5.8277E−01 | −1.8977E−01 | 4.9413E−02 | −9.8900E−03 | 1.6553E−03 | 2.6147E−04 |
| S12 | −5.1237E+00 | 9.4699E−01 | −2.9077E−01 | 1.2605E−01 | −4.4457E−02 | 1.6874E−02 | −5.7661E−03 |
| Surface number | A18 | A20 | A22 | A24 | A26 | A28 | A30 |
| S1 | 1.1453E−05 | 8.3344E−06 | 1.3112E−05 | 1.2570E−05 | 9.9928E−06 | 2.4793E−06 | −6.1252E−06 |
| S2 | −1.2099E−06 | −2.0350E−07 | −1.9489E−07 | −5.1080E−08 | 5.4468E−08 | 1.8386E−08 | −6.0129E−09 |
| S3 | −4.2358E−06 | 1.8999E−05 | 3.5093E−05 | 2.7788E−05 | 2.1244E−05 | 7.8146E−06 | 5.0389E−06 |
| S4 | −1.0556E−04 | −7.0738E−05 | −5.6791E−05 | −4.5706E−05 | −3.9029E−05 | −2.3535E−05 | −1.3017E−05 |
| S5 | 1.9529E−04 | 1.5182E−04 | 7.0092E−06 | −9.9483E−06 | −1.2226E−05 | 3.2668E−08 | −1.3436E−06 |
| S6 | −3.3039E−04 | −7.7287E−05 | 9.9174E−05 | 1.9377E−04 | 1.8506E−04 | 1.1148E−04 | 3.8373E−05 |
| S7 | 8.6688E−04 | 5.8960E−04 | 3.6541E−04 | 9.8788E−05 | 9.3859E−05 | 2.0994E−05 | 2.4514E−05 |
| S8 | 9.9453E−04 | 1.6215E−04 | −5.1567E−05 | −1.2170E−04 | 7.1194E−05 | 3.8977E−05 | 3.7836E−05 |
| S9 | 1.3018E−04 | −1.2170E−04 | 3.2241E−06 | 3.1926E−06 | 1.0612E−06 | 5.0352E−07 | −2.4539E−07 |
| S10 | −7.5569E−04 | 1.7780E−04 | 7.4656E−07 | −1.1466E−05 | 3.8868E−06 | −1.2654E−06 | 4.9442E−07 |
| S11 | −2.8177E−04 | 4.8538E−05 | 3.9730E−07 | 4.9272E−08 | −1.3265E−08 | −1.2412E−08 | −5.3967E−09 |
| S12 | 3.4467E−03 | −1.4009E−03 | 7.8904E−05 | −2.6712E−05 | 1.8378E−06 | 1.6992E−07 | 2.8844E−06 |

Figure 2A:
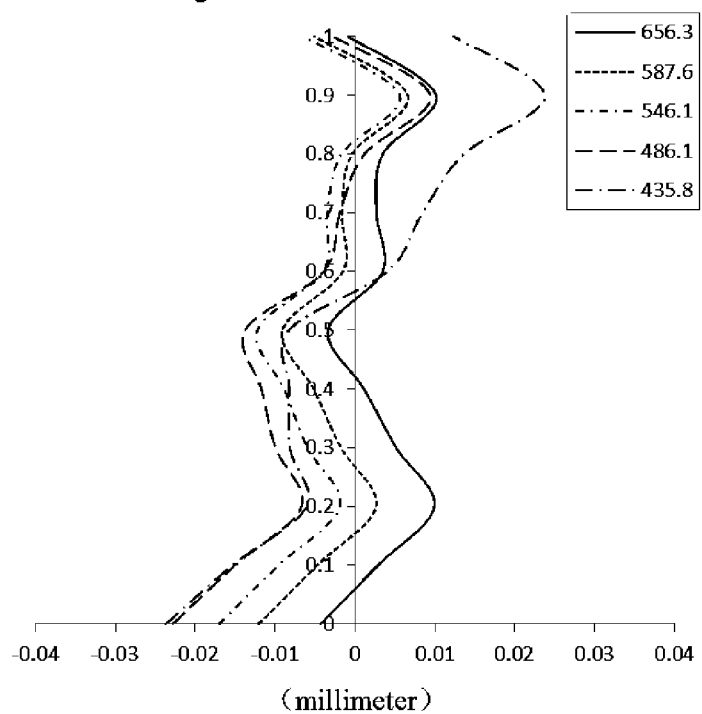
FIGS. 2A-2C show longitudinal aberration curves of the optical imaging lens assembly in FIGS. 1A-1C respectively.
Figure 2B:
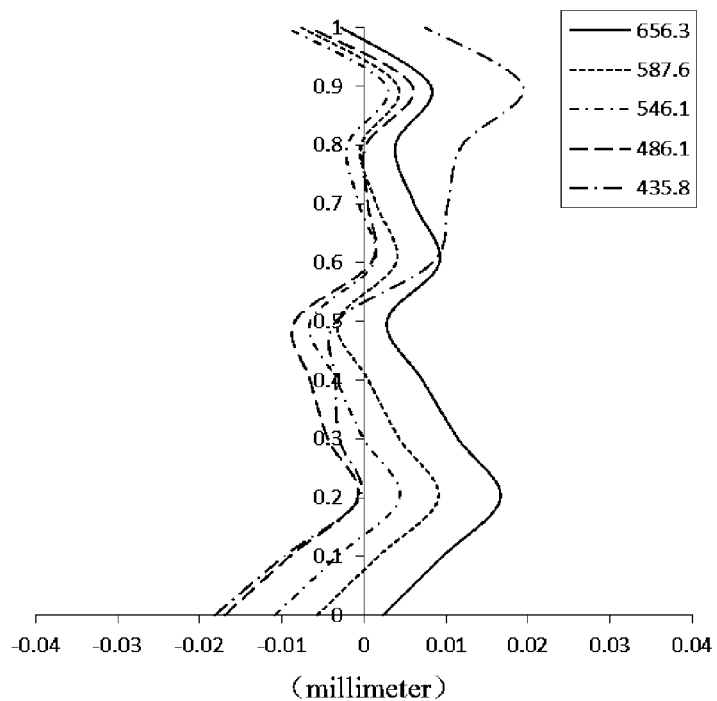
Figure 2C:
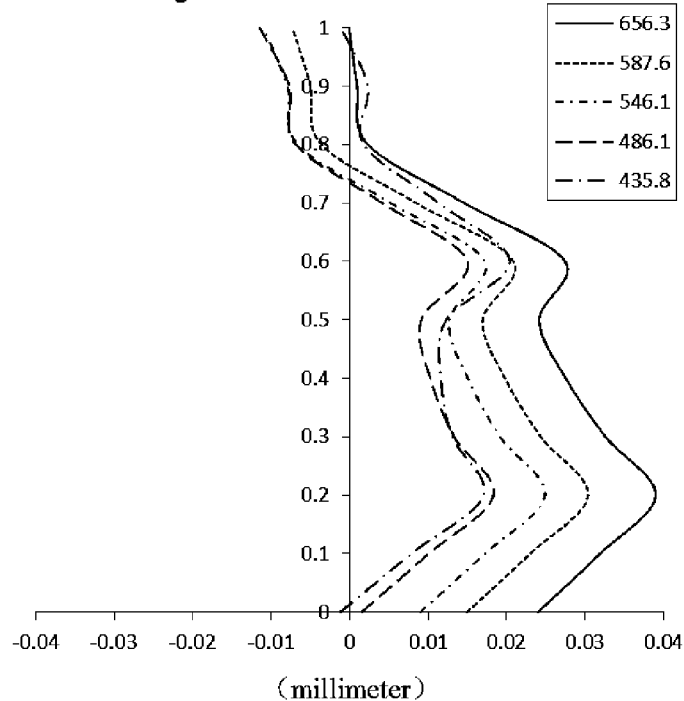
Figure 3A:
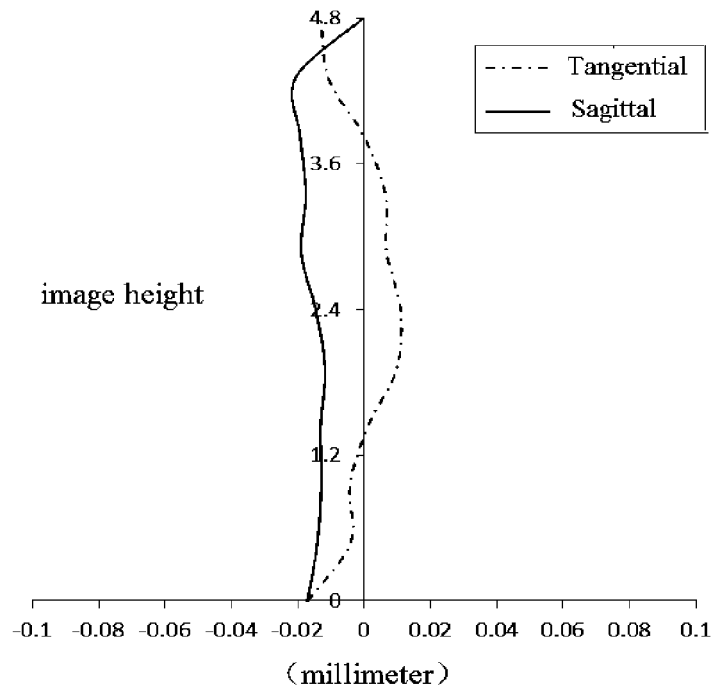
FIGS. 3A-3C show astigmatism curves of the optical imaging lens assembly in FIGS. 1A-1C respectively.
Figure 3B:
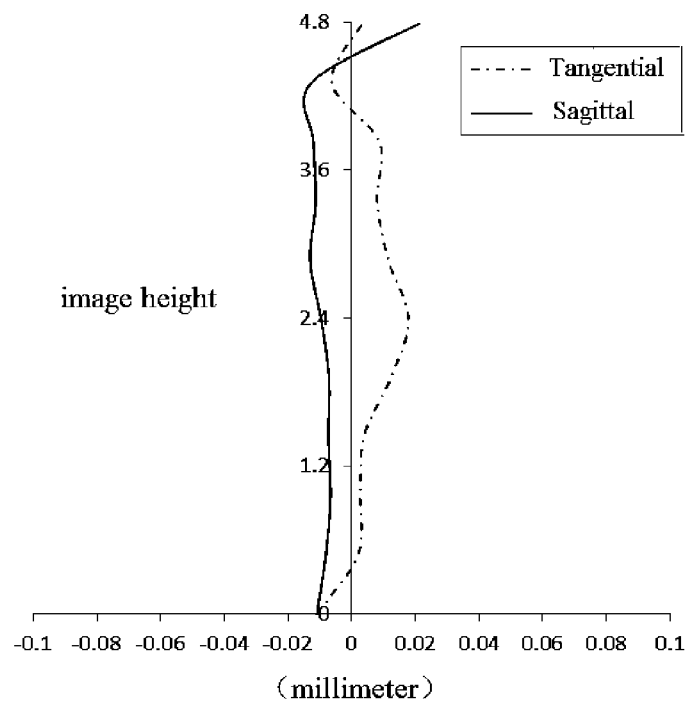
Figure 3C:
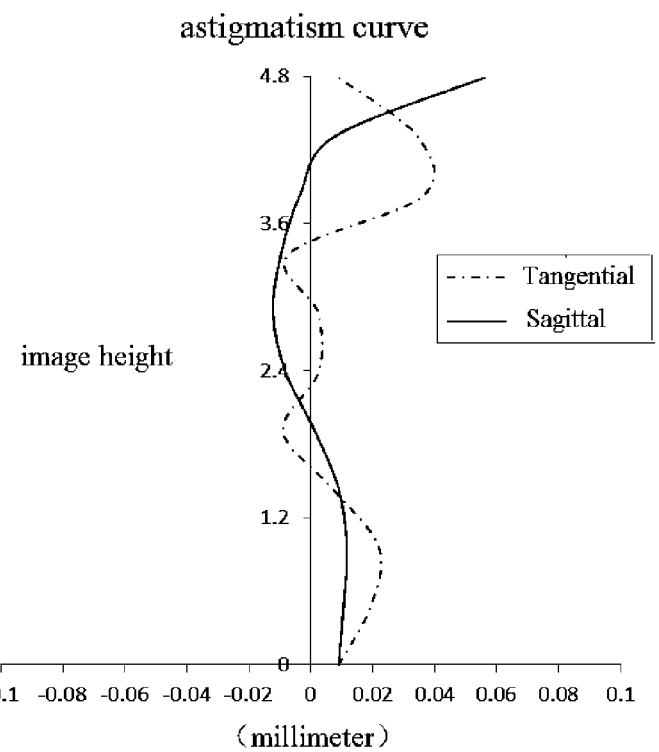
Figure 4A:
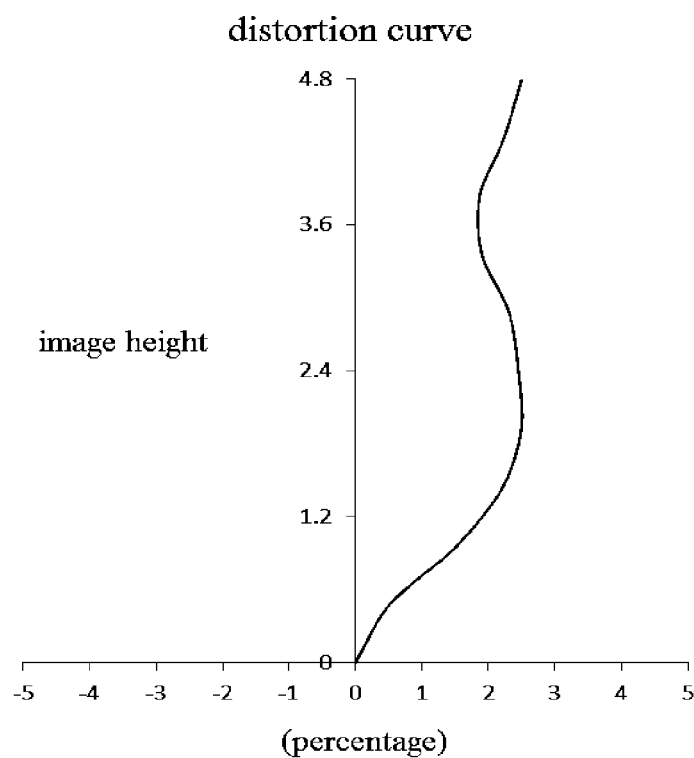
FIGS. 4A-4C show distortion curves of the optical imaging lens assembly in FIGS. 1A-1C respectively.
Figure 4B:
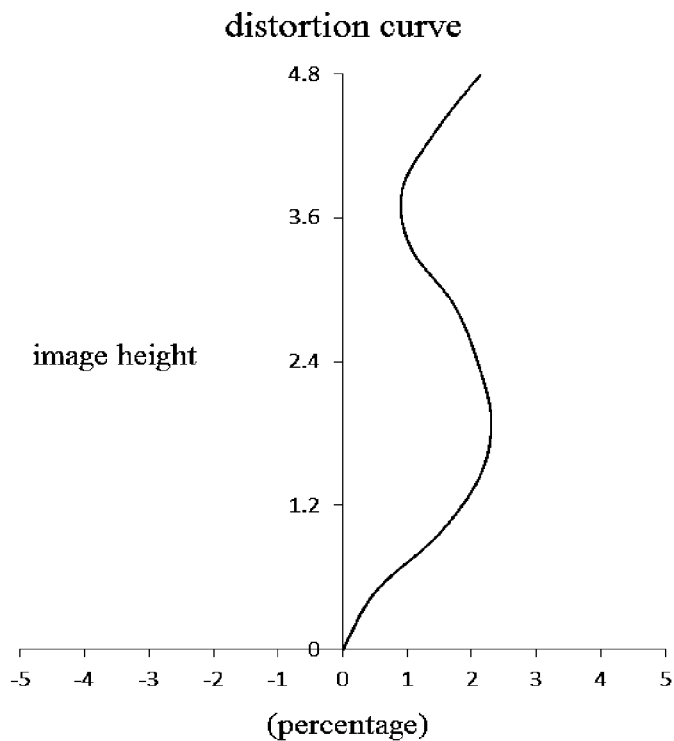
Figure 4C:
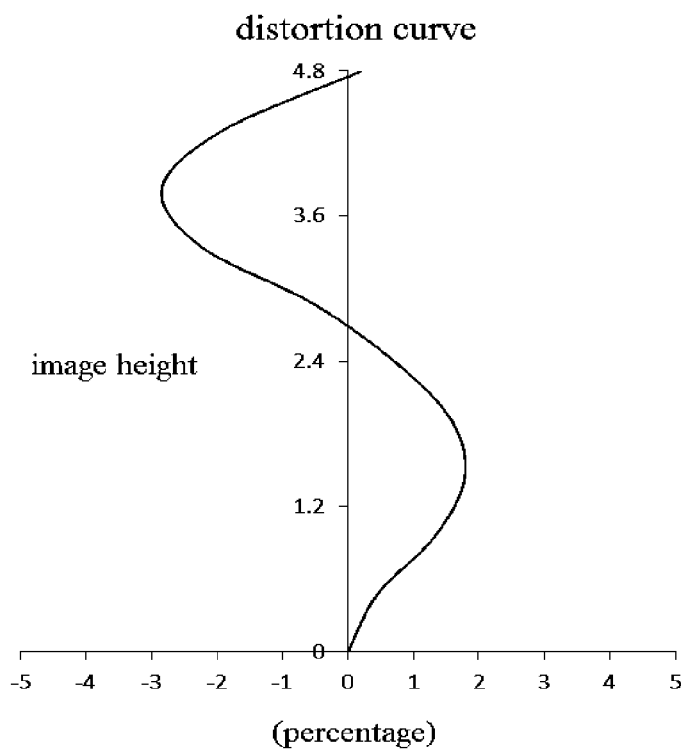

FIGS. 2A-2C show longitudinal aberration curves of the optical imaging lens assembly according to Embodiment 1 in the states that the object distance is infinity, 500 mm and 100 mm to represent deviations of a convergence focal point after light with different wavelengths passes through the lens groups. FIGS. 3A-3C show astigmatism curves of the optical imaging lens assembly according to Embodiment 1 in the three states mentioned above to represent curvatures of tangential image surface and curvatures of sagittal image surface. FIGS. 4A-4C show distortion curves of the optical imaging lens assembly according to Embodiment 1 in the three states mentioned above to represent distortion values corresponding to different image heights. According to FIGS. 2A-4C, it can be seen that the optical imaging lens The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface.

The optical filter E7 has an object-side surface S13 and an image-side surface S14. Light from an object sequentially penetrates through each of the surfaces S1 to S14 and is finally imaged on the electronic photosensitive element. Specifically, a surface where an effective pixel region of the electronic photosensitive element is located is taken as a practical imaging surface S15 of the optical imaging lens assembly.

Table 4 shows a basic parameter table of the optical imaging lens assembly of Embodiment 2, wherein the units of the curvature radius, the thickness/distance and the focal length are all millimeters (mm). Table 5 shows a related parameter table of the optical imaging lens assembly according to Embodiment 2 in the three states, wherein the units of TTL, f and ImgH are all millimeters (mm). Table 6 shows high-order coefficients applied to each aspheric mirror surface in Embodiment 2. A surface type of each aspheric surface may be defined by the formula (1) given in Embodiment 1.

TABLE 4

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | OD | | | | |
| STO | Spherical | Infinite | −0.4277 | | | | |
| S1 | Aspheric | 2.4013 | 0.7248 | 1.55 | 56.1 | 5.69 | 0.0361 |
| S2 | Aspheric | 9.4236 | T1 | | | | 18.0152 |
| S3 | Aspheric | 13.2385 | 0.3139 | 1.68 | 19.2 | −12.32 | −81.7270 |
| S4 | Aspheric | 5.0784 | T2 | | | | 2.2077 |
| S5 | Aspheric | 42.7428 | 0.3947 | 1.57 | 37.3 | 63.04 | 50.0000 |
| S6 | Aspheric | −227.9466 | T3 | | | | 50.0000 |
| S7 | Aspheric | 5.6419 | 0.3010 | 1.62 | 25.9 | −45.47 | −16.7805 |
| S8 | Aspheric | 4.6057 | T4 | | | | −4.7663 |
| S9 | Aspheric | 4.9118 | 0.7780 | 1.55 | 56.1 | 5.54 | −0.1818 |
| S10 | Aspheric | −7.4532 | T5 | | | | 2.6326 |
| S11 | Aspheric | 7.5197 | 0.8449 | 1.54 | 55.7 | −6.11 | −99.0000 |
| S12 | Aspheric | 2.1956 | T6 | | | | −1.0207 |
| S13 | Spherical | Infinite | 0.1100 | 1.52 | 64.2 | | |
| S14 | Spherical | Infinite | 0.4000 | | | | |
| S15 | Spherical | Infinite | | | | | |

TABLE 5

| OD | Infinity | 500.0000 | 100.0000 |
|---|---|---|---|
| T1 | 0.2533 | ← | ← |
| T2 | 0.2848 | ← | ← |
| T3 | 0.2436 | ← | ← |
| T4 | 0.4650 | ← | ← |
| T5 | 0.8243 | 0.9189 | 1.2652 |
| T6 | 0.7078 | 0.6130 | 0.2701 |
| TTL | 6.65 | ← | ← |
| FOV(°) | 83.6 | 84.2 | 67.1 |

TABLE 5-continued

| OD | Infinity | 500.0000 | 100.0000 |
|---|---|---|---|
| f | 5.23 | 5.14 | 4.83 |
| ImgH | 4.79 | ← | ← |

In the embodiment, the distance from the sixth lens E6 to the first lens E1 on the optical axis is longer when the optical imaging lens assembly is in the state that an object distance is 100 mm, compared with that when the optical imaging lens assembly is in the state that the object distance is infinity.

TABLE 6

| Surface number | A4 | A6 | A8 | A10 | A12 | A14 | A16 |
|---|---|---|---|---|---|---|---|
| S1 | 5.6323E−03 | −1.3911E−03 | −1.7053E−03 | −8.0875E−04 | −3.2762E−04 | −4.6040E−05 | 2.1543E−05 |
| S2 | −3.6609E−02 | 1.1499E−03 | 7.8915E−05 | −7.2416E−05 | −1.6547E−05 | −1.3050E−04 | −4.1413E−06 |
| S3 | 1.4404E−02 | 1.5022E−02 | −2.5301E−03 | −5.9227E−04 | −5.6635E−04 | −3.6111E−04 | 6.7673E−05 |
| S4 | 4.1525E−02 | 1.8952E−02 | 2.2231E−05 | 3.6785E−04 | −2.7011E−05 | −2.2856E−04 | −1.5634E−04 |
| S5 | −1.6950E−01 | −4.9700E−03 | 4.3437E−03 | −1.1491E−03 | −6.5068E−04 | −3.2983E−04 | −4.1250E−04 |
| S6 | −2.6364E−01 | −6.3114E−03 | 1.2798E−02 | −2.0595E−03 | −2.7310E−03 | 1.1047E−05 | 3.7142E−04 |
| S7 | −5.8152E−01 | 5.1036E−03 | −2.1839E−02 | −4.0192E−03 | −4.2126E−03 | −1.6571E−03 | 1.0016E−03 |
| S8 | −8.7819E−01 | 1.4211E−01 | −2.5441E−02 | −2.2149E−03 | −1.5450E−03 | −2.1767E−04 | 7.5063E−04 |
| S9 | −1.1399E+00 | −5.3249E−02 | 4.7966E−02 | 8.5331E−03 | −4.6877E−03 | 2.2025E−04 | 3.3401E−04 |
| S10 | 6.7735E−01 | −1.6080E−01 | 4.6446E−02 | 9.4382E−03 | −2.1978E−02 | 7.1815E−03 | 5.0823E−04 |

TABLE 6-continued

| | | | | | | | |
|---|---|---|---|---|---|---|---|
| S11 | −1.9918E+00 | 7.0994E−01 | −2.0921E−01 | 5.3230E−02 | −1.2760E−02 | 2.1649E−03 | 2.6560E−04 |
| S12 | −6.0991E+00 | 9.2169E−01 | −3.7685E−01 | 1.1768E−01 | −4.8195E−02 | 1.9924E−02 | −3.3303E−03 |

| Surface number | A18 | A20 | A22 | A24 | A26 | A28 | A30 |
|---|---|---|---|---|---|---|---|
| S1 | −3.4468E−05 | −7.9048E−05 | −5.8084E−05 | 4.9596E−06 | 3.4149E−05 | 3.0519E−05 | −6.0286E−06 |
| S2 | 2.5904E−05 | 9.7822E−05 | 6.4978E−05 | 3.1247E−05 | −2.0863E−05 | −1.1788E−05 | −9.3568E−06 |
| S3 | −6.8649E−05 | −5.5237E−05 | −6.9369E−05 | 1.5683E−05 | 2.2114E−05 | 2.8399E−05 | −5.8122E−06 |
| S4 | −1.6481E−05 | 4.7650E−05 | 2.2030E−05 | −4.5477E−05 | −6.9240E−05 | −5.6566E−05 | −2.0556E−05 |
| S5 | 1.9934E−04 | 3.8266E−04 | 2.0713E−04 | −1.6757E−04 | −1.6423E−04 | −5.7753E−05 | 3.0791E−05 |
| S6 | −3.8047E−04 | −5.8182E−04 | −1.2497E−05 | 3.3515E−04 | 3.6636E−04 | 1.4280E−04 | 3.2698E−05 |
| S7 | 1.1285E−04 | 7.0566E−04 | 3.3357E−04 | 1.5067E−04 | 1.0197E−04 | 5.8528E−05 | 4.1931E−05 |
| S8 | 5.5753E−04 | 2.9416E−04 | −2.8668E−05 | −1.0936E−04 | −1.4009E−04 | −6.5711E−05 | −1.3913E−05 |
| S9 | −6.1156E−05 | 2.5993E−04 | −1.2905E−04 | −1.3588E−05 | −6.9923E−05 | 3.6380E−05 | 1.3996E−05 |
| S10 | 1.0453E−03 | 1.9123E−03 | 8.1309E−04 | 9.1145E−04 | 2.9277E−04 | −1.5448E−06 | 2.0000E−07 |
| S11 | −2.9744E−04 | 5.2680E−05 | 2.5274E−06 | 5.7048E−07 | 1.2436E−07 | −3.0207E−08 | −5.7300E−08 |
| S12 | 6.2853E−03 | 1.5106E−03 | 9.8338E−04 | 7.0839E−04 | 2.7157E−05 | 2.8052E−04 | −3.9925E−04 |

Figure 6A:
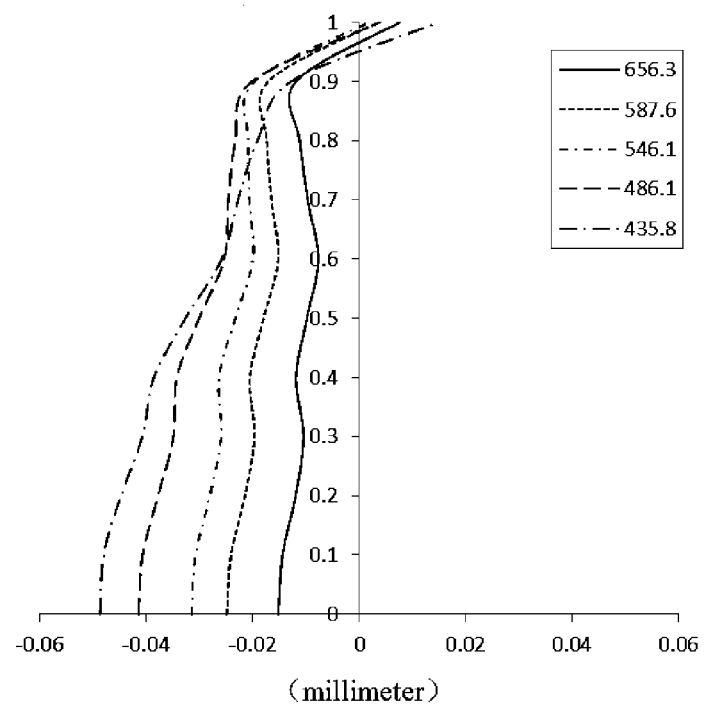
FIGS. 6A-6C show longitudinal aberration curves of the optical imaging lens assembly in FIGS. 5A-5C respectively.
Figure 6B:
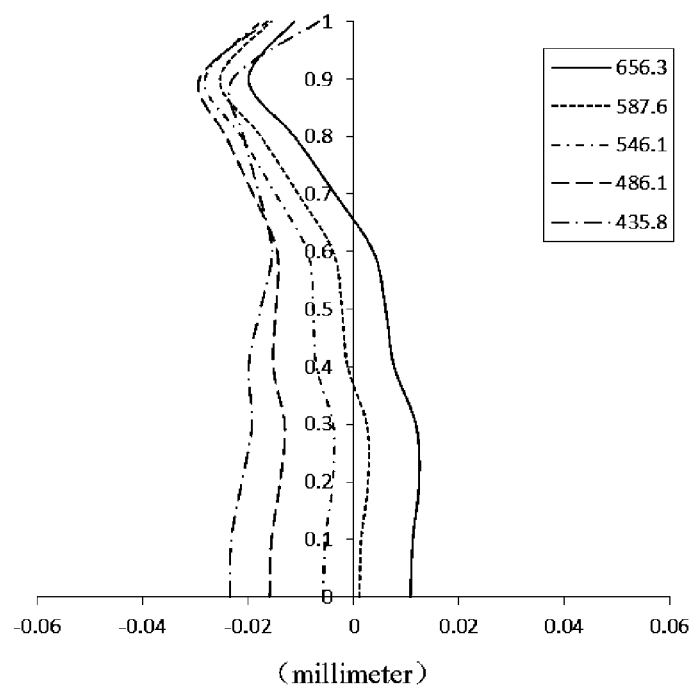
Figure 6C:
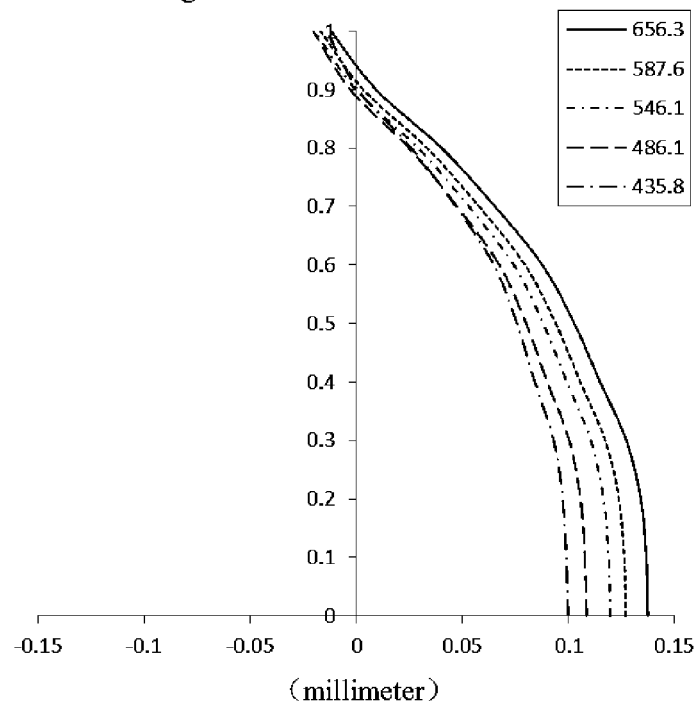
Figure 7A:
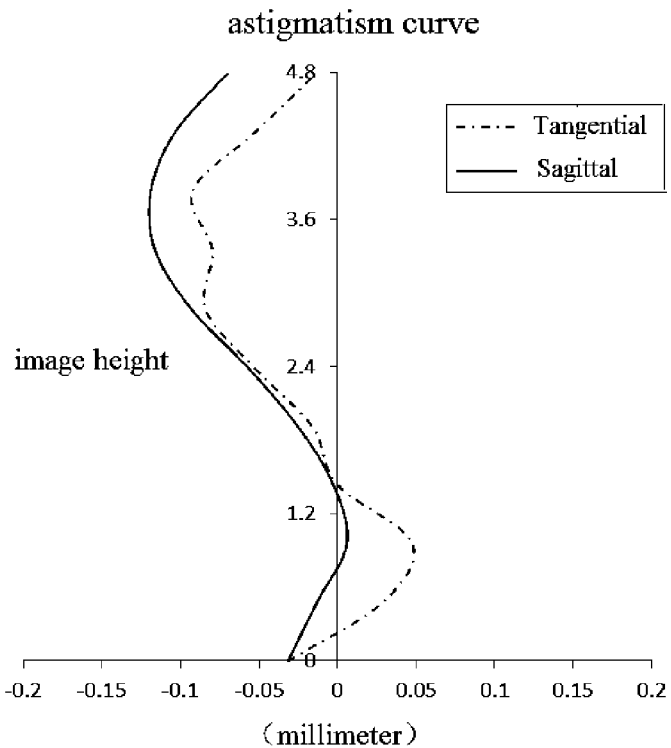
FIGS. 7A-7C show astigmatism curves of the optical imaging lens assembly in FIGS. 5A-5C respectively.
Figure 7B:
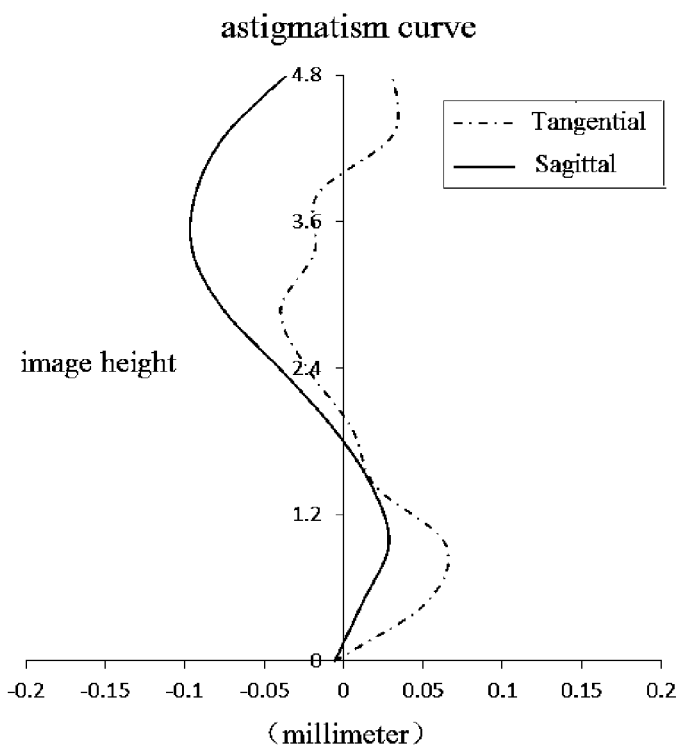
Figure 7C:
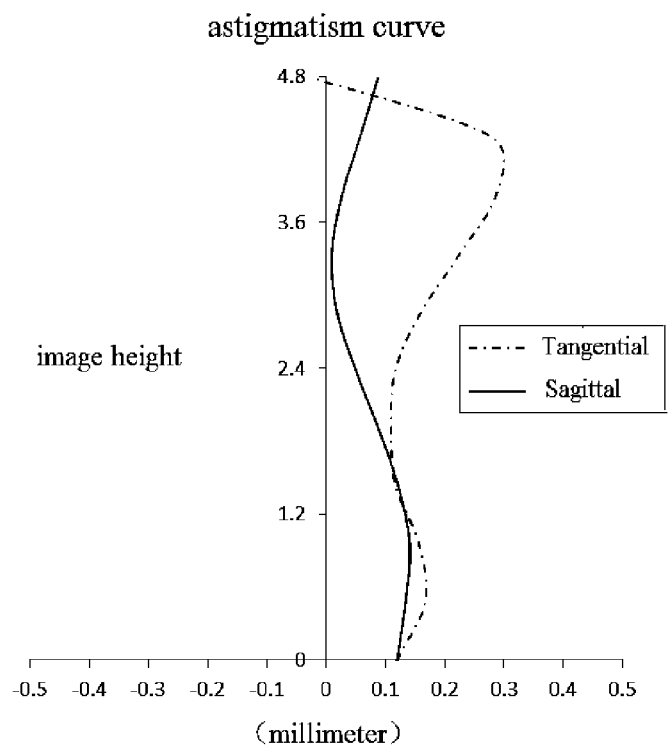
Figure 8A:
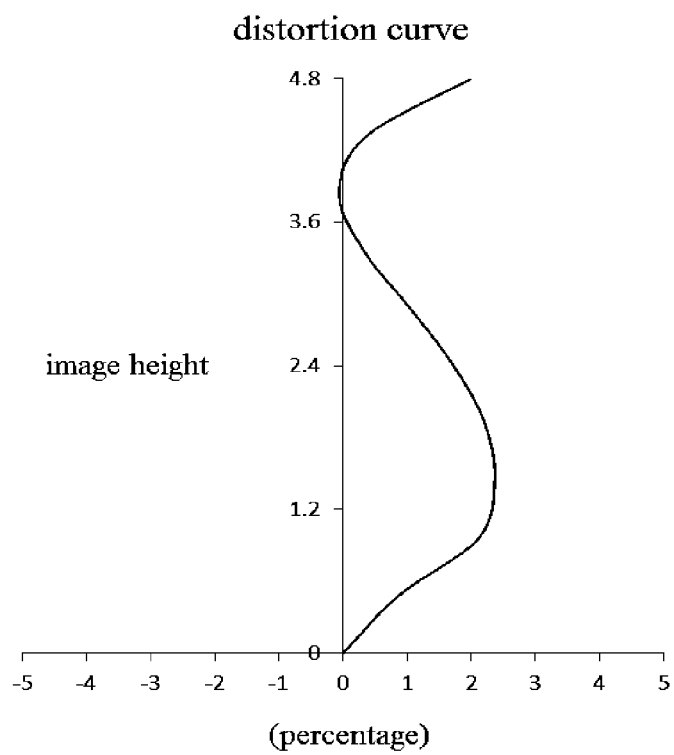
FIGS. 8A-8C show distortion curves of the optical imaging lens assembly in FIGS. 5A-5C respectively.
Figure 8B:
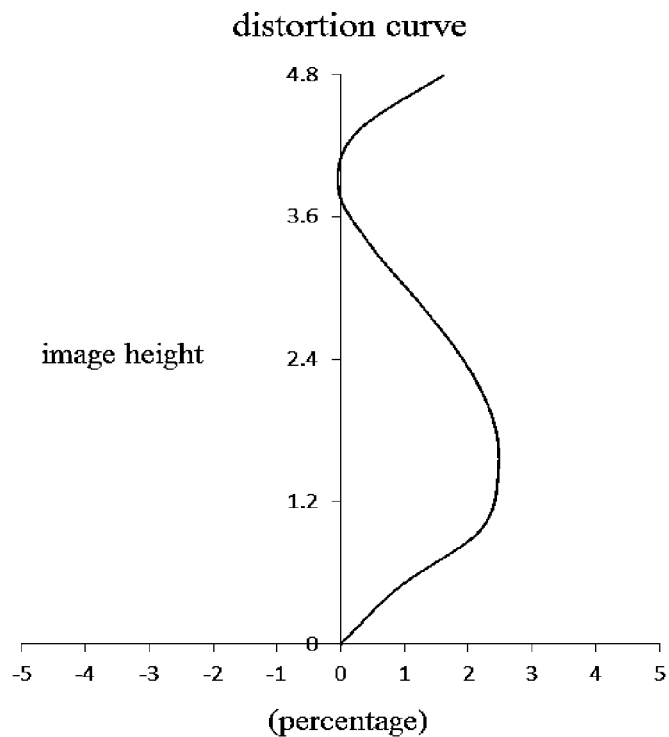
Figure 8C:
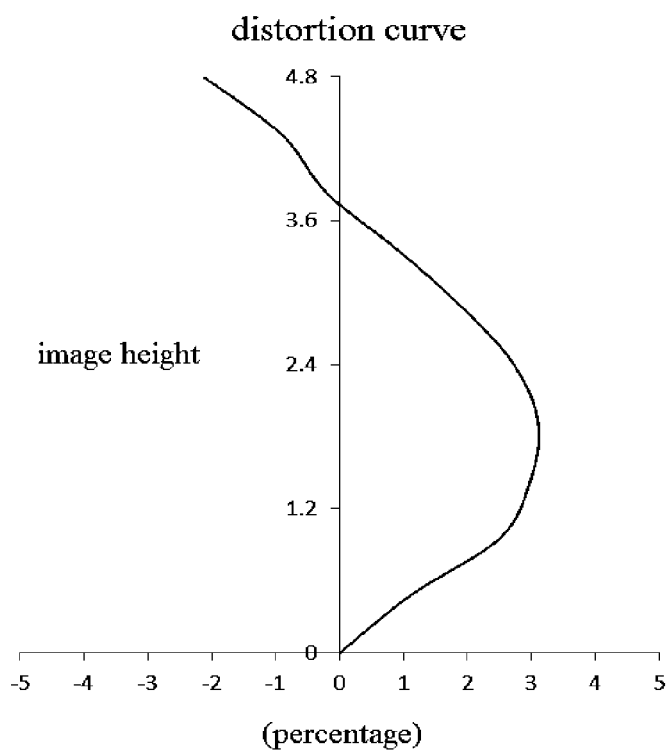

FIGS. 6A-6C show longitudinal aberration curves of the optical imaging lens assembly according to Embodiment 2 in the states that the object distance is infinity, 500 mm and 100 mm to represent deviations of a convergence focal point after light with different wavelengths passes through the lens groups. FIGS. 7A-7C show astigmatism curves of the optical imaging lens assembly according to Embodiment 2 in the three states mentioned above to represent curvatures of tangential image surface and curvatures of sagittal image surface. FIGS. 8A-8C show distortion curves of the optical imaging lens assembly according to Embodiment 2 in the three states mentioned above to represent distortion values corresponding to different image heights. According to FIGS. 6A-8C, it can be seen that the optical imaging lens assembly provided in Embodiment 2 and a camera lens with the optical imaging lens assembly may achieve good imaging quality.

Embodiment 3

Figure 9A:
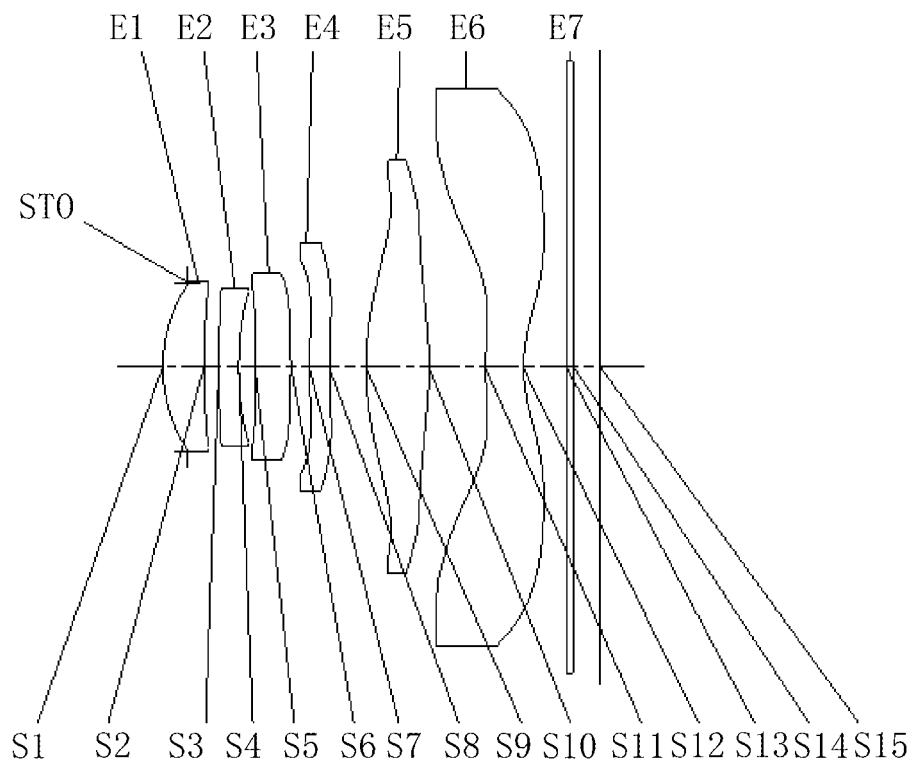
FIGS. 9A-9C show structural schematic diagrams of an optical imaging lens assembly according to Embodiment 3 of the disclosure in a state that an object distance is infinity, a state that the object distance is 500 mm and a state that the object distance is 100 mm.
Figure 9B:
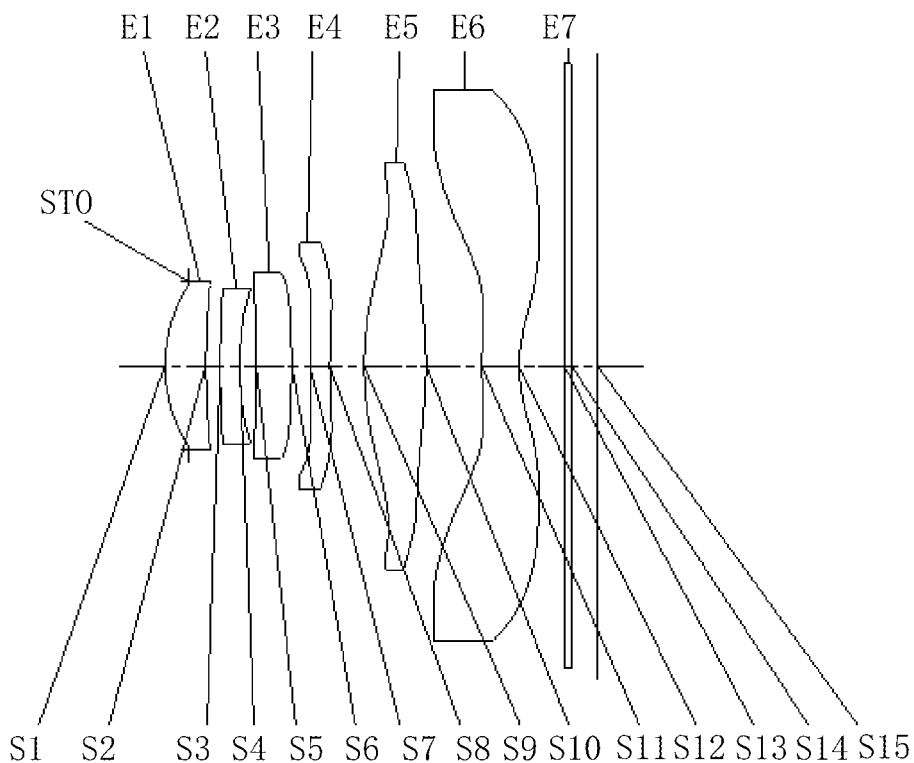
Figure 9C:
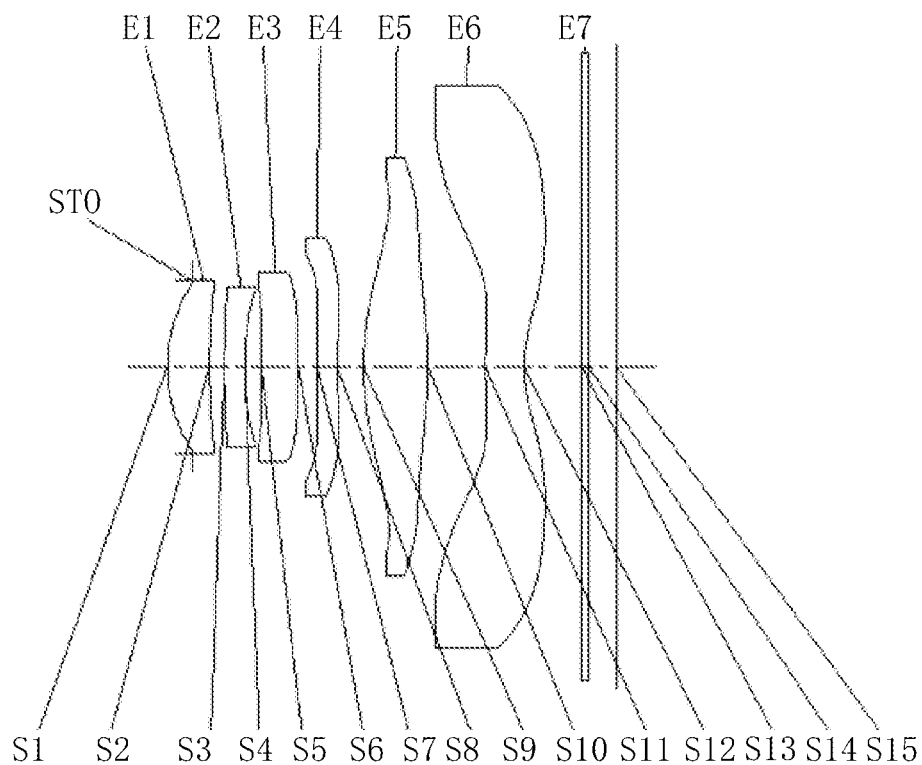

An optical imaging lens assembly according to Embodiment 3 of the disclosure will be described below with reference to FIGS. 9A-12C. FIGS. 9A-9C show structural schematic diagrams of an optical imaging lens assembly according to Embodiment 3 of the disclosure in three states.

As shown in FIGS. 9A-9C, the optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an electronic photosensitive element (not shown in the figures). The first lens E1 is configured to form a first lens group, and the second lens E2 to the sixth lens E6 are configured to form a second lens group. In the embodiment, the fifth lens E5 and the sixth lens E6 are arranged in a manner of moving along the optical axis. In the embodiment, the optical filter E7 and the electronic photosensitive element are also arranged in the manner of moving along the optical axis. An optical filter may further be arranged on the image side of the sixth lens E6.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface.

The optical filter E7 has an object-side surface S13 and an image-side surface S14. Light from an object sequentially penetrates through each of the surfaces S1 to S14 and is finally imaged on the electronic photosensitive element. Specifically, a surface where an effective pixel region of the electronic photosensitive element is located is taken as a practical imaging surface S15 of the optical imaging lens assembly.

Table 7 shows a basic parameter table of the optical imaging lens assembly of Embodiment 3, wherein the units of the curvature radius, the thickness/distance and the focal length are all millimeters (mm). Table 8 shows a related parameter table of the optical imaging lens assembly in the three states, wherein the units of TTL, f and ImgH are all millimeters (mm). Table 9 shows high-order coefficients applied to each aspheric mirror surface in Embodiment 3. A surface type of each aspheric surface may be defined by the formula (1) given in Embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | OD | | | | |
| STO | Spherical | Infinite | −0.3765 | | | | |
| S1 | Aspheric | 2.3125 | 0.6246 | 1.55 | 56.1 | 5.53 | 0.0174 |
| S2 | Aspheric | 8.9170 | T1 | | | | 16.8711 |
| S3 | Aspheric | 12.0350 | 0.3000 | 1.68 | 19.2 | −12.18 | −89.0616 |

TABLE 7-continued

| Surface number | Surface type | Curvature radius | Thickness/ distance | Material Refractive index | Abbe number | Focal length | Conic coefficient |
|---|---|---|---|---|---|---|---|
| S4 | Aspheric | 4.8536 | T2 | | | | 2.5557 |
| S5 | Aspheric | 540.5978 | 0.5443 | 1.57 | 37.3 | 50.19 | 50.0000 |
| S6 | Aspheric | −30.2623 | T3 | | | | 50.0000 |
| S7 | Aspheric | 6.6968 | 0.3000 | 1.62 | 25.9 | −33.91 | −20.4288 |
| S8 | Aspheric | 4.9930 | T4 | | | | −3.0222 |
| S9 | Aspheric | 4.4604 | 0.9553 | 1.55 | 56.1 | 5.12 | 0.0206 |
| S10 | Aspheric | −6.9366 | T5 | | | | 2.1373 |
| S11 | Aspheric | 4.2721 | 0.5709 | 1.54 | 55.7 | −6.95 | −18.8962 |
| S12 | Aspheric | 1.8992 | T6 | | | | −1.0001 |
| S13 | Spherical | Infinite | 0.1100 | 1.52 | 64.2 | | |
| S14 | Spherical | Infinite | 0.4000 | | | | |
| S15 | Spherical | Infinite | | | | | |

TABLE 8

| OD | Infinity | 500.0000 | 100.0000 |
|---|---|---|---|
| T1 | 0.2229 | ← | ← |
| T2 | 0.2502 | ← | ← |
| T3 | 0.2757 | ← | ← |
| T4 | 0.5542 | 0.5233 | 0.3921 |
| T5 | 0.8479 | ← | ← |
| T6 | 0.6614 | 0.6939 | 0.8598 |
| TTL | 6.62 | ← | 6.65 |
| FOV(°) | 84.2 | 88.1 | 89.0 |
| f | 5.14 | 4.85 | 4.81 |
| ImgH | 4.79 | ← | ← |

In the embodiment, distances from the fifth lens E5 and the sixth lens E6 to the first lens E1 on the optical axis are shorter when the optical imaging lens assembly is in the state that an object distance is 100 mm, compared with those when the optical imaging lens assembly is in the state that the object distance is infinity. A distance from the imaging surface S15 to the first lens E1 on the optical axis is longer when the optical imaging lens assembly is in the state that the object distance is 100 mm, compared with that when the optical imaging lens assembly is in the state that the object distance is infinity.

TABLE 9

| Surface number | A4 | A6 | A8 | A10 | A12 | A14 | A16 |
|---|---|---|---|---|---|---|---|
| S1 | 3.0201E−03 | 8.8475E−04 | −2.4784E−03 | −4.0181E−04 | −4.7458E−04 | 1.2030E−04 | −9.8110E−05 |
| S2 | −3.5937E−02 | 1.3715E−03 | 6.2265E−04 | −8.2781E−05 | 1.6578E−04 | −1.5474E−04 | 6.6009E−05 |
| S3 | −5.9289E−04 | 1.5106E−02 | −2.8625E−03 | −1.8337E−04 | −7.2110E−04 | −2.4915E−04 | −4.4471E−05 |
| S4 | 4.1527E−02 | 1.5815E−02 | 2.0855E−04 | 5.6120E−04 | −2.2377E−04 | −1.8302E−04 | −8.1110E−05 |
| S5 | −1.5996E−01 | −7.2388E−03 | 4.4182E−03 | −4.8273E−04 | −9.3878E−04 | −4.9106E−04 | −2.2754E−04 |
| S6 | −2.5641E−01 | −4.3408E−03 | 1.2416E−02 | −1.8231E−03 | −2.7942E−03 | −2.9831E−04 | 7.3152E−04 |
| S7 | −5.6121E−01 | 1.2252E−02 | −1.9272E−02 | −4.6867E−03 | −4.9952E−03 | −1.4572E−03 | 1.4773E−03 |
| S8 | −8.1999E−01 | 1.1104E−01 | −3.5294E−02 | 3.2765E−03 | 5.0428E−04 | 6.6955E−04 | −5.8643E−04 |
| S9 | −1.0258E+00 | −4.1590E−02 | 8.0965E−03 | 4.7797E−03 | −2.2367E−03 | 2.0320E−03 | 3.0682E−03 |
| S10 | 7.4847E−01 | −1.5039E−01 | 4.7039E−02 | 1.8706E−02 | −1.4880E−02 | −1.5814E−03 | −2.0013E−03 |
| S11 | −1.7863E+00 | 6.5219E−01 | −2.0830E−01 | 5.4675E−02 | −1.0846E−02 | 1.8176E−03 | 2.8211E−04 |
| S12 | −5.7248E+00 | 1.1055E+00 | −3.9677E−01 | 1.3746E−01 | −4.5397E−02 | 1.2338E−02 | −4.9221E−03 |

| Surface number | A18 | A20 | A22 | A24 | A26 | A28 | A30 |
|---|---|---|---|---|---|---|---|
| S1 | −2.3905E−05 | −1.0971E−04 | 3.9326E−05 | 5.1271E−06 | 2.8443E−06 | −1.9328E−06 | 2.8919E−05 |
| S2 | 5.4906E−06 | 1.2524E−04 | 1.3769E−05 | −4.1756E−05 | −1.5487E−04 | −1.2903E−04 | −9.4086E−05 |
| S3 | 3.0342E−06 | −5.3690E−05 | −4.8080E−05 | −2.9841E−05 | 4.0302E−05 | 4.4358E−05 | 2.7417E−05 |
| S4 | 4.6731E−05 | 1.3499E−05 | −3.1855E−05 | −5.9618E−05 | −3.0835E−05 | −6.5322E−06 | −5.3818E−06 |
| S5 | 2.4933E−04 | 3.3664E−04 | 6.5176E−05 | −1.3525E−04 | −7.7824E−05 | 2.3479E−05 | 4.0406E−05 |
| S6 | −3.0798E−04 | −4.9290E−04 | −2.7135E−04 | 2.9060E−04 | 4.3046E−04 | 2.9673E−04 | 7.3738E−05 |
| S7 | 8.6169E−04 | 9.6888E−04 | 4.0211E−04 | −4.0463E−05 | −3.6527E−04 | −2.6858E−04 | −1.4659E−04 |
| S8 | −8.4362E−04 | 4.3996E−04 | 7.8645E−04 | 3.4995E−04 | 2.7722E−05 | −5.4402E−05 | −4.5969E−05 |
| S9 | 1.2513E−03 | −1.0317E−03 | −3.3182E−04 | 3.8157E−04 | −1.9776E−04 | −1.0041E−03 | −4.6233E−04 |
| S10 | 2.4108E−03 | −1.1130E−03 | 1.6533E−04 | 1.0458E−03 | 1.0873E−03 | −7.4185E−04 | −5.7768E−04 |
| S11 | −3.1638E−04 | 5.1297E−05 | −1.2911E−06 | −6.8211E−07 | −1.4413E−07 | 8.4357E−09 | 6.3789E−08 |
| S12 | 2.7305E−03 | 1.1430E−03 | −3.3216E−04 | −5.2960E−04 | −1.3515E−03 | −4.1396E−04 | 8.1269E−04 |

Figure 10A:
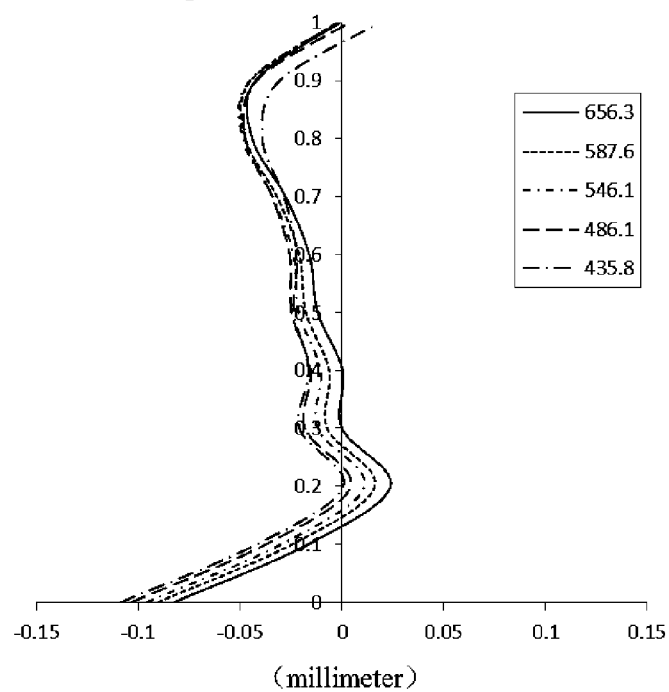
FIGS. 10A-10C show longitudinal aberration curves of the optical imaging lens assembly in FIGS. 9A-9C respectively.
Figure 10B:
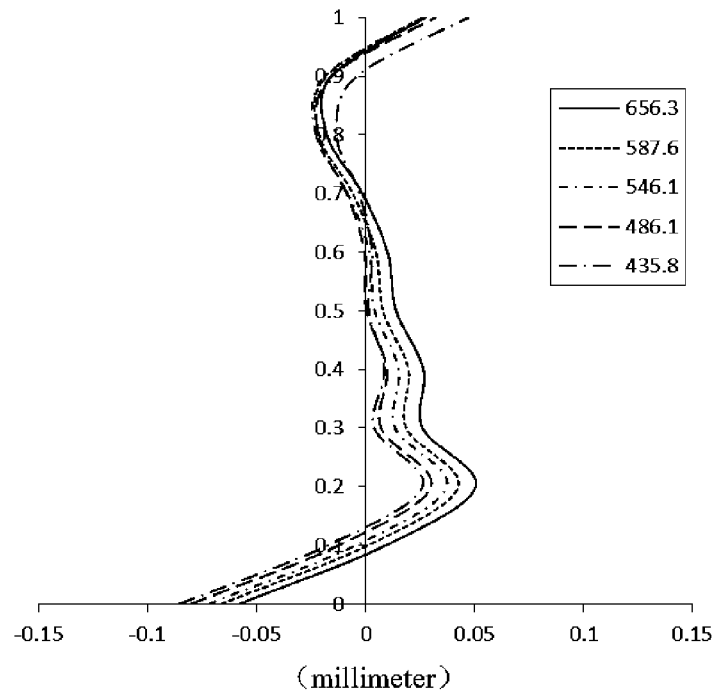
Figure 10C:
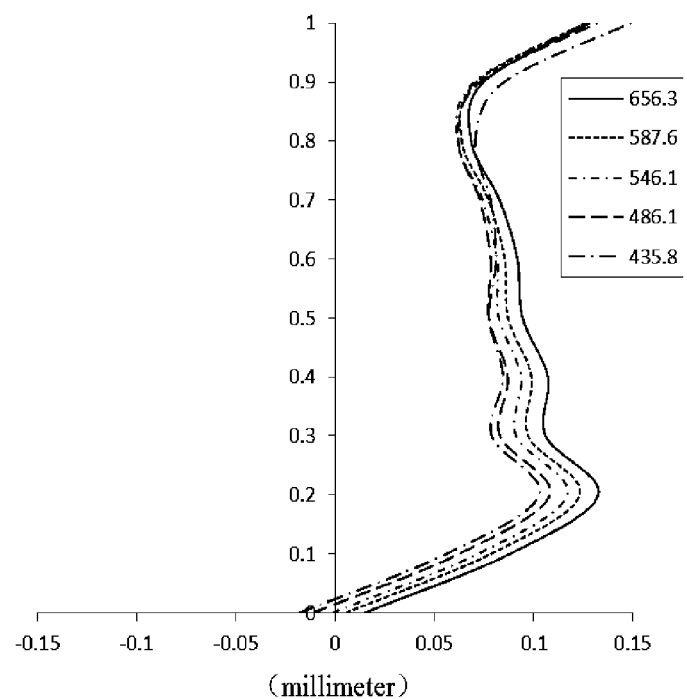
Figure 11A:
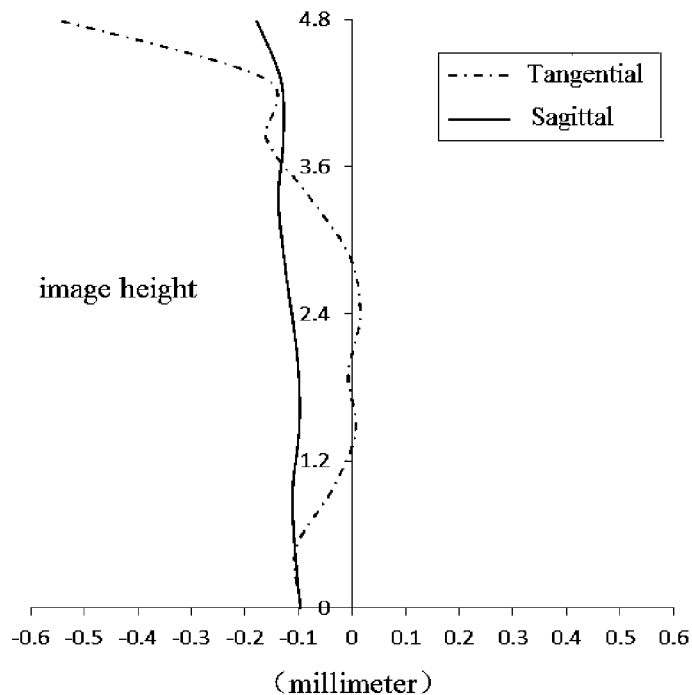
FIGS. 11A-11C show astigmatism curves of the optical imaging lens assembly in FIGS. 9A-9C respectively.
Figure 11B:
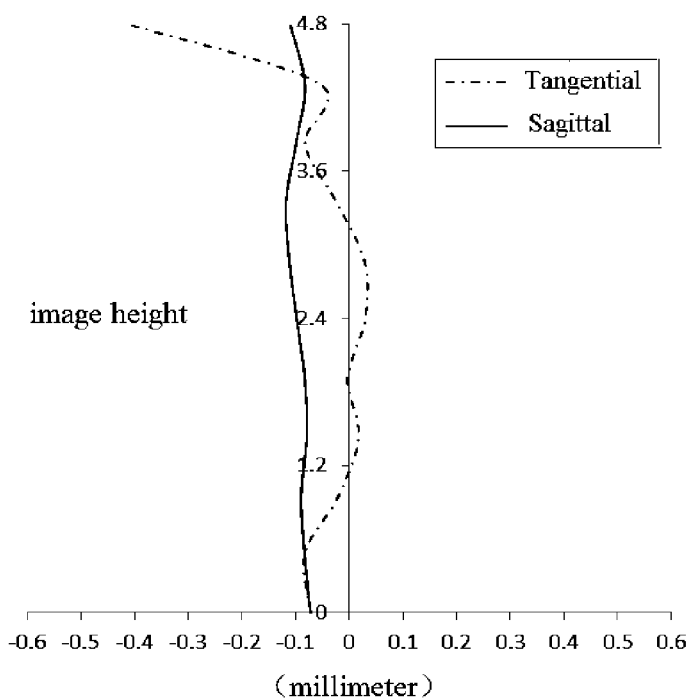
Figure 11C:
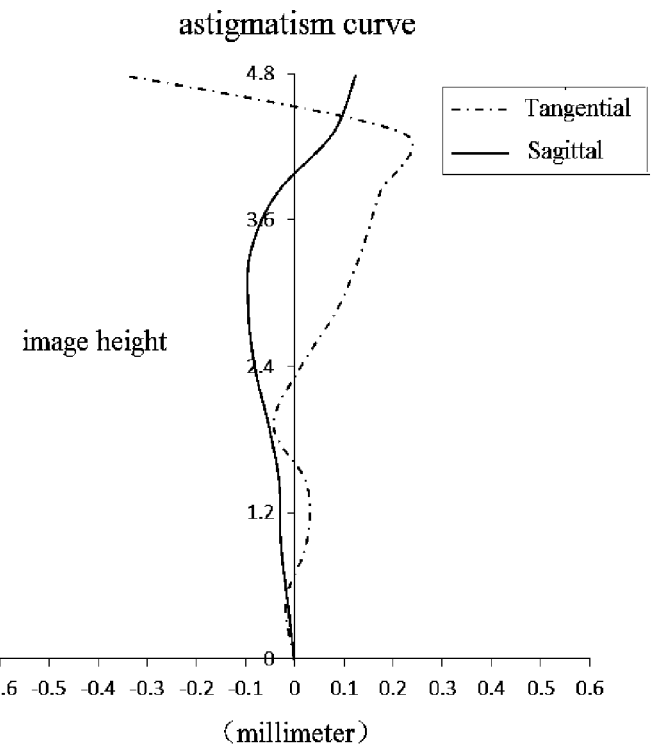
Figure 12A:
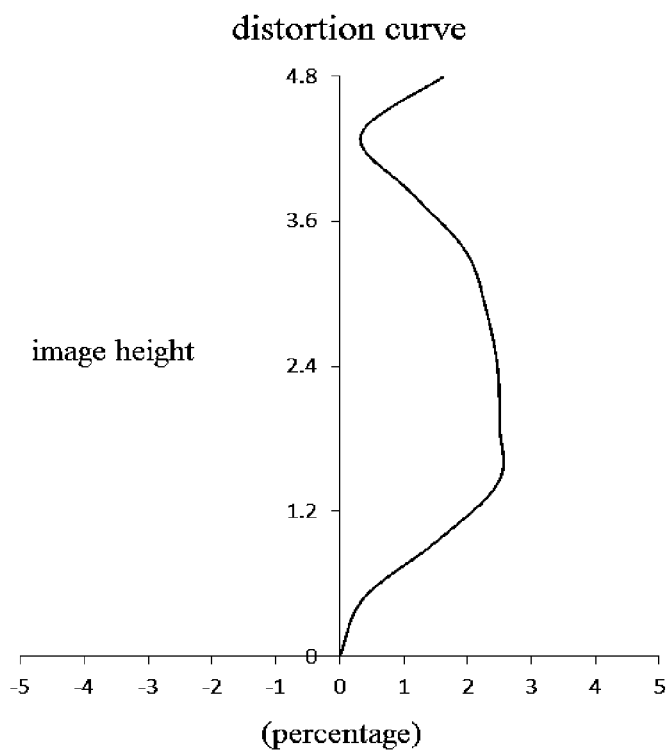
FIGS. 12A-12C show distortion curves of the optical imaging lens assembly in FIGS. 9A-9C respectively.
Figure 12B:
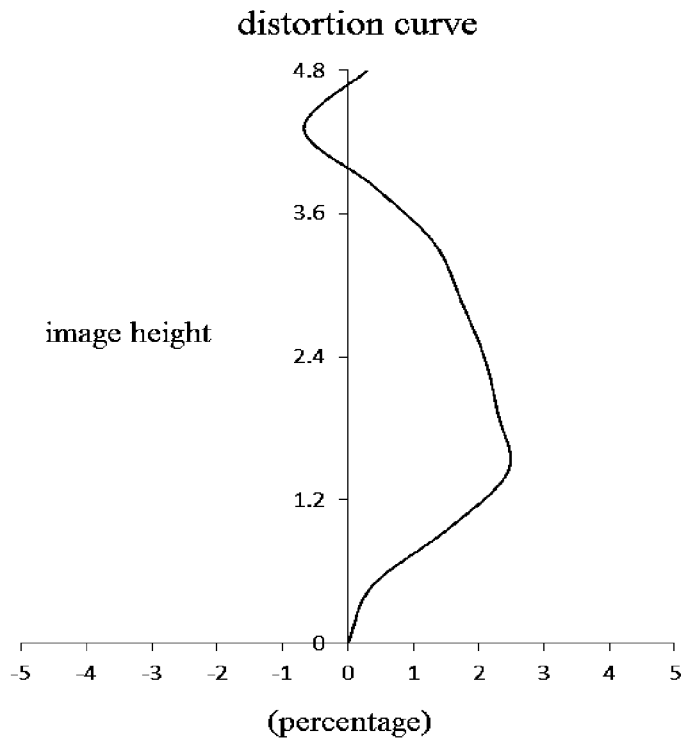
Figure 12C:
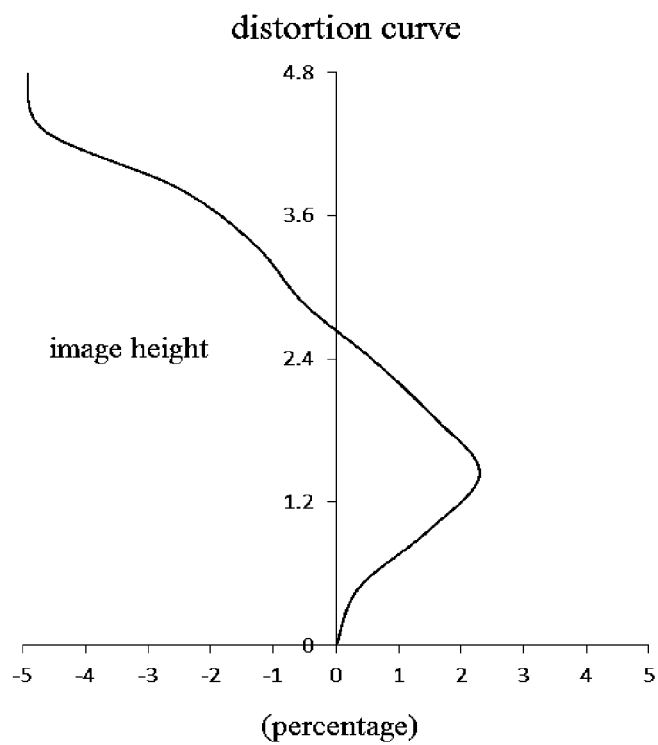

FIGS. 10A-10C show longitudinal aberration curves of the optical imaging lens assembly according to Embodiment 3 in the states that the object distance is infinity, 500 mm and 100 mm to represent deviations of a convergence focal point after light with different wavelengths passes through the lens groups. FIGS. 11A-11C show astigmatism curves of the optical imaging lens assembly according to Embodiment 3 in the three states mentioned above to represent curvatures of tangential image surface and curvatures of sagittal image surface. FIGS. 12A-12C show distortion curves of the optical imaging lens assembly according to Embodiment 3 in the three states mentioned above to represent distortion values corresponding to different image heights. According to FIGS. 10A-12C, it can be seen that the optical imaging lens assembly provided in Embodiment 3 and a camera lens with the optical imaging lens assembly may achieve good imaging quality.

Embodiment 4

Figure 13A:
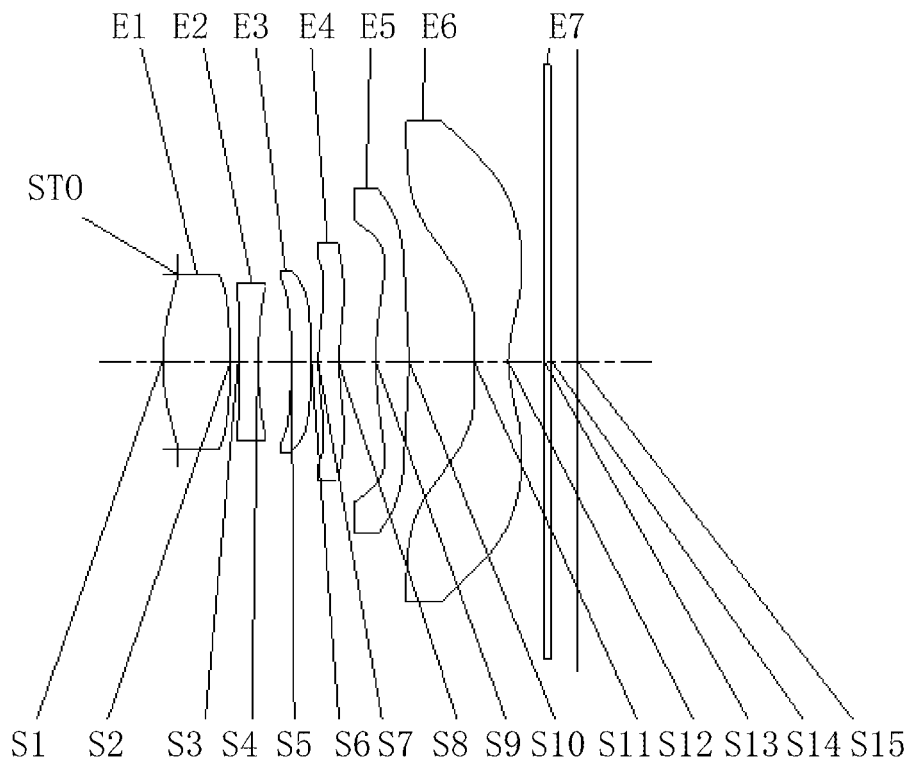
FIGS. 13A-13C show structural schematic diagrams of an optical imaging lens assembly according to Embodiment 4 of the disclosure in a state that an object distance is infinity, a state that the object distance is 500 mm and a state that the object distance is 100 mm.
Figure 13B:
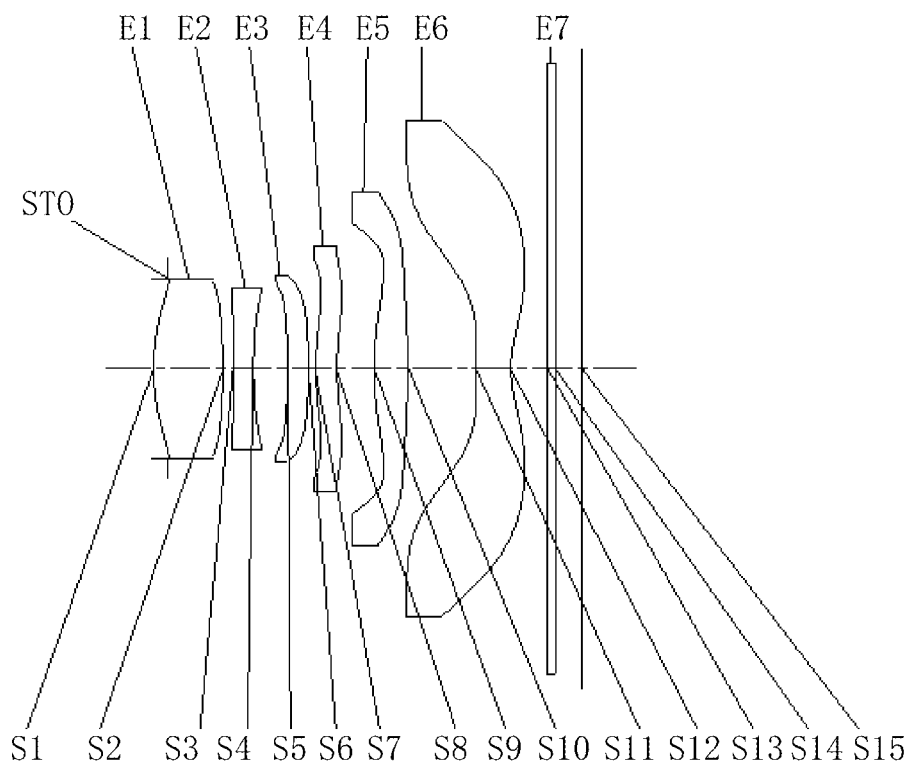
Figure 13C:
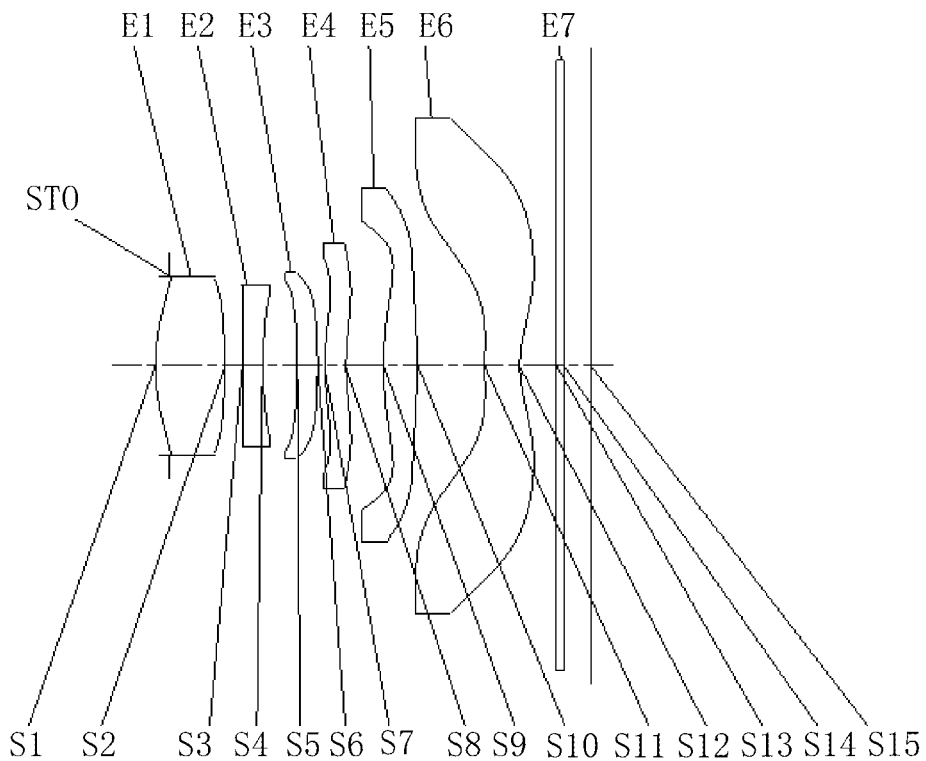

An optical imaging lens assembly according to Embodiment 4 of the disclosure will be described below with reference to FIGS. 13A-16C. FIGS. 13A-13C show structural schematic diagrams of an optical imaging lens assembly according to Embodiment 4 of the disclosure in states that an object distance is infinity, 500 mm and 100 mm.

As shown in FIGS. 13A-13C, the optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an electronic photosensitive element (not shown in the figures). The first lens E1 is configured to form a first lens group, and the second lens E2 to the sixth lens E6 are configured to form a second lens group. In the embodiment, the second lens group is arranged in a manner of moving along the optical axis, and the optical filter E7 and the electronic photosensitive element are also arranged in the manner of moving along the optical axis. An optical filter may further be arranged on the image side of the sixth lens E6.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface.

The optical filter E7 has an object-side surface S13 and an image-side surface S14. Light from an object sequentially penetrates through each of the surfaces S1 to S14 and is finally imaged on the electronic photosensitive element. Specifically, a surface where an effective pixel region of the electronic photosensitive element is located is taken as a practical imaging surface S15 of the optical imaging lens assembly.

Table 10 shows a basic parameter table of the optical imaging lens assembly of Embodiment 4, wherein the units of the curvature radius, the thickness/distance and the focal length are all millimeter (mm). Table 11 shows a related parameter table of the optical imaging lens assembly in the three states, wherein the units of TTL, f and ImgH are all millimeters (mm). Table 12 shows high-order coefficients applied to each aspheric mirror surface in Embodiment 4. A surface type of each aspheric surface may be defined by the formula (1) given in Embodiment 1.

TABLE 10

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | OD | | | | |
| STO | Spherical | Infinite | −0.2208 | | | | |
| S1 | Aspheric | 3.1150 | 1.0447 | 1.55 | 56.1 | 4.45 | −1.5957 |
| S2 | Aspheric | −9.7543 | T1 | | | | 47.2356 |
| S3 | Aspheric | −233.3092 | 0.3000 | 1.68 | 19.2 | −8.59 | 50.0000 |
| S4 | Aspheric | 5.9911 | 0.5189 | | | | 0.6159 |
| S5 | Aspheric | −8.9847 | 0.3051 | 1.57 | 37.3 | −91.01 | 39.5034 |
| S6 | Aspheric | −10.9960 | 0.1001 | | | | 50.0000 |
| S7 | Aspheric | 2.6013 | 0.3150 | 1.62 | 25.9 | 74.08 | −12.6960 |
| S8 | Aspheric | 2.6294 | 0.5702 | | | | −6.2060 |
| S9 | Aspheric | 6.2790 | 0.5114 | 1.55 | 56.1 | 5.42 | −7.4856 |
| S10 | Aspheric | −5.4402 | 1.0021 | | | | 2.0756 |
| S11 | Aspheric | 7.0401 | 0.5184 | 1.54 | 55.7 | −3.53 | −90.5340 |
| S12 | Aspheric | 1.4551 | 0.5586 | | | | −0.9924 |
| S13 | Spherical | Infinite | 0.1100 | 1.52 | 64.2 | | |
| S14 | Spherical | Infinite | 0.4000 | | | | |
| S15 | Spherical | Infinite | | | | | |

TABLE 11

| OD | Infinity | 500.0000 | 100.0000 |
|---|---|---|---|
| T1 | 0.1183 | 0.1449 | 0.2615 |
| T2 | 0.5189 | ← | ← |
| T3 | 0.1001 | ← | ← |
| T4 | 0.5702 | ← | ← |
| T5 | 1.0021 | ← | ← |
| T6 | 0.5586 | ← | ← |
| TTL | 6.15 | 6.18 | 6.30 |
| FOV(°) | 84.1 | 83.2 | 79.4 |
| f | 5.31 | 5.28 | 5.14 |
| ImgH | 4.79 | ← | ← |

In the embodiment, compared with those when the optical imaging lens assembly is in the state that the object distance is infinity, a distance from the second lens group to the first lens E1 on the optical axis is longer when the optical imaging lens assembly is in the state that the object distance is 100 mm, and a distance from the imaging surface S15 to the first lens E1 on the optical axis is also longer.

TABLE 12

| Surface number | A4 | A6 | A8 | A10 | A12 | A14 | A16 |
|---|---|---|---|---|---|---|---|
| S1 | −3.2804E−02 | −7.4080E−03 | −1.0036E−03 | −1.3325E−04 | −1.9181E−05 | −8.1532E−07 | −4.1251E−06 |
| S2 | −2.7352E−02 | 5.5988E−04 | 1.6818E−04 | 4.1968E−04 | 2.4155E−05 | 4.3322E−05 | −4.1956E−06 |
| S3 | −3.3448E−03 | 8.5547E−04 | −8.6391E−04 | 4.4628E−04 | 1.0981E−04 | 1.1665E−04 | 4.4554E−05 |
| S4 | 3.8907E−03 | 2.1490E−03 | −2.8191E−04 | 1.2852E−04 | −4.7956E−05 | 3.3460E−05 | −1.6323E−05 |
| S5 | −2.8239E−02 | −1.8053E−02 | 2.7330E−03 | −2.0076E−04 | −7.3970E−05 | −5.4140E−05 | −1.4301E−05 |
| S6 | −1.3720E−01 | −2.6432E−02 | −2.3510E−03 | 6.7699E−04 | −8.5323E−04 | −2.1899E−04 | −6.8707E−05 |
| S7 | −3.9995E−01 | 3.0971E−03 | −2.0472E−02 | −1.6666E−03 | −4.8950E−03 | 5.8706E−04 | 2.1200E−03 |
| S8 | −6.4308E−01 | 1.3491E−01 | −1.1305E−02 | 1.7787E−03 | −6.0789E−03 | −1.4963E−04 | 5.2038E−04 |
| S9 | −1.2223E+00 | −8.8444E−02 | 1.9364E−01 | −2.5613E−04 | −4.4146E−02 | −1.1007E−02 | 2.1955E−02 |
| S10 | 6.1753E−01 | −2.9678E−01 | 1.2842E−01 | −2.5211E−02 | 1.8470E−02 | 5.1433E−03 | −9.4321E−03 |
| S11 | −2.1224E+00 | 1.1005E+00 | −5.5996E−01 | 1.7780E−01 | −7.2778E−02 | −1.1894E−02 | −1.6573E−02 |
| S12 | −6.2819E+00 | 1.2044E+00 | −3.9781E−01 | 1.8519E−01 | −7.2950E−02 | 2.9594E−02 | −1.7723E−02 |

| Surface number | A18 | A20 | A22 | A24 | A26 | A28 | A30 |
|---|---|---|---|---|---|---|---|
| S1 | 7.8102E−06 | −2.4821E−06 | 1.6800E−06 | −2.4675E−06 | 3.6774E−06 | −2.3810E−06 | 4.8522E−07 |
| S2 | 6.7483E−06 | 2.1735E−06 | −6.4201E−06 | 4.6098E−06 | 2.1536E−06 | −2.8141E−06 | 7.1659E−07 |
| S3 | 5.3482E−05 | 3.2807E−05 | 1.7686E−05 | −7.9556E−07 | −5.2828E−06 | −8.3350E−06 | 2.6620E−06 |
| S4 | 1.0579E−05 | −7.6039E−06 | 4.9103E−06 | −2.6079E−06 | 8.2463E−07 | 1.6167E−07 | −1.0951E−07 |
| S5 | 2.3893E−05 | 2.5523E−05 | 1.0819E−05 | 2.7047E−06 | −3.7897E−06 | −6.3344E−07 | 8.5684E−07 |
| S6 | −4.8282E−05 | 2.8895E−05 | −1.0360E−05 | 1.7131E−05 | −6.3564E−06 | −5.2497E−06 | 3.1621E−06 |
| S7 | 1.1181E−03 | 5.9012E−04 | 9.8383E−05 | 6.1648E−05 | −6.0581E−05 | −1.7263E−05 | −3.1651E−05 |
| S8 | −1.1916E−03 | −2.2462E−04 | 2.8793E−04 | 5.1292E−04 | 1.6178E−04 | 4.1023E−05 | −3.9774E−05 |
| S9 | 7.7782E−03 | −8.8562E−03 | −7.5972E−03 | 1.7789E−03 | 5.1241E−03 | 3.1735E−03 | 7.3026E−04 |
| S10 | −1.0580E−02 | 1.0076E−03 | 4.6473E−03 | 1.9629E−03 | 1.3949E−03 | 1.2880E−03 | 1.7591E−04 |
| S11 | −4.6480E−03 | −1.2323E−02 | −2.7400E−03 | −3.3594E−03 | −3.0425E−03 | −5.3703E−05 | −9.8858E−04 |
| S12 | 8.2491E−03 | −2.1617E−03 | 1.3789E−03 | −7.4042E−04 | 2.3804E−04 | −2.2011E−04 | 7.2247E−05 |

Figure 14A:
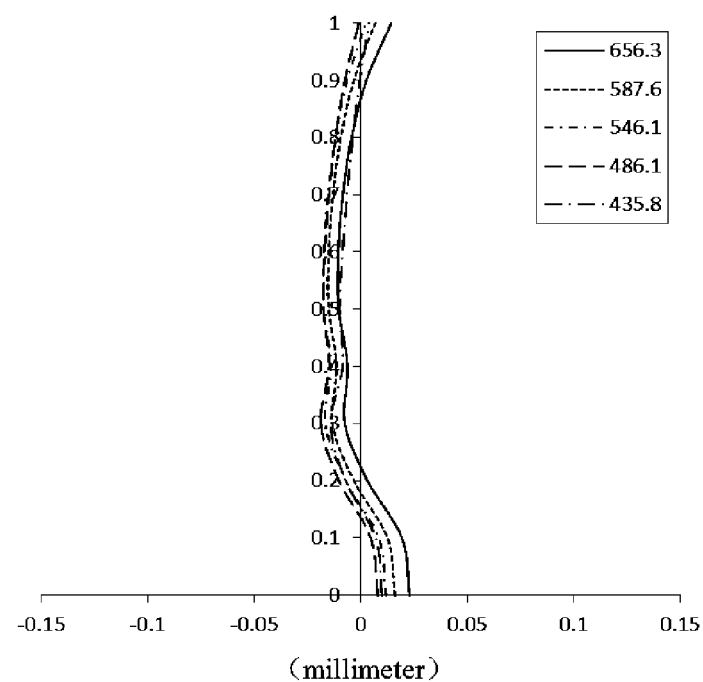
FIGS. 14A-14C show longitudinal aberration curves of the optical imaging lens assembly in FIGS. 13A-13C respectively.
Figure 14B:
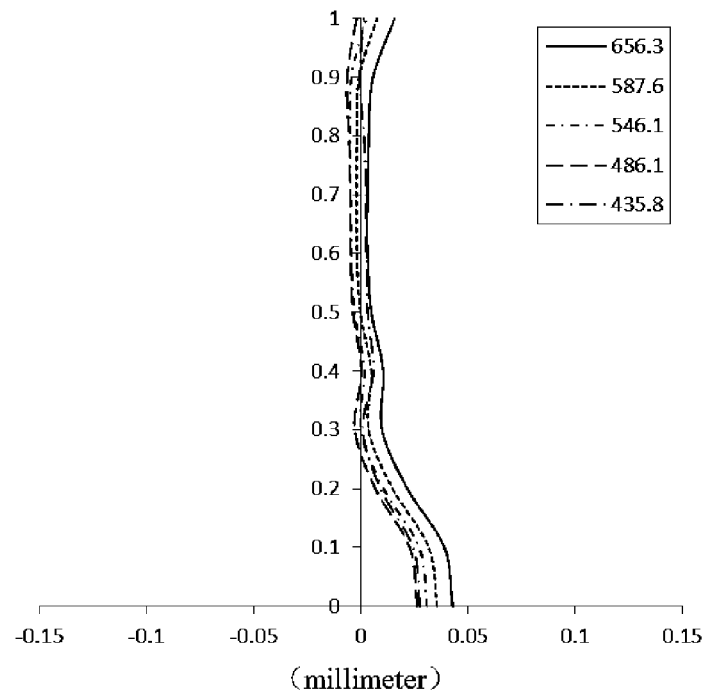
Figure 14C:
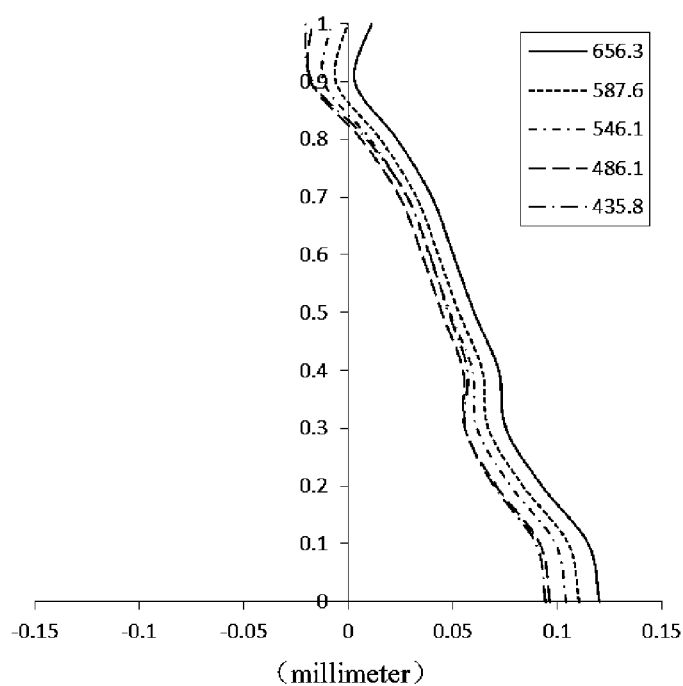
Figure 15A:
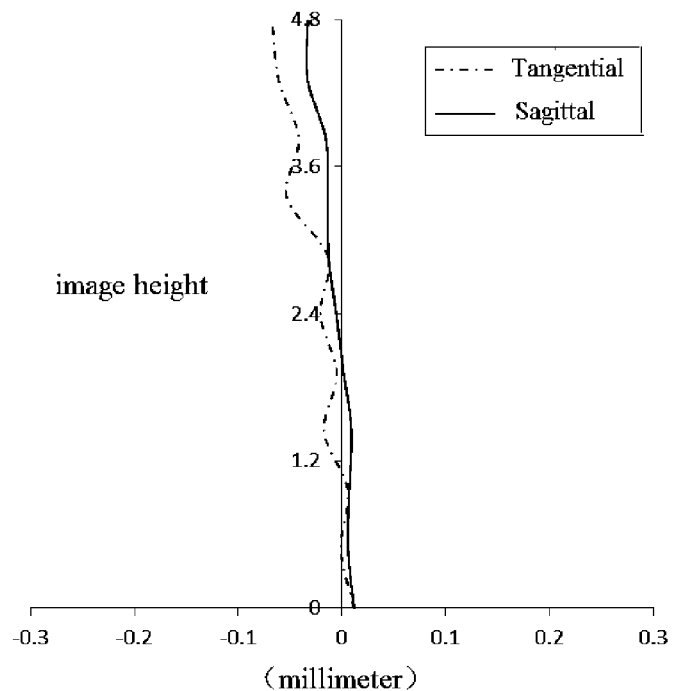
FIGS. 15A-15C show astigmatism curves of the optical imaging lens assembly in FIGS. 13A-13C respectively.
Figure 15B:
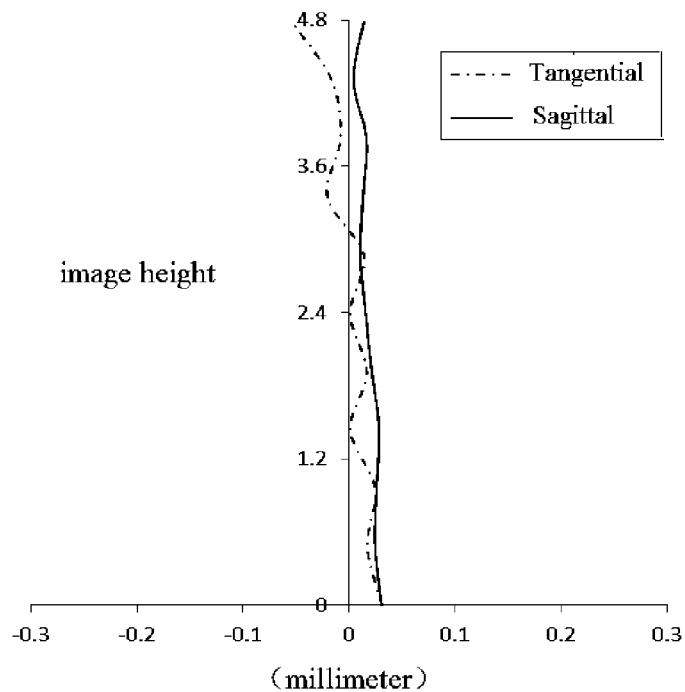
Figure 15C:
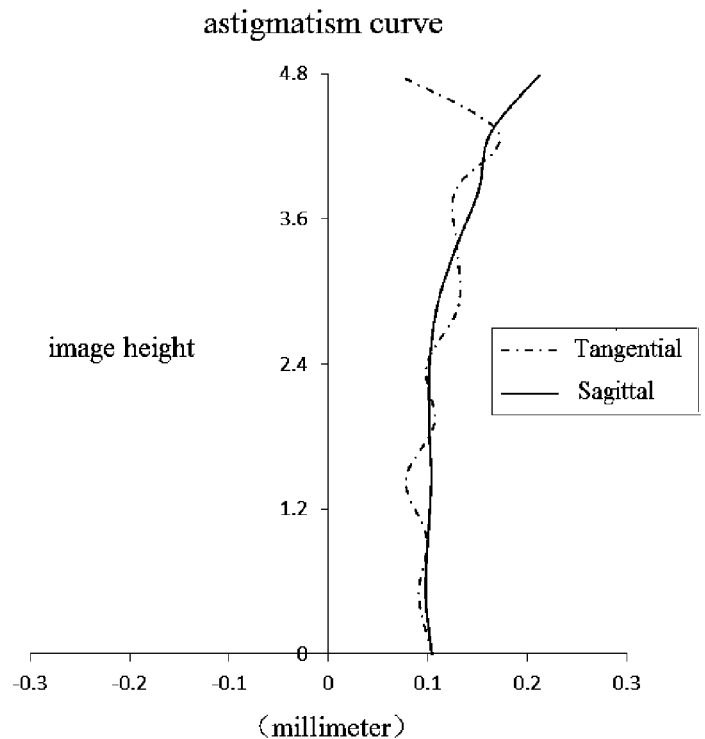
Figure 16A:
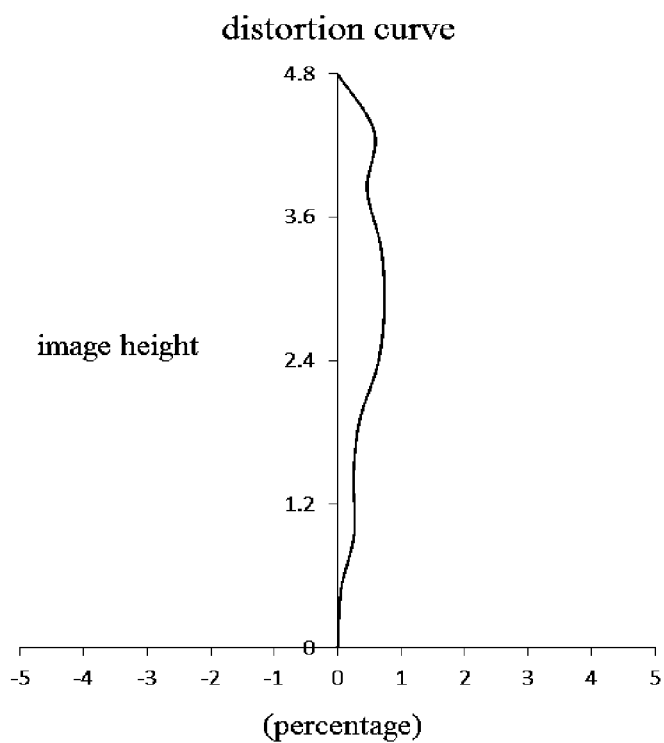
FIGS. 16A-16C show distortion curves of the optical imaging lens assembly in FIG. 13A to FIG. 3C respectively.
Figure 16B:
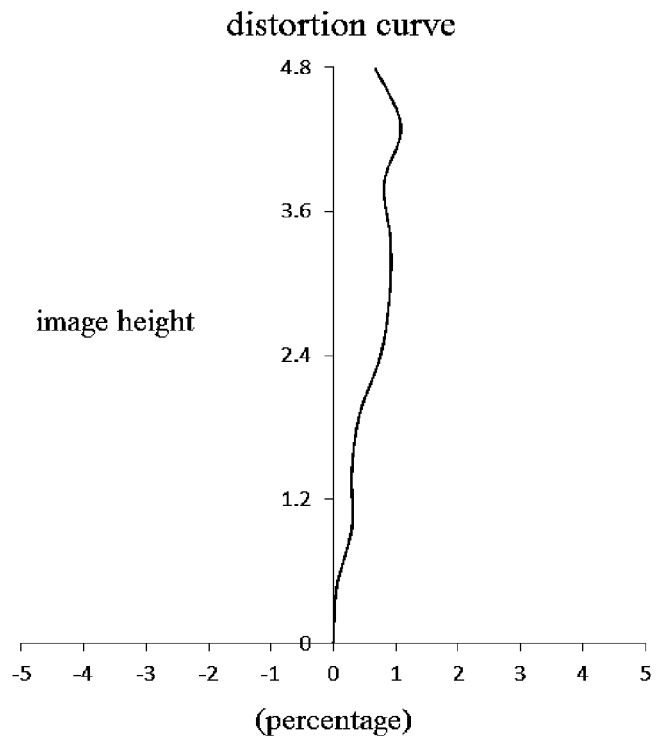
Figure 16C:
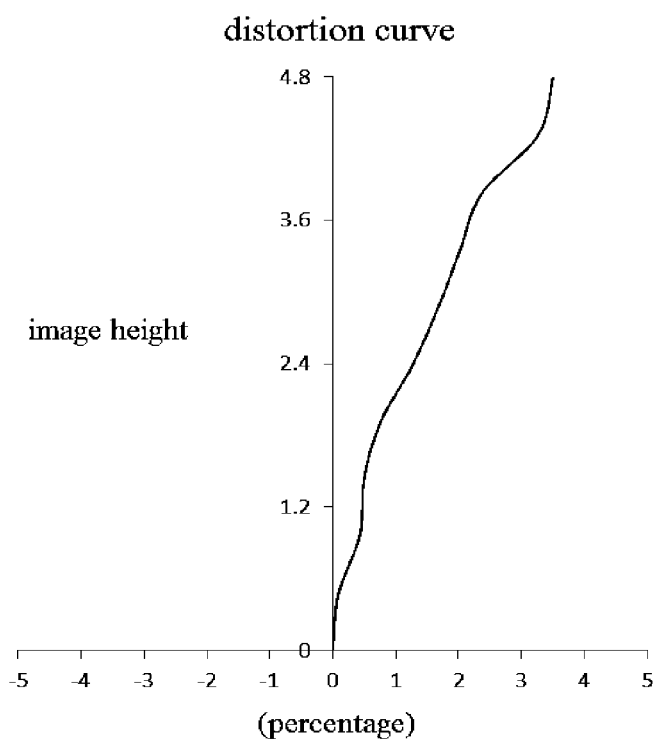

FIGS. 14A-14C show longitudinal aberration curves of the optical imaging lens assembly according to Embodiment 4 in the states that the object distance is infinity, 500 mm and 100 mm to represent deviations of a convergence focal point after light with different wavelengths passes through the lens groups. FIGS. 15A-15C show astigmatism curves of the optical imaging lens assembly according to Embodiment 4 in the three states mentioned above to represent curvatures of tangential image surface and curvatures of sagittal image surface. FIGS. 16A-16C show distortion curves of the optical imaging lens assembly according to Embodiment 4 in the three states mentioned above to represent distortion values corresponding to different image heights. According to FIGS. 14A-16C, it can be seen that the optical imaging lens assembly provided in Embodiment 4 and a camera lens with the optical imaging lens assembly may achieve good imaging quality.

Embodiment 5

Figure 17A:
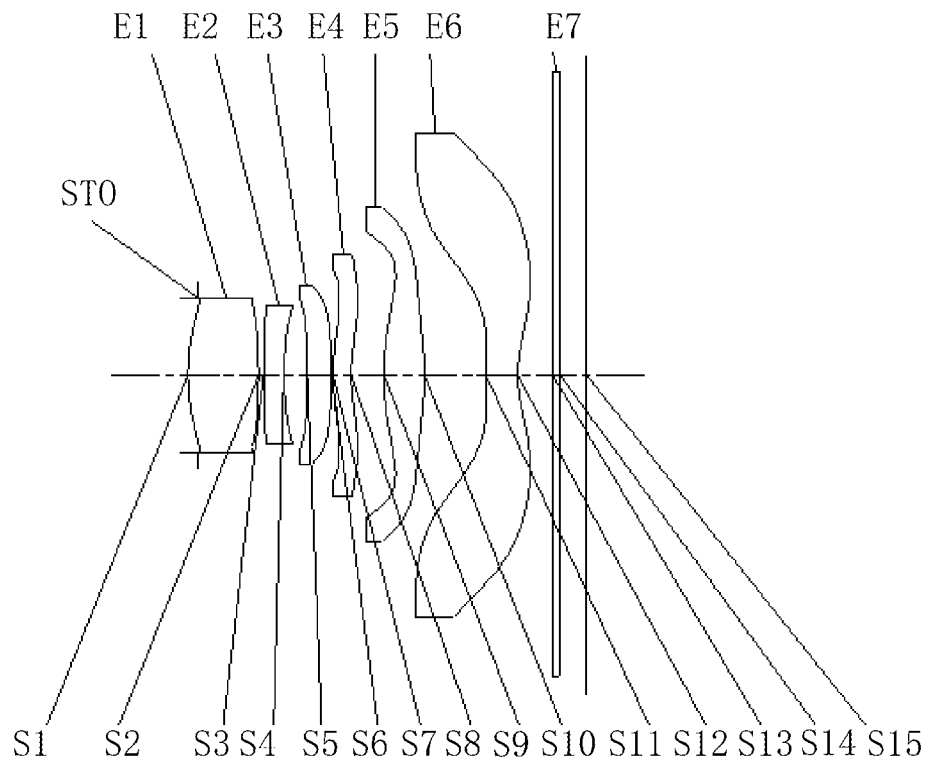
FIGS. 17A-17C show structural schematic diagrams of an optical imaging lens assembly according to Embodiment 5 of the disclosure in a state that an object distance is infinity, a state that the object distance is 500 mm and a state that the object distance is 100 mm.
Figure 17B:
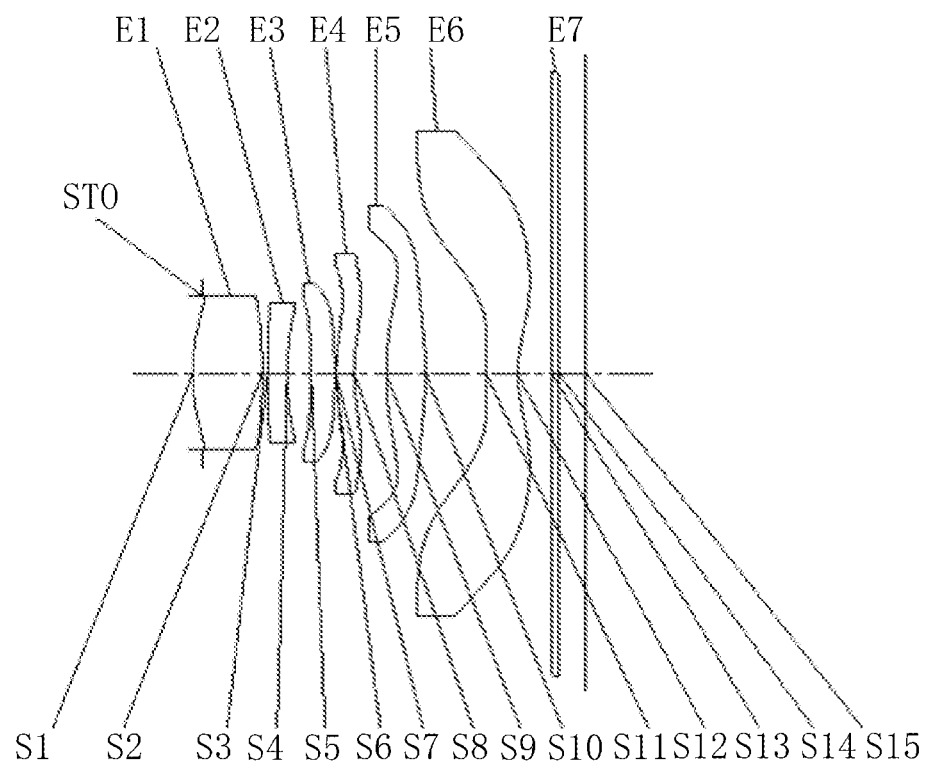
Figure 17C:
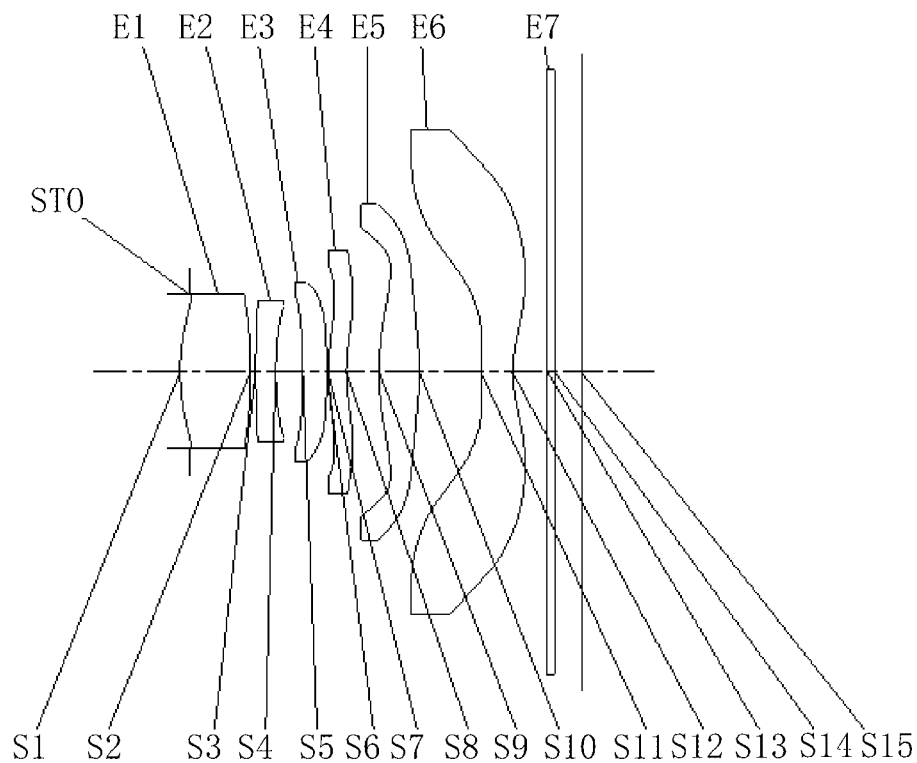

An optical imaging lens assembly according to Embodiment 5 of the disclosure will be described below with reference to FIGS. 17A-20C. FIGS. 17A-17C show structural schematic diagrams of an optical imaging lens assembly according to Embodiment 5 of the disclosure.

As shown in FIGS. 17A-17C, the optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an electronic photosensitive element (not shown in the figures). The first lens E1 is configured to form a first lens group, and the second lens E2 to the sixth lens E6 are configured to form a second lens group. In the embodiment, the third lens E3 to the electronic photosensitive element is arranged in a manner of moving along the optical axis. An optical filter may further be arranged on the image side of the sixth lens E6.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface.

The optical filter E7 has an object-side surface S13 and an image-side surface S14. Light from an object sequentially penetrates through each of the surfaces S1 to S14 and is finally imaged on the electronic photosensitive element. Specifically, a surface where an effective pixel region of the electronic photosensitive element is located is taken as a practical imaging surface S15 of the optical imaging lens assembly.

Table 13 shows a basic parameter table of the optical imaging lens assembly of Embodiment 5, wherein the units of the curvature radius, the thickness/distance and the focal length are all millimeters (mm). Table 14 shows a related parameter table of the optical imaging lens assembly in states that an object distance is infinity, 500 mm and 100 mm. Table 15 shows high-order coefficients applied to each aspheric mirror surface in Embodiment 5. A surface type of each aspheric surface may be defined by the formula (1) given in Embodiment 1.

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | OD | | | | |
| STO | Spherical | Infinite | −0.1538 | | | | |
| S1 | Aspheric | 3.1143 | 1.0693 | 1.55 | 56.1 | 4.47 | −2.0438 |
| S2 | Aspheric | −9.9182 | T1 | | | | 47.0033 |
| S3 | Aspheric | 15.1954 | 0.3000 | 1.68 | 19.2 | −8.66 | −42.1429 |
| S4 | Aspheric | 4.2064 | T2 | | | | 1.3545 |
| S5 | Aspheric | −8.6045 | 0.3659 | 1.57 | 37.3 | −116.31 | 36.3375 |
| S6 | Aspheric | −10.0374 | T3 | | | | 50.0000 |
| S7 | Aspheric | 2.3269 | 0.2798 | 1.62 | 25.9 | 86.84 | −12.7367 |
| S8 | Aspheric | 2.3199 | T4 | | | | −6.2130 |
| S9 | Aspheric | 5.3787 | 0.6122 | 1.55 | 56.1 | 4.63 | −5.0776 |
| S10 | Aspheric | −4.5901 | T5 | | | | 1.9101 |
| S11 | Aspheric | 4.9564 | 0.4773 | 1.54 | 55.7 | −4.46 | −98.1171 |
| S12 | Aspheric | 1.5599 | T6 | | | | −0.9831 |
| S13 | Spherical | Infinite | 0.1100 | 1.52 | 64.2 | | |
| S14 | Spherical | Infinite | 0.4000 | | | | |
| S15 | Spherical | Infinite | | | | | |

TABLE 14

| OD | Infinity | 500.0000 | 100.0000 |
|---|---|---|---|
| T1 | 0.0769 | ← | ← |
| T2 | 0.3619 | 0.3705 | 0.4138 |
| T3 | 0.0140 | ← | ← |
| T4 | 0.4953 | ← | ← |
| T5 | 0.9291 | ← | ← |
| T6 | 0.5342 | ← | ← |
| TTL | 5.87 | 5.88 | 5.92 |
| FOV(°) | 92.4 | 92.3 | 91.6 |
| f | 4.42 | 4.42 | 4.43 |
| ImgH | 4.79 | ← | ← |

In the embodiment, a distance from the third lens E3 to the first lens E1 on the optical axis is longer when the optical imaging lens assembly is in the state that the object distance is 100 mm, compared with that when the optical imaging lens assembly is in the state that the object distance is infinity.

TABLE 15

| Surface number | A4 | A6 | A8 | A10 | A12 | A14 | A16 |
|---|---|---|---|---|---|---|---|
| S1 | −3.7651E−02 | −6.4211E−03 | −1.2732E−03 | 2.0754E−04 | 4.5761E−05 | 1.6113E−04 | −1.6755E−05 |
| S2 | −3.1379E−02 | 1.3399E−03 | 4.2888E−04 | 3.0189E−04 | 1.8505E−04 | −1.2045E−04 | −1.8020E−05 |
| S3 | −2.1360E−04 | 1.0175E−03 | −8.8895E−04 | 3.5140E−04 | 4.0047E−04 | 3.0075E−06 | −3.8030E−05 |
| S4 | 5.5607E−03 | 2.7654E−03 | −5.7983E−04 | −2.3152E−05 | −3.1015E−05 | 1.6014E−05 | −1.0982E−05 |
| S5 | −2.3703E−02 | −1.4936E−02 | 1.7263E−03 | −7.0027E−04 | −5.2620E−04 | 3.1538E−04 | −8.6038E−05 |
| S6 | −1.4044E−01 | −2.8519E−02 | −2.5248E−03 | 4.7966E−04 | −1.1944E−03 | −3.3900E−04 | −6.8651E−05 |
| S7 | −4.0749E−01 | 1.3791E−03 | −1.9184E−02 | −1.3655E−03 | −4.7378E−03 | 5.2013E−04 | 2.1950E−03 |
| S8 | −6.4192E−01 | 1.3303E−01 | −1.4942E−02 | 1.2628E−03 | −5.6786E−03 | −6.9657E−05 | 1.0630E−03 |
| S9 | −1.1909E+00 | −9.7893E−02 | 1.9964E−01 | −3.5492E−03 | −4.4076E−02 | −1.1032E−02 | 2.2766E−02 |
| S10 | 6.8285E−01 | −3.0551E−01 | 1.1631E−01 | −1.9666E−02 | 1.6250E−02 | 7.7796E−03 | −1.4222E−02 |
| S11 | −2.1570E+00 | 1.1007E+00 | −5.4952E−01 | 1.8217E−01 | −7.5326E−02 | −1.1896E−02 | −1.7396E−02 |
| S12 | −6.2383E+00 | 1.2152E+00 | −3.9261E−01 | 1.8709E−01 | −7.2418E−02 | 2.9497E−02 | −1.7648E−02 |

| Surface number | A18 | A20 | A22 | A24 | A26 | A28 | A30 |
|---|---|---|---|---|---|---|---|
| S1 | −4.0551E−05 | −9.0963E−05 | −2.3067E−05 | 1.4058E−05 | 5.3536E−05 | 3.5675E−05 | 3.3333E−05 |
| S2 | 2.6296E−05 | 4.1951E−05 | 5.3352E−07 | 3.5532E−06 | −2.1923E−06 | 7.5522E−06 | 5.5197E−07 |
| S3 | −5.9497E−05 | −6.5456E−06 | 2.2506E−06 | 1.0847E−05 | −1.9302E−08 | −5.1857E−06 | −5.3452E−06 |
| S4 | 5.3798E−06 | −7.4292E−06 | −7.2733E−06 | −1.6905E−06 | −1.4616E−06 | 4.6235E−07 | 5.3591E−07 |
| S5 | 7.4168E−05 | −1.0448E−04 | 1.6085E−05 | −2.3236E−05 | 3.5443E−05 | 8.4996E−06 | 2.1073E−05 |
| S6 | −5.0349E−05 | 6.2332E−05 | −2.6741E−05 | 2.8842E−05 | −1.7043E−06 | −2.0035E−06 | −5.4207E−07 |
| S7 | 9.7179E−04 | 4.9324E−04 | 1.6785E−04 | 1.7655E−04 | 1.3057E−06 | −3.8367E−05 | −3.5036E−05 |
| S8 | −1.3379E−03 | −4.3099E−04 | 2.5033E−04 | 4.3780E−04 | 1.9087E−04 | 7.6877E−05 | 6.6901E−05 |
| S9 | 7.5765E−03 | −9.0832E−03 | −7.9205E−03 | 2.2539E−03 | 5.0764E−03 | 3.2449E−03 | 5.8340E−04 |
| S10 | −7.6337E−03 | 9.9879E−04 | 4.1194E−03 | 1.0156E−03 | 1.9798E−03 | 2.2007E−03 | 1.7271E−04 |
| S11 | −4.5960E−03 | −1.3036E−02 | −2.1460E−03 | −3.0515E−03 | −3.0048E−03 | 4.3125E−05 | −1.2444E−03 |
| S12 | 8.2058E−03 | −2.2755E−03 | 1.2583E−03 | −7.0118E−04 | 1.0438E−04 | −2.0529E−04 | 1.0690E−04 |

Figure 18A:
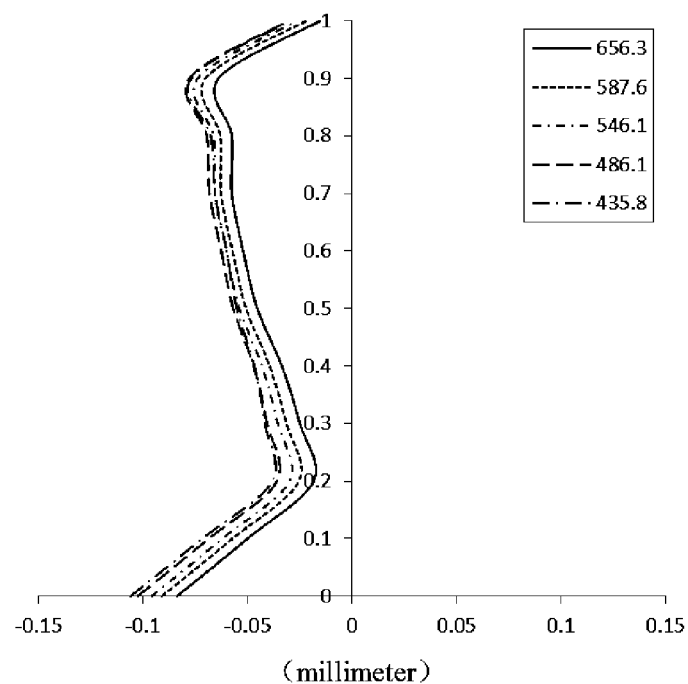
FIGS. 18A-18C show longitudinal aberration curves of the optical imaging lens assembly in FIGS. 17A-17C respectively.
Figure 18B:
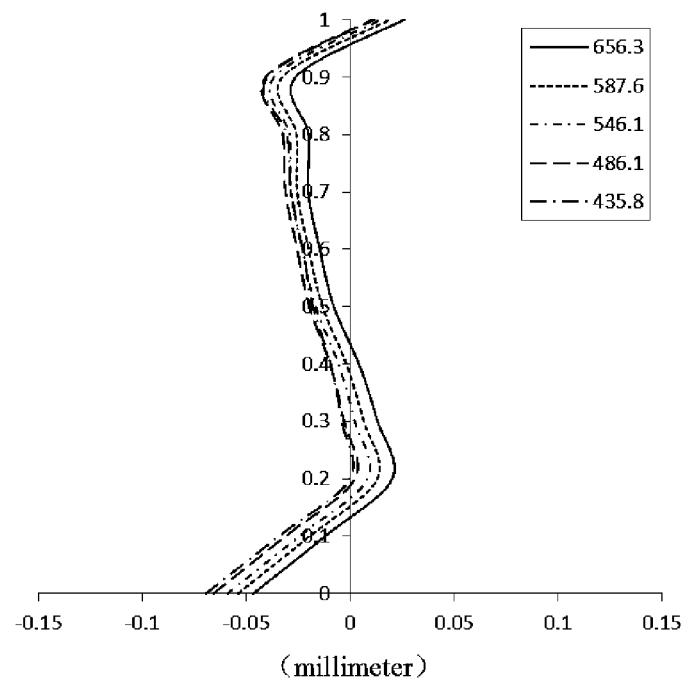
Figure 18C:
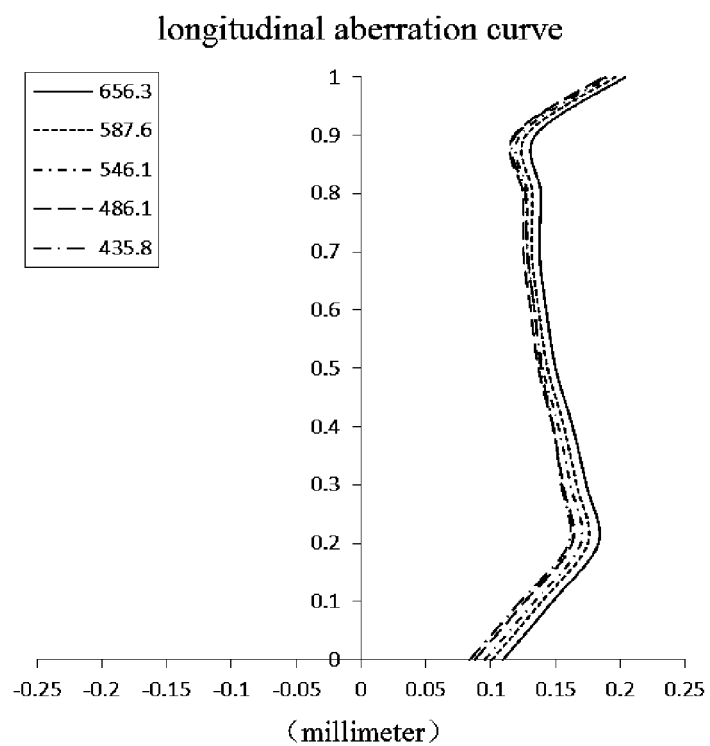
Figure 19A:
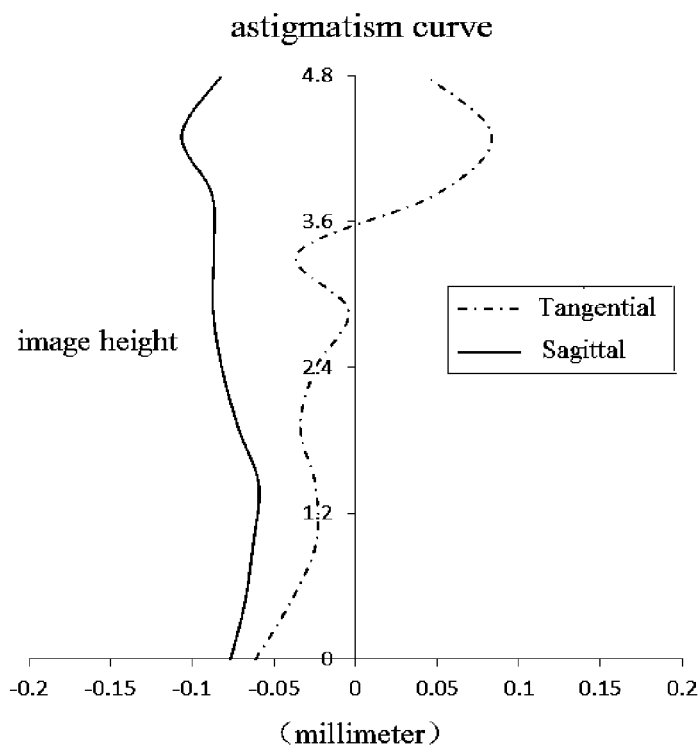
FIGS. 19A-19C show astigmatism curves of the optical imaging lens assembly in FIGS. 17A-17C respectively.
Figure 19B:
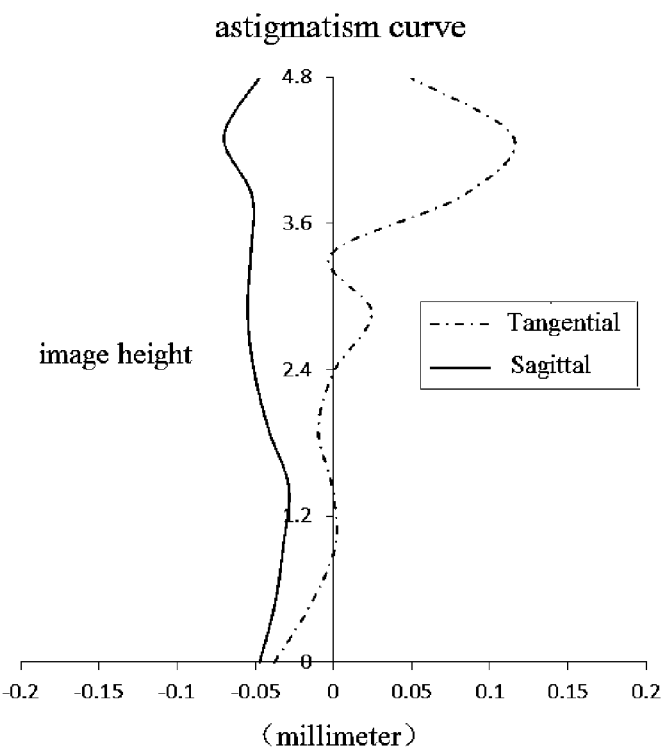
Figure 19C:
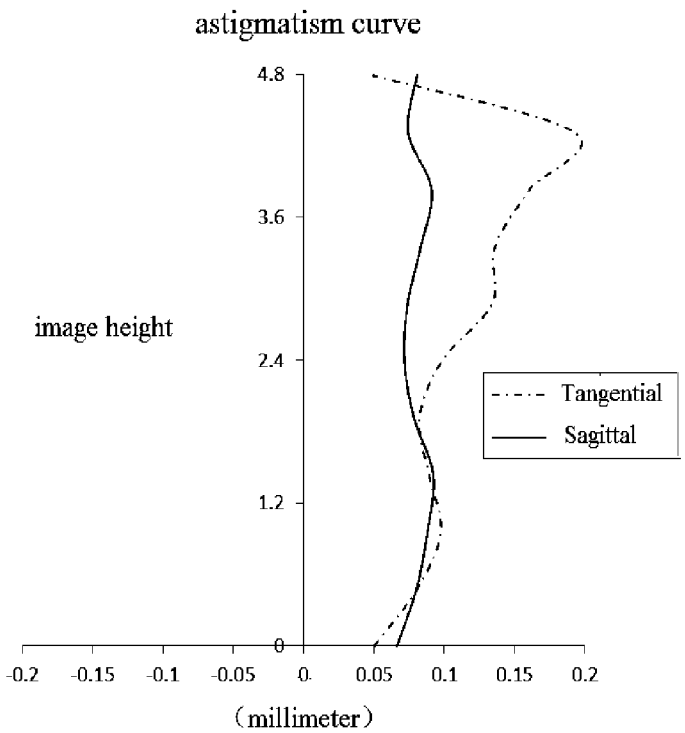
Figure 20A:
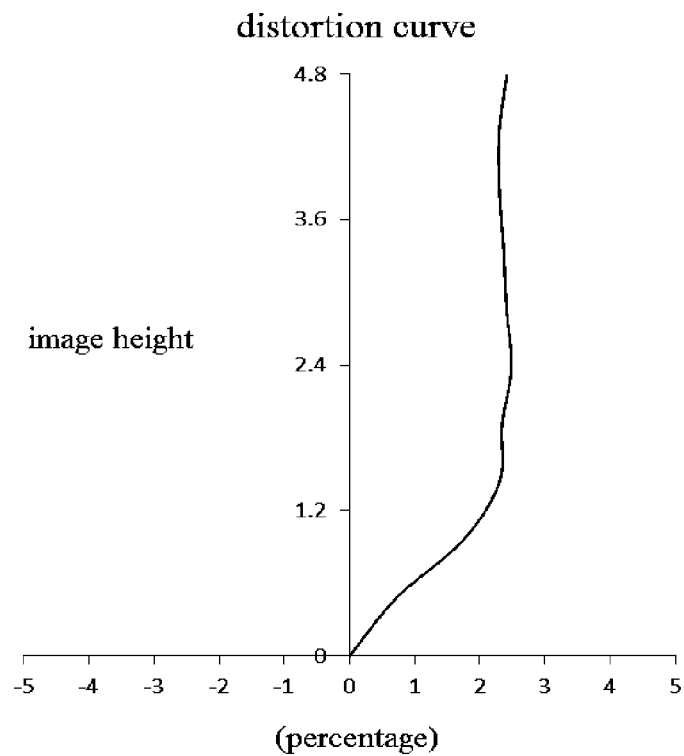
FIGS. 20A-20C show distortion curves of the optical imaging lens assembly in FIGS. 17A-17C respectively.
Figure 20B:
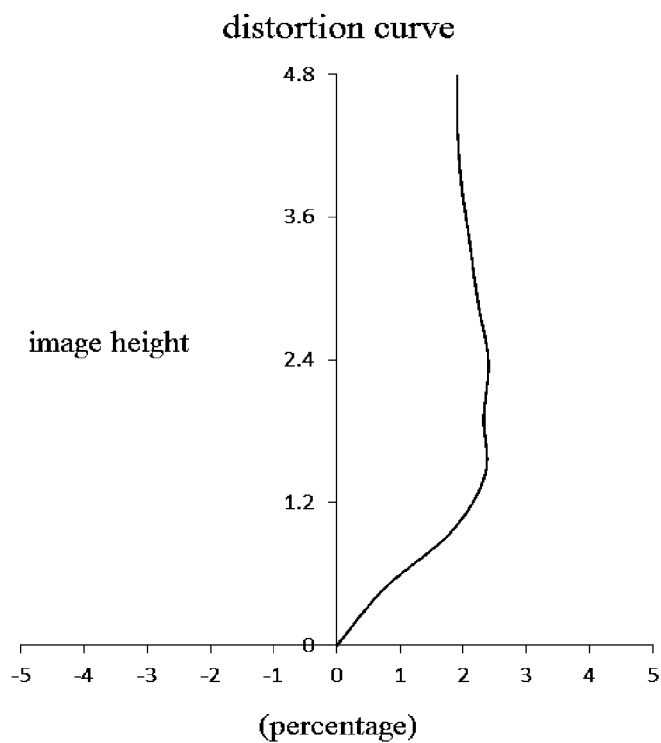
Figure 20C:
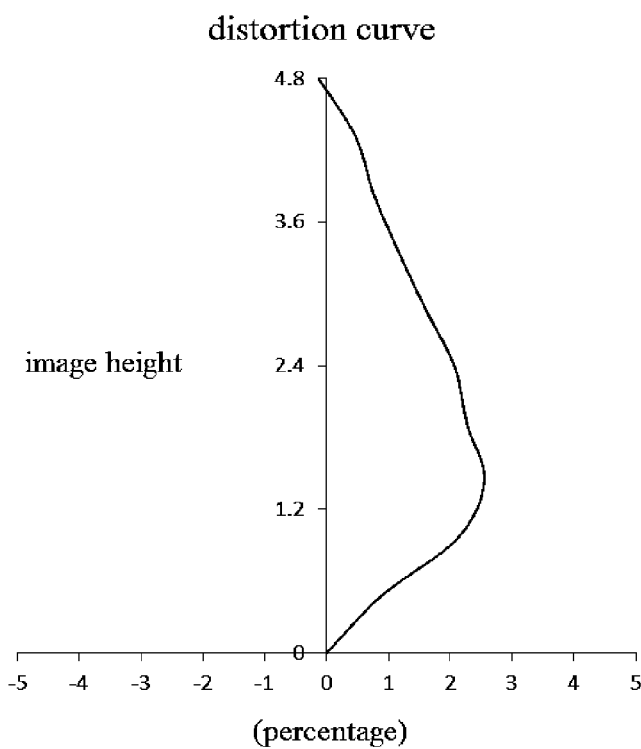

FIGS. 18A-18C show longitudinal aberration curves of the optical imaging lens assembly according to Embodiment 5 in the states that the object distance is infinity, 500 mm and 100 mm to represent deviations of a convergence focal point after light with different wavelengths passes through the lens groups. FIGS. 19A-19C show astigmatism curves of the optical imaging lens assembly according to Embodiment 5 in the three states mentioned above to represent curvatures of tangential image surface and curvatures of sagittal image surface. FIGS. 20A-20C show distortion curves of the optical imaging lens assembly according to Embodiment 5 in the three states mentioned above to represent distortion values corresponding to different image heights. According to FIGS. 18A-20C, it can be seen that the optical imaging lens assembly provided in Embodiment 5 and a camera lens with the optical imaging lens assembly may achieve good imaging quality.

Embodiment 6

Figure 21A:
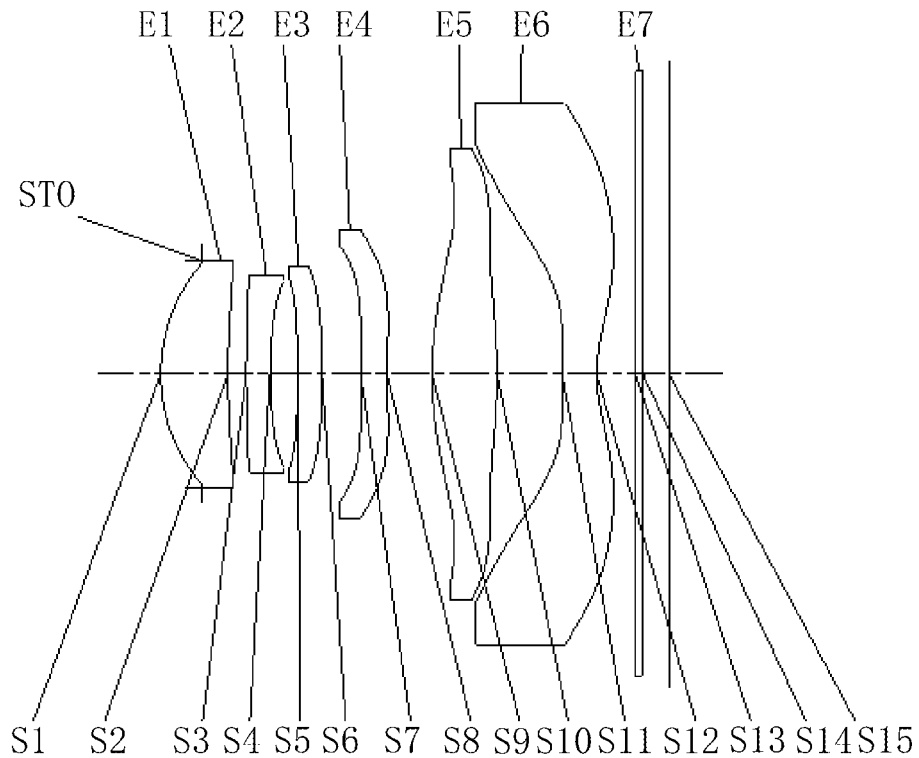
FIGS. 21A-21C show structural schematic diagrams of an optical imaging lens assembly according to Embodiment 6 of the disclosure in a state that an object distance is infinity, a state that the object distance is 500 mm and a state that the object distance is 100 mm.
Figure 21B:
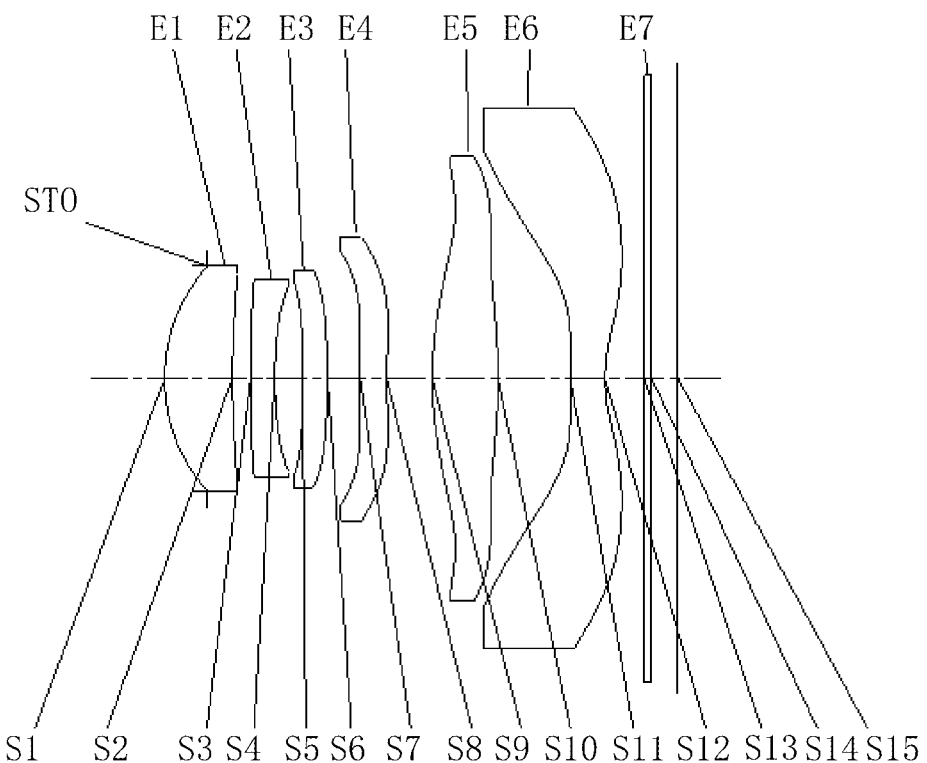
Figure 21C:
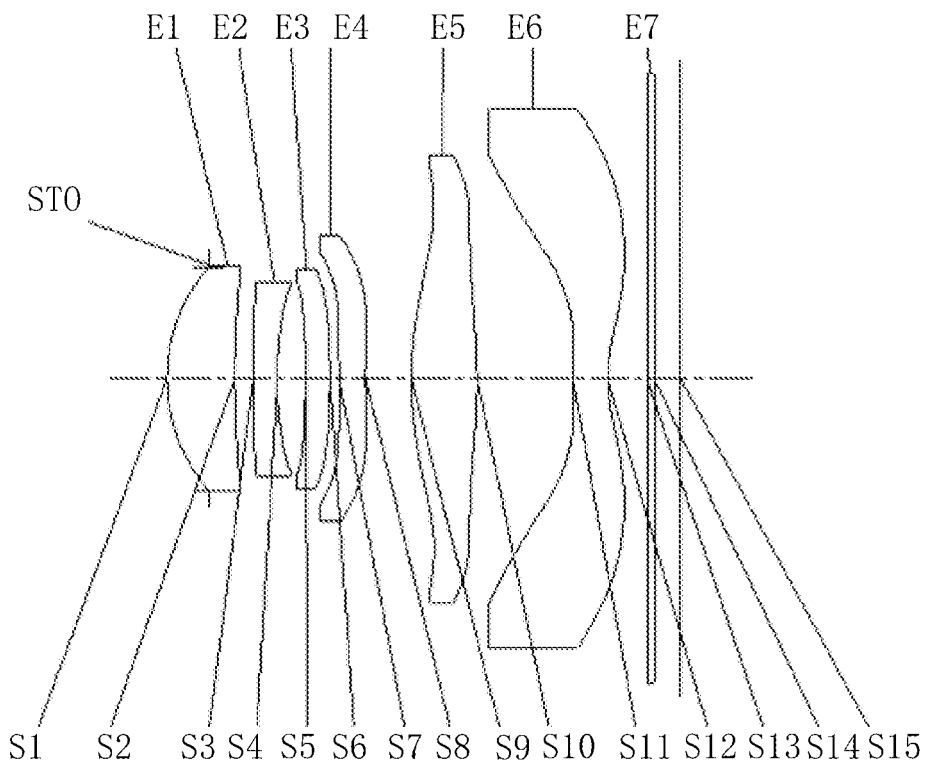

An optical imaging lens assembly according to Embodiment 6 of the disclosure will be described below with reference to FIGS. 21A-24C. FIGS. 21A-21C show structural schematic diagrams of an optical imaging lens assembly according to Embodiment 6 of the disclosure.

As shown in FIGS. 21A-21C, the optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an electronic photosensitive element (not shown in the figures). The first lens E1 is configured to form a first lens group, and the second lens E2 to the sixth lens E6 are configured to form a second lens group. In the embodiment, the fourth lens E4 and the fifth lens E5 are arranged in a manner of moving along the optical axis. An optical filter may further be arranged on the image side of the sixth lens E6.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface.

The optical filter E7 has an object-side surface S13 and an image-side surface S14. Light from an object sequentially penetrates through each of the surfaces S1 to S14 and is finally imaged on the electronic photosensitive element. Specifically, a surface where an effective pixel region of the electronic photosensitive element is located is taken as a practical imaging surface S15 of the optical imaging lens assembly.

Table 16 shows a basic parameter table of the optical imaging lens assembly of Embodiment 6, wherein the units of the curvature radius, the thickness/distance and the focal length are all millimeters (mm). Table 17 shows a related parameter table of the optical imaging lens assembly in states that an object distance is infinity, 500 mm and 100 mm. Table 18 shows high-order coefficients applied to S1 to S11 in each mirror surface in Embodiment 6. A surface type of each aspheric surface may be defined by formula (1) given in Embodiment 1.

TABLE 16

| Surface number | Surface type | Curvature radius Y | Curvature radius X | Thickness | Material Refractive index | Abbe number | Focal length | Conic coefficient Y | Conic coefficient X |
|---|---|---|---|---|---|---|---|---|---|
| OBJ | Spherical | Infinite | | OD | | | | | |
| STO | Spherical | Infinite | | −0.6347 | | | | | |
| S1 | Aspheric | 2.5980 | | 1.0222 | 1.55 | 56.1 | 5.79 | 0.0183 | |
| S2 | Aspheric | 12.4877 | | T1 | | | | 23.6457 | |
| S3 | Aspheric | 21.4399 | | 0.3602 | 1.68 | 19.2 | −11.97 | −99.0000 | |
| S4 | Aspheric | 5.8551 | | T2 | | | | 1.8051 | |
| S5 | Aspheric | −34.6064 | | 0.3758 | 1.57 | 37.3 | 42.57 | 50.0000 | |
| S6 | Aspheric | −14.3382 | | T3 | | | | −26.2834 | |
| S7 | Aspheric | 14.6439 | | 0.4010 | 1.62 | 25.9 | −30.26 | −23.2750 | |
| S8 | Aspheric | 8.1422 | | T4 | | | | −4.4195 | |
| S9 | Aspheric | 5.4839 | | 0.9955 | 1.55 | 56.1 | 6.17 | 0.3763 | |
| S10 | Aspheric | −8.2061 | | T5 | | | | 3.3684 | |
| S11 | Aspheric | 14.0268 | | 0.5258 | 1.54 | 55.7 | −4.98 | −77.5502 | |
| S12 (AAS) | Aspheric | 2.2163 | 2.1968 | T6 | | | | −0.9662 | −0.9451 |
| S13 | Spherical | Infinite | | 0.1100 | 1.52 | 64.2 | | | |
| S14 | Spherical | Infinite | | 0.4000 | | | | | |
| S15 | Spherical | Infinite | | | | | | | |

TABLE 17

| OD | Infinity | 500.0000 | 100.0000 |
|---|---|---|---|
| T1 | 0.2814 | ← | ← |
| T2 | 0.4227 | ← | ← |
| T3 | 0.5845 | 0.4879 | 0.1327 |
| T4 | 0.6873 | ← | ← |
| T5 | 0.9911 | 1.0877 | 1.4429 |
| T6 | 0.5929 | ← | ← |
| TTL | 7.75 | ← | ← |
| FOV(°) | 71.7 | 72..2 | 73.9 |
| f | 6.46 | 6.32 | 5.85 |
| ImgH | 4.79 | ← | ← |

In the embodiment, a distance from the fourth lens E4 to the first lens E1 on the optical axis is shorter when the optical imaging lens assembly is in the state that the object distance is 100 mm, compared with that when the optical imaging lens assembly is in the state that the object distance is infinity.

TABLE 18

| Surface number | A4 | A6 | A8 | A10 | A12 | A14 | A16 |
|---|---|---|---|---|---|---|---|
| S1 | 3.4005E−03 | −1.8207E−03 | −1.3477E−03 | −5.3314E−04 | −1.9666E−04 | −2.9881E−05 | 4.8589E−06 |
| S2 | −3.2869E−02 | 1.4520E−03 | −5.6466E−04 | −7.4665E−05 | −2.0805E−05 | −3.7961E−06 | −4.6778E−06 |
| S3 | 1.4115E−03 | 1.5088E−02 | −3.8940E−03 | −6.7750E−04 | −3.0977E−04 | −1.8138E−04 | −7.5723E−05 |
| S4 | 4.1107E−02 | 2.0400E−02 | 5.0888E−04 | 3.8226E−05 | −2.6280E−04 | −3.0083E−04 | −1.7758E−04 |
| S5 | −1.8674E−01 | −1.8081E−03 | 4.9900E−03 | −3.5374E−04 | −1.4758E−03 | −6.6211E−04 | 2.0064E−04 |
| S6 | −2.4608E−01 | −8.8240E−03 | 5.5723E−03 | 1.2130E−03 | −9.0886E−04 | −6.4379E−04 | −6.1023E−04 |
| S7 | −6.0963E−01 | 1.1021E−02 | −2.1252E−02 | −3.8475E−03 | −5.2107E−03 | −8.9014E−04 | 2.0114E−04 |
| S8 | −1.0118E+00 | 1.2475E−01 | −1.1242E−02 | −2.1296E−04 | −6.5768E−03 | 8.4908E−04 | 1.3194E−03 |
| S9 | −1.0744E+00 | −2.2910E−02 | 3.3308E−02 | 7.9474E−03 | −1.1161E−02 | −1.8561E−03 | −1.5693E−04 |
| S10 | 8.3961E−01 | −2.3373E−01 | 4.4909E−02 | 1.9637E−02 | −1.1817E−02 | −1.9700E−03 | 1.0855E−03 |
| S11 | −2.0711E+00 | 6.9574E−01 | −2.2660E−01 | 6.1221E−02 | −1.2096E−02 | 1.3848E−03 | 5.0534E−04 |

| Surface number | A18 | A20 | A22 | A24 | A26 | A28 | A30 |
|---|---|---|---|---|---|---|---|
| S1 | 8.5214E−06 | −6.5626E−06 | −1.0750E−05 | −1.3576E−05 | −1.6128E−05 | −1.3951E−05 | −6.7418E−06 |
| S2 | −1.2076E−06 | −3.1135E−07 | −3.1369E−08 | −1.9921E−08 | 1.0116E−07 | 3.9167E−08 | −3.9769E−09 |
| S3 | −8.4035E−05 | −3.9588E−05 | −2.7201E−05 | 1.5203E−06 | 1.7659E−06 | 5.1139E−06 | −3.8113E−06 |
| S4 | −1.4011E−04 | −8.6905E−05 | −7.8919E−05 | −5.8879E−05 | −5.0352E−05 | −2.8359E−05 | −1.2459E−05 |
| S5 | 4.0393E−04 | 2.1560E−04 | −1.8106E−05 | −8.3242E−05 | −5.1319E−05 | −9.0207E−06 | 2.0941E−06 |
| S6 | −3.7285E−04 | −1.1057E−04 | 1.4978E−04 | 2.6292E−04 | 2.1271E−04 | 1.0159E−04 | 2.1505E−05 |
| S7 | 8.2892E−04 | 6.7293E−04 | 4.7368E−04 | 2.5792E−04 | 1.3071E−04 | 3.4899E−05 | 7.8109E−06 |
| S8 | 1.1749E−03 | 3.7641E−04 | 9.6867E−05 | 9.0995E−06 | 2.1737E−05 | 2.0085E−06 | 5.5080E−06 |
| S9 | −1.7552E−03 | −8.5033E−04 | −4.0291E−04 | 2.4716E−05 | −6.8987E−05 | −2.5428E−05 | −3.9491E−05 |
| S10 | −1.6620E−03 | 8.4504E−04 | 8.9061E−04 | 8.7954E−04 | 6.4494E−04 | 3.5067E−04 | 8.9472E−05 |
| S11 | −5.6320E−04 | 5.7573E−05 | −9.3123E−05 | 1.2905E−04 | −1.7008E−05 | −7.7000E−05 | 5.6584E−05 |

It can also be seen from Table 16 that the image-side surface S12 of the sixth lens E6 is a non-rotationally symmetric aspheric surface (i.e., an AAS surface), and the surface type of the non-rotationally symmetric aspheric surface may be defined through, but not limited to, the following non-rotationally symmetric aspheric surface formula:

$$z_{12} = \frac{(CUX)x^2 + (CUY)y^2}{1 + \sqrt{1 - (1+KX)(CUX)^2 x^2 - (1+KY)(CUY)^2 y^2}} + \quad (2)$$
$$AR\{(1-AP)x^2 + (1+AP)y^2\}^2 + BR\{(1-BP)x^2 + (1+BP)y^2\}^3 +$$
$$CR\{(1-CP)x^2 + (1+CP)y^2\}^4 + DR\{(1-DP)x^2 + (1+DP)y^2\}^5 +$$
$$ER\{(1-EP)x^2 + (1+EP)y^2\}^6 + FR\{(1-FP)x^2 + (1+FP)y^2\}^7 +$$
$$GR\{(1-GP)x^2 + (1+GP)y^2\}^8 +$$
$$HR\{(1-HP)x^2 + (1+HP)y^2\}^9 + JR\{(1-JP)x^2 + (1+JP)y^2\}^{10},$$

wherein $z_{12}$ is a vector height of a surface parallel to a Z-axis direction; CUX and CUY are curvatures (the curvature is a reciprocal of a curvature radius) of surface vertexes in X-axis and Y-axis directions respectively; KX and KY are conic coefficients in the X-axis and Y-axis directions respectively; AR, BR, CR, DR, ER, FR, GR, HR and JR are the 4th-order, 6th-order, 8th-order, 10th-order, 12th-order, 14th-order, 16th-order, 18th-order and 20th-order coefficients of the rotationally symmetric component of the aspheric surface respectively; and AP, BP, CP, DP, EP, FP, GP, HP and JP are the 4th-order, 6th-order, 8th-order, 10th-order, 12th-order, 14th-order, 16th-order, 18th-order and 20th-order coefficients of the non-rotationally symmetric component of the aspheric surface respectively. The following Table 19 shows each high-order coefficient applied to a rotationally symmetric component and non-rotationally symmetric component of the non-rotationally symmetric aspheric surface S12 in Embodiment 1.

TABLE 19

| AAS surface | AR | BR | CR | DR | ER | FR | GR | HR | JR |
|---|---|---|---|---|---|---|---|---|---|
| S12 | −8.9400E−02 | 2.3150E−02 | −4.5649E−03 | 6.4176E−04 | −6.1949E−05 | 3.9497E−06 | −1.5769E−07 | 3.5579E−09 | −3.4536E−11 |

| AAS surface | AR | BR | CR | DR | ER | FR | GR | HR | JR |
|---|---|---|---|---|---|---|---|---|---|
| S12 | −1.1352E−03 | −7.5070E−04 | −2.2403E−04 | −2.2605E−05 | 1.6476E−06 | 0.0000E+00 | 0.0000E+00 | 0.0000E+00 | 0.0000E+00 |

Figure 22A:
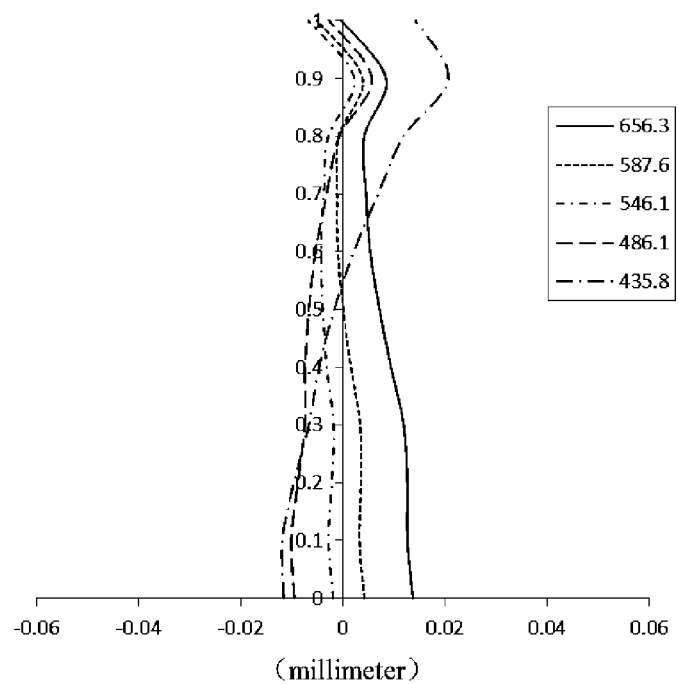
FIGS. 22A-22C show longitudinal aberration curves of the optical imaging lens assembly in FIGS. 21A-21C respectively.
Figure 22B:
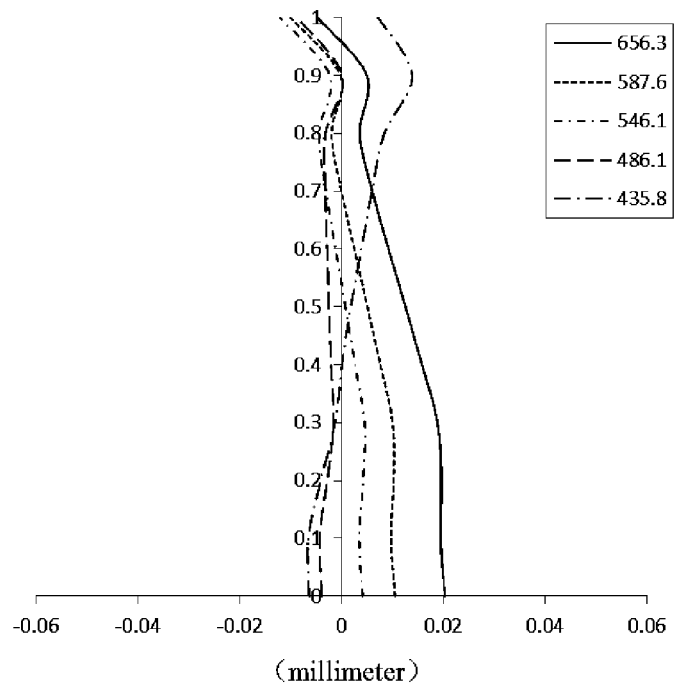
Figure 22C:
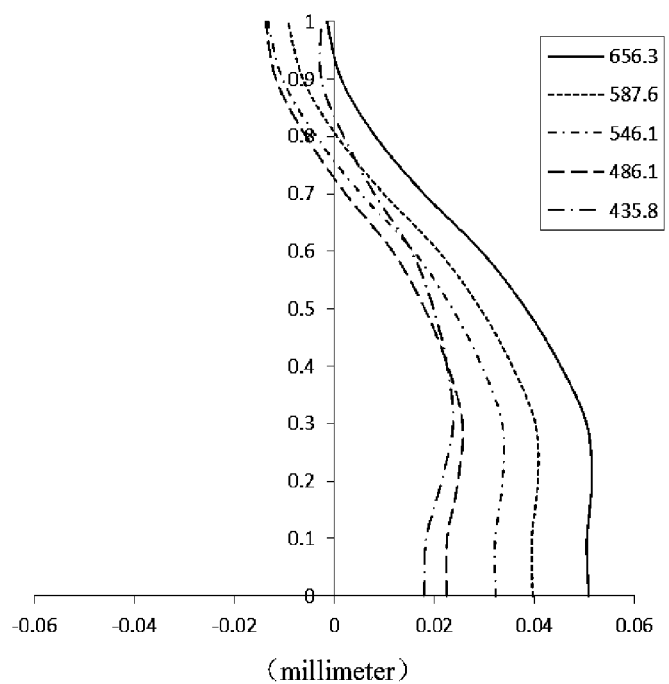
Figure 23A:
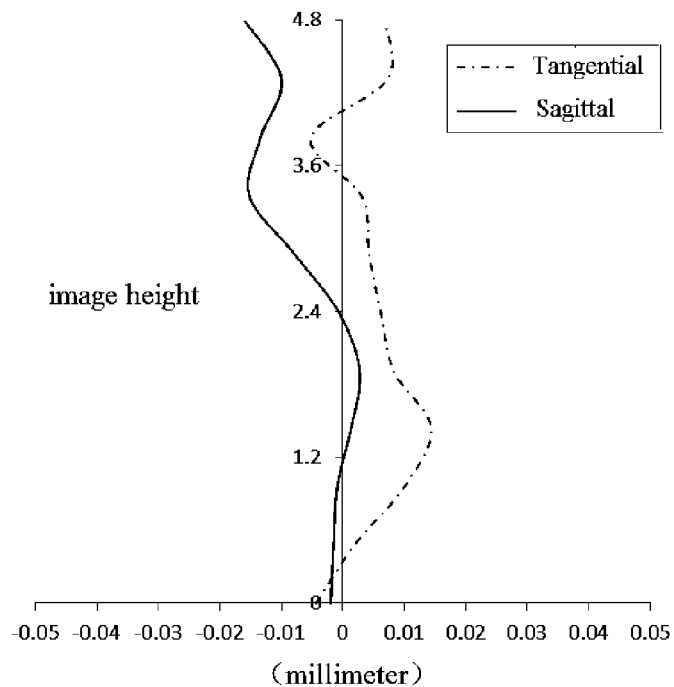
FIGS. 23A-23C show astigmatism curves of the optical imaging lens assembly in FIGS. 21A-21C respectively.
Figure 23B:
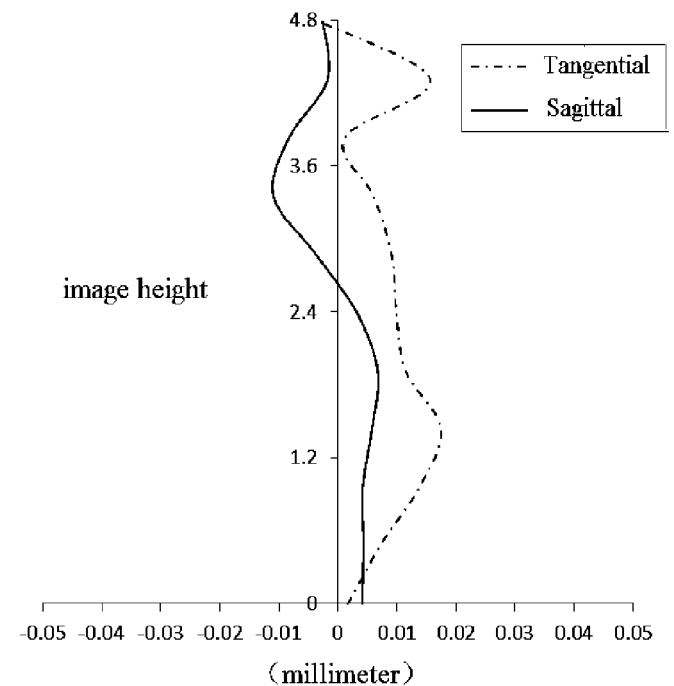
Figure 23C:
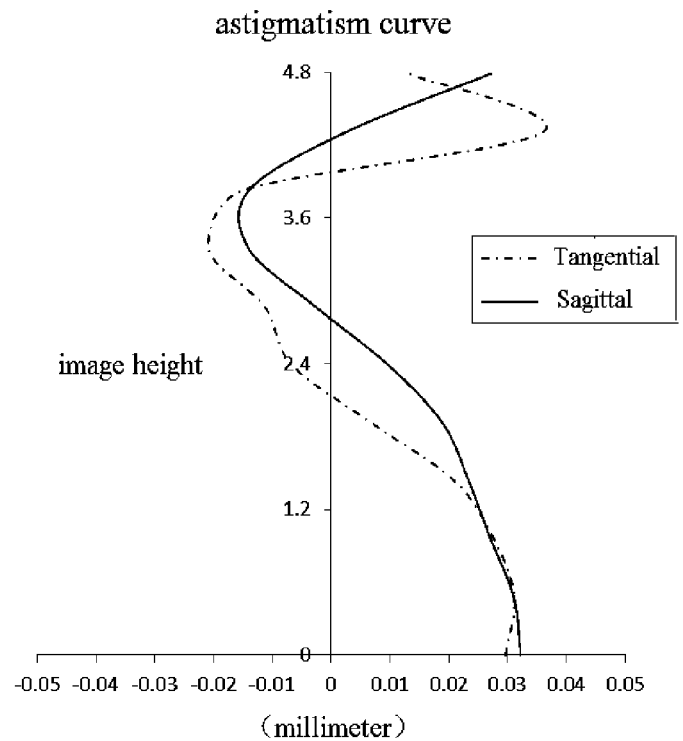
Figure 24A:
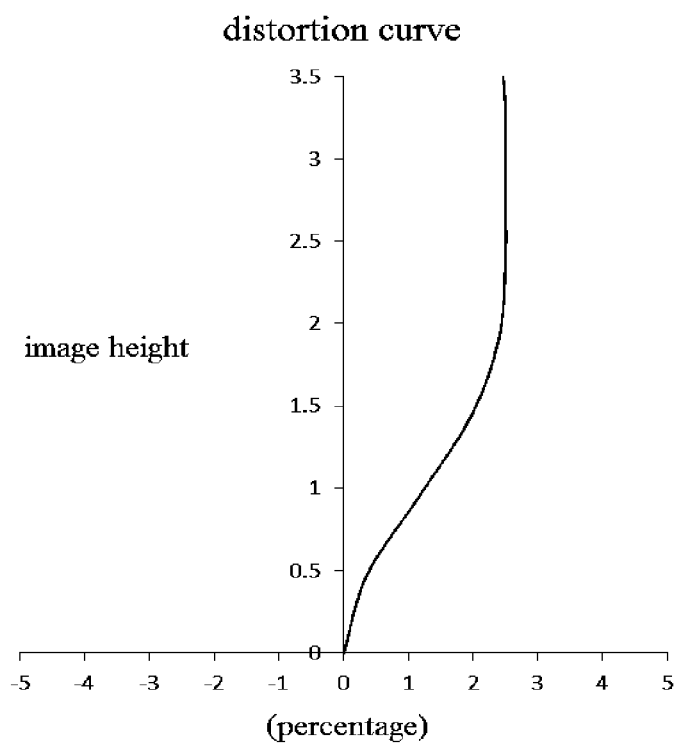
FIGS. 24A-24C show distortion curves of the optical imaging lens assembly in FIGS. 21A-21C respectively.
Figure 24B:
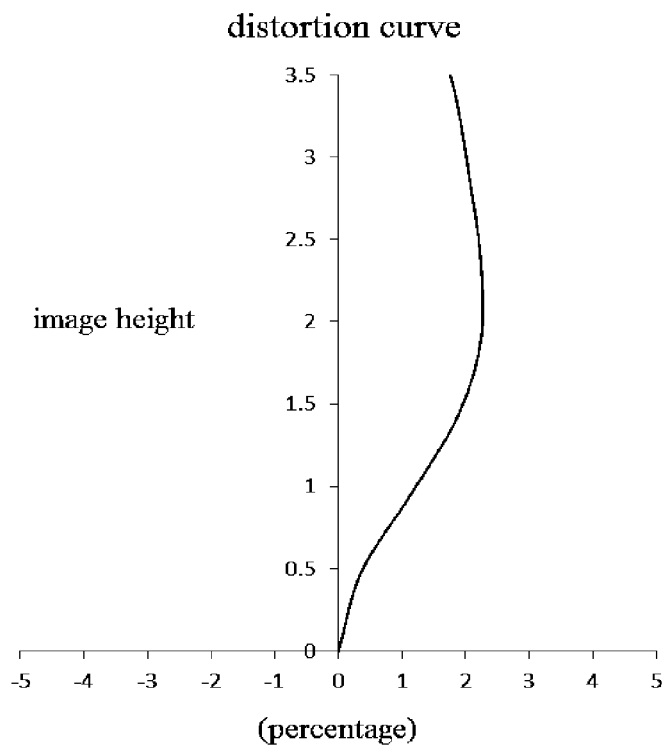
Figure 24C:
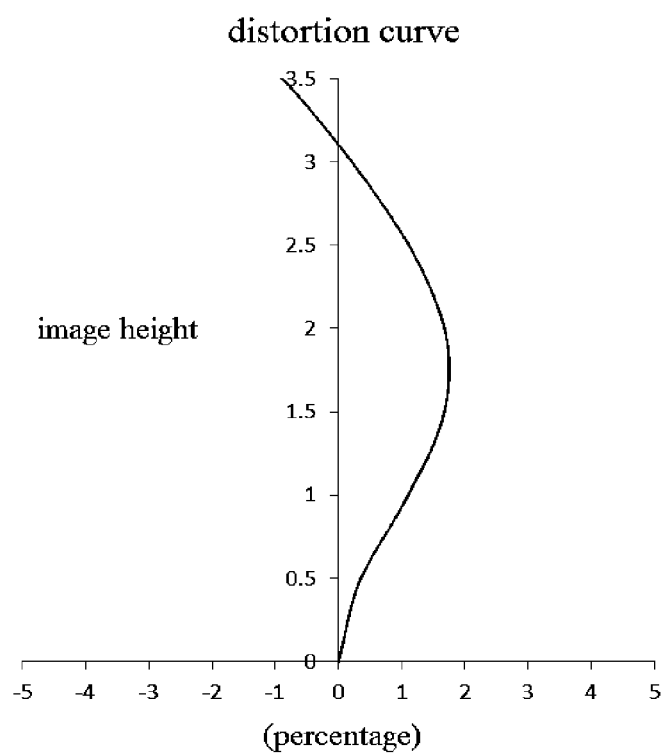

FIGS. 22A-22C show longitudinal aberration curves of the optical imaging lens assembly according to Embodiment 6 in the states that the object distance is infinity, 500 mm and 100 mm to represent deviations of a convergence focal point after light with different wavelengths passes through the lens groups. FIGS. 23A-23C show astigmatism curves of the optical imaging lens assembly according to Embodiment 6 in the three states mentioned above to represent curvatures of tangential image surface and curvatures of sagittal image surface. FIGS. 24A-24C show distortion curves of the optical imaging lens assembly according to Embodiment 6 in the three states mentioned above to represent distortion values corresponding to different image heights. According to FIGS. 22A-22C, it can be seen that the optical imaging lens assembly provided in Embodiment 6 and a camera lens with the optical imaging lens assembly may achieve good imaging quality.

From the above, Embodiment 1 to Embodiment 6 satisfy relationships shown in Table 20 and Table 21 respectively, and "↑" represents being the same as the numerical value above.

TABLE 20

| | Embodiment | | | | | |
|---|---|---|---|---|---|---|
| Conditional expression | 1 | 2 | 3 | 4 | 5 | 6 |
| CT1/ΣCT | 0.26 | 0.22 | 0.19 | 0.35 | 0.34 | 0.28 |
| f5/f6 | −1.22 | −0.91 | −0.74 | −1.54 | −1.04 | −1.24 |
| DT51/DT32 | 2.22 | 1.90 | 2.06 | 1.55 | 1.61 | 1.95 |
| DT41/DT51 | 0.54 | 0.61 | 0.58 | 0.75 | 0.74 | 0.60 |
| ST/CT1 | −0.68 | −0.59 | −0.60 | −0.21 | −0.14 | −0.62 |
| R9/f5 | 0.87 | 0.89 | 0.87 | 1.16 | 1.16 | 0.89 |
| CT2/CT3 | 0.83 | 0.80 | 0.55 | 0.98 | 0.82 | 0.96 |

TABLE 20-continued

| Conditional expression | Embodiment | | | | | |
|---|---|---|---|---|---|---|
|  | 1 | 2 | 3 | 4 | 5 | 6 |
| CT2/CT4 | 1.01 | 1.04 | 1.00 | 0.95 | 1.07 | 0.90 |
| f1/f5 | 0.92 | 1.03 | 1.08 | 0.82 | 0.96 | 0.94 |
| SAG52/DT52 | −0.14 | −0.09 | −0.11 | −0.18 | −0.25 | −0.11 |
| V3 | 37.30 | 37.30 | 37.30 | 37.30 | 37.30 | 37.30 |
| (R1 − R4)/(R1 + R4) | −0.40 | −0.36 | −0.35 | −0.32 | −0.15 | −0.39 |

TABLE 21

| Conditional expression | | Embodiment | | | | | |
|---|---|---|---|---|---|---|---|
|  | OD state | 1 | 2 | 3 | 4 | 5 | 6 |
| f/EPD | Infinity | 1.89 | 1.89 | 1.89 | 2.02 | 1.91 | 1.88 |
|  | 500.0000 | ↑ | ↑ | 1.91 | 2.03 | 1.93 | 1.89 |
|  | 100.0000 | ↑ | 1.88 | 1.99 | 2.09 | 2.03 | 1.92 |
| TTL/ImgH | Infinity | 1.36 | 1.39 | 1.38 | 1.29 | 1.23 |  |
|  | 500.0000 | ↑ | ↑ | ↑ | ↑ | ↑ |  |
|  | 100.0000 | ↑ | ↑ | 1.39 | 1.32 | 1.24 |  |

The disclosure provides a camera module. The camera module may be an independent imaging device such as a digital camera, and may also be a module integrated into a mobile electronic device such as a mobile phone. The camera module is provided with the abovementioned optical imaging lens assembly.

The above description is only description about the preferred embodiments of the disclosure and adopted technical principles. It is understood by those skilled in the art that the scope of protection involved in the disclosure is not limited to the technical solutions formed by specifically combining the technical features and should also cover other technical solutions formed by freely combining the technical features or equivalent features thereof without departing from the concept of the disclosure, for example, technical solutions formed by mutually replacing the features and (but not limited to) the technical features with similar functions disclosed in the disclosure.

What is claimed is:

1. An optical imaging lens assembly, sequentially comprising from an object side to an image side along an optical axis:
   a first lens group with a positive refractive power, comprising a first lens with a refractive power;
   a second lens group, sequentially comprising from the object side to the image side along the optical axis: a second lens, a third lens, a fourth lens, a fifth lens and a sixth lens with refractive power respectively;
   an optical filter; and
   a photosensitive element;
   wherein at least one of the first lens to the sixth lens is arranged to be movable relative to the photosensitive element in a direction of the optical axis; effective semi-diameters of each lens in the second lens to the sixth lens progressively increase in sequence; and
   a maximum effective semi-diameter DT51 of an object-side surface of the fifth lens and a maximum effective semi-diameter DT32 of an image-side surface of the third lens may satisfy: 1.5<DT51/DT32<2.5;
   an on-axis distance SAG52 from an intersection point of an image-side surface of the fifth lens and the optical axis to an effective radius vertex of the image-side surface of the fifth lens and a maximum effective semi-diameter DT52 of the image-side surface of the fifth lens satisfy: −0.3<SAG52/DT52<0;
   an effective focal length f5 of the fifth lens and an effective focal length f6 of the sixth lens satisfy: −2<f5/f6 <−0.5.

2. The optical imaging lens assembly according to claim 1, wherein a center thickness CT1 of the first lens on the optical axis and a sum ΣCT of center thicknesses of each lens in the first lens group and the second lens group on the optical axis satisfy: 0.1<CT1/ΣCT<0.5.

3. The optical imaging lens assembly according to claim 1, wherein a total effective focal length f of the optical imaging lens assembly and an Entrance Pupil Diameter (EPD) of the optical imaging lens assembly satisfy: 1.6<f/EPD<2.6.

4. The optical imaging lens assembly according to claim 1, wherein ImgH is a half the diagonal length of an effective pixel region on the photosensitive element, TTL is a spacing distance from an object-side surface of the first lens to the effective pixel region on the photosensitive element on the optical axis, and ImgH and TTL satisfy: TTL/ImgH<1.5.

5. The optical imaging lens assembly according to claim 1, wherein a maximum effective semi-diameter DT41 of an object-side surface of the fourth lens and the maximum effective semi-diameter DT51 of the object-side surface of the fifth lens satisfy: 0.5<DT41/DT51<1.

6. The optical imaging lens assembly according to claim 1, further comprising a diaphragm arranged on the object side of the first lens, wherein
   a distance ST from the diaphragm to an object-side surface of the first lens on the optical axis and a center thickness CT1 of the first lens on the optical axis satisfy: −1<ST/CT1<0.

7. The optical imaging lens assembly according to claim 1, wherein a curvature radius R9 of the object-side surface of the fifth lens and an effective focal length f5 of the fifth lens satisfy: 0.5<R9/f5<1.5.

8. The optical imaging lens assembly according to claim 1, wherein a center thickness CT2 of the second lens on the optical axis and a center thickness CT3 of the third lens on the optical axis satisfy: 0.5<CT2/CT3<1.

9. The optical imaging lens assembly according to claim 1, wherein a center thickness CT2 of the second lens on the optical axis and a center thickness CT4 of the fourth lens on the optical axis satisfy: 0.8<CT2/CT4<1.2.

10. The optical imaging lens assembly according to claim 1, wherein an effective focal length f1 of the first lens and an effective focal length f5 of the fifth lens satisfy: 0.7<f1/f5<1.3.

11. The optical imaging lens assembly according to claim 1, wherein an on-axis distance SAG52 from an intersection point of an image-side surface of the fifth lens and the optical axis to an effective radius vertex of the image-side surface of the fifth lens and a maximum effective semi-diameter DT52 of the image-side surface of the fifth lens satisfy: −0.3<SAG52/DT52<0.

12. The optical imaging lens assembly according to claim 1, wherein an Abbe number V3 of the third lens satisfies: 30<V3<50.

13. The optical imaging lens assembly according to claim 1, wherein an object-side surface of the first lens is a convex surface and an image-side surface of the second lens is a concave surface.

14. The optical imaging lens assembly according to claim 13, wherein a curvature radius R1 of the object-side surface of the first lens and a curvature radius R4 of the image-side surface of the second lens satisfy: $-0.5<(R1-R4)/(R1+R4)<0$.

15. An optical imaging lens assembly, sequentially comprising from an object side to an image side along an optical axis:
- a first lens group with a positive refractive power, comprising a first lens with a refractive power;
- a second lens group, sequentially comprising from the object side to the image side along the optical axis: a second lens, a third lens, a fourth lens, a fifth lens and a sixth lens with refractive power respectively;
- an optical filter; and
- a photosensitive element;
- wherein at least one of the first lens to the sixth lens is arranged to move relative to the photosensitive element in a direction of the optical axis; and
- an on-axis distance SAG52 from an intersection point of an image-side surface of the fifth lens and the optical axis to an effective radius vertex of the image-side surface of the fifth lens and a maximum effective semi-diameter DT52 of the image-side surface of the fifth lens satisfy: $-0.3<SAG52/DT52<0$;
- an effective focal length f5 of the fifth lens and an effective focal length f6 of the sixth lens satisfy: $-2<f5/f6<-0.5$.

16. The optical imaging lens assembly according to claim 15, wherein a center thickness CT1 of the first lens on the optical axis and a sum ΣCT of center thicknesses of each lens in the first lens group and the second lens group on the optical axis satisfy: $0.1<CT1/\Sigma CT<0.5$.

17. The optical imaging lens assembly according to claim 15, wherein a total effective focal length f of the optical imaging lens assembly and an Entrance Pupil Diameter (EPD) of the optical imaging lens assembly satisfy: $1.6<f/EPD<2.6$.

18. The optical imaging lens assembly according to claim 15, wherein ImgH is a half the diagonal length of an effective pixel region on the photosensitive element, TTL is a spacing distance from an object-side surface of the first lens to the effective pixel region on the photosensitive element on the optical axis, and ImgH and TTL satisfy: $TTL/ImgH<1.5$.

* * * * *